US011741928B2

(12) United States Patent
Hakuta et al.

(10) Patent No.: US 11,741,928 B2
(45) Date of Patent: Aug. 29, 2023

(54) SOUNDPROOF STRUCTURE

(71) Applicant: FUJIFILM Corporation, Tokyo (JP)

(72) Inventors: Shinya Hakuta, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 549 days.

(21) Appl. No.: 16/929,464

(22) Filed: Jul. 15, 2020

(65) Prior Publication Data

US 2020/0349914 A1 Nov. 5, 2020

Related U.S. Application Data

(63) Continuation of application No. PCT/JP2019/006561, filed on Feb. 21, 2019.

(30) Foreign Application Priority Data

Feb. 27, 2018 (JP) .................................. 2018-032949

(51) Int. Cl.
*G10K 11/172* (2006.01)
*G10K 11/168* (2006.01)

(52) U.S. Cl.
CPC .......... *G10K 11/172* (2013.01); *G10K 11/168* (2013.01)

(58) Field of Classification Search
CPC ........................... G10K 11/172; G10K 11/168
(Continued)

(56) References Cited

U.S. PATENT DOCUMENTS 4,301,890 A * 11/1981 Zalas ..................... B32B 7/12
428/116
4,787,473 A * 11/1988 Fuchs .................. F16L 55/033
181/290
(Continued)

FOREIGN PATENT DOCUMENTS

JP 2009-227227 A 10/2009
JP 2009293252 A * 12/2009
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2019/006561, dated Sep. 3, 2020, with an English translation.

(Continued)

*Primary Examiner* — Forrest M Phillips
(74) *Attorney, Agent, or Firm* — Birch, Stewart, Kolasch & Birch, LLP

(57) ABSTRACT

Provided is a soundproof structure that is small and light and can reduce a noise with a high specific frequency of a sound source at a plurality of frequencies at the same time. The soundproof structure has a membrane-like member, a plate-like member that is disposed to face the membrane-like member and in which at least one through-hole is formed, and a support that is formed of a rigid body and supports the plate-like member and the membrane-like member, in which the membrane-like member is supported by the support so as to perform membrane vibration, in which a rear surface space is provided between the membrane-like member and the plate-like member, in which a first space is provided on a side opposite to the rear surface space with the plate-like member sandwiched therebetween, in which the membrane-like member, the support, the plate-like member, and the rear (Continued)

surface space form a first sound absorbing portion that absorbs a sound by membrane vibration, in which the plate-like member, the support, and the first space form a second sound absorbing portion that absorbs a sound by Helmholtz resonance, and in which assuming that a fundamental frequency of membrane vibration of the membrane-like member in a case where the plate-like member is regarded as a rigid body in which the through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied.

17 Claims, 35 Drawing Sheets

(58) Field of Classification Search
USPC .................................................. 181/284, 285
See application file for complete search history.

(56) References Cited

U.S. PATENT DOCUMENTS

| | | | | |
|---|---|---|---|---|
| 5,975,238 A | * | 11/1999 | Fuchs | G10K 11/172 181/290 |
| 6,290,022 B1 | * | 9/2001 | Wolf | G10K 11/172 181/295 |
| 7,870,929 B2 | * | 1/2011 | Farstad | F02K 1/82 181/292 |
| 8,272,475 B2 | * | 9/2012 | Helenius | F24F 13/24 454/351 |
| 9,697,817 B2 | * | 7/2017 | Zalewski | G10K 11/172 |
| 2006/0289229 A1 | | 12/2006 | Yamaguchi | |
| 2007/0272482 A1 | * | 11/2007 | Yamaguchi | G10K 11/172 181/290 |
| 2017/0341186 A1 | | 11/2017 | Hakuta et al. | |

FOREIGN PATENT DOCUMENTS

| | | |
|---|---|---|
| JP | 2010-97145 A | 4/2010 |
| JP | 4832245 B2 | 12/2011 |

OTHER PUBLICATIONS

International Search Report (Form PCT/ISA/210) for International Application No. PCT/JP2019/006561, dated Apr. 23, 2019.
European Office Action for corresponding European Application No. 19759978.0, dated Oct. 19, 2021.
Extended European Search Report, dated Mar. 19. 2021, for corresponding European Application No. 19759978.0.
European Communication pursuant to Article 94(3) EPC for corresponding European Application No. 19759978.0, dated Mar. 27, 2023.

* cited by examiner

SOUNDPROOF STRUCTURE

CROSS-REFERENCE TO RELATED APPLICATIONS

This application is a Continuation of PCT International Application No. PCT/JP2019/006561 filed on Feb. 21, 2019, which claims priority under 35 U.S.C. § 119(a) to Japanese Patent Application No. 2018-032949 filed on Feb. 27, 2018. The above application is hereby expressly incorporated by reference, in its entirety, into the present application.

BACKGROUND OF THE INVENTION

1. Field of the Invention

The present invention relates to a soundproof structure.

2. Description of the Related Art

Along with multifunctionality and high performance, it is necessary that various electronic apparatus such as a copier, electronic devices mounted on vehicles, an electronic apparatus of household appliances, home appliances, various moving objects such as robots are driven at a high voltage and current, and electric output has increased. In addition, with an increase in output and reduction in size, the necessity of controlling heat or air for cooling has increased, and fans and the like have become important.

The electronic apparatus or the like have an electronic circuit, a power electronics device, and an electric motor that are noise sources, and each of the electronic circuit, the power electronics device, and the electric motor (hereinafter, also referred to as a sound source) generates a sound with a great volume with a specific frequency. In a case where the output of the electric system increases, a volume with this frequency further increases which causes a problem as noise.

For example, in a case of an electric motor, noise (electromagnetic noise) with a frequency corresponding to a rotation speed is generated. In a case of an inverter, noise (switching noise) is generated according to a carrier frequency. In a case of a fan, noise with a frequency corresponding to a rotation speed is generated. The volume of these noises is greater than that of a similar frequency sound.

Generally, a porous sound absorbing body such as urethane foam or felt is often used as a sound reduction means. In a case where a porous sound absorbing body is used, a sound reduction effect is obtained in a wide frequency range. Therefore, in a case of the noise having no frequency dependency such as white noise, a suitable sound reduction effect is obtained.

However, sound sources such as various electronic apparatus generate loud sounds at their specific frequencies. Particularly, as various electronic apparatus operate at higher speeds and with higher output, a specific frequency sound becomes extremely high and large.

An ordinary porous sound absorbing body such as urethane foam or felt reduces the sound with a wide frequency range, and accordingly, noise with a specific frequency of the sound source may not be sufficiently reduced, and not only the noise with the specific frequency, but also sounds at other frequencies are reduced. Accordingly, the situation where the sound with the specific frequency is more audible prominently than the sounds at other frequencies does not change. Therefore, only a specific frequency width exists for a loud sound with respect to noise that is broad in frequency such as white noise and pink noise, and there is a problem in that noise in a narrow frequency band such as a single frequency sound is easily sensed by human. Therefore, in a case of such noise generated by the electronic apparatus or the like as described above, there has been a problem that even after the countermeasure is taken with the porous sound absorbing body, the sound at a specific frequency becomes relatively more audible than sounds at other frequencies.

Further, in order to reduce a louder sound using the porous sound absorbing body, it is necessary to use a large amount of the porous sound absorbing body. An electronic apparatus and the like are often required to be reduced in size and weight, and it is difficult to ensure a space for disposing a large amount of porous sound absorbing body in the periphery of an electronic circuit, an electric motor, and the like of the electronic apparatus.

As a means for reducing a specific frequency sound more significantly, a sound reduction means using Helmholtz resonance, a sound reduction means using membrane vibration, and the like are known.

For example, JP4832245B discloses a sound absorbing body including a frame in which a through-hole is formed, and a sound absorbing material covering one opening of the through-hole, in which a first storage elastic modulus E1 of the sound absorbing material is $9.7 \times 10^6$ or more, and a second storage elastic modulus E2 is 346 or less. JP4832245B discloses that this sound absorbing material has a plate shape or a membrane shape, and in a case where sound waves are incident on the sound absorbing body, resonance (membrane vibration) occurs to absorb a sound (see paragraph [0009], FIG. 1 and the like of JP4832245B).

In addition, JP2010-097145A discloses a sound absorbing structure comprising a housing having an opening portion and forming an internal space, a plate-like or membrane-like vibration body covering the opening portion to separate the internal space from an external space, and a partition wall dividing the internal space into a plurality of partial spaces and having a hole portion allowing gas to flow from one partial space to another partial space. The sound absorbing structure disclosed in JP2010-097145A is a structure capable of obtaining a high sound absorbing effect in a low sound range.

SUMMARY OF THE INVENTION

With a further increase in speed and output of various electronic apparatus, a frequency of noise generated by the above-described electronic circuits and electric motors has become higher.

Since the sound reduction means using Helmholtz resonance absorbs a sound in a fundamental vibration mode, it is difficult to reduce higher frequency sound.

On the other hand, in a case of reducing the high frequency sound by the sound reduction means using membrane vibration, it is considered to increase a specific frequency of the membrane vibration by adjusting a hardness of the membrane and a size of the membrane.

However, according to the study of the present inventors, it is found that, in the sound reduction means using the membrane vibration, in a case where the specific frequency of the membrane vibration is increased by adjusting a hardness and size of the membrane, a sound absorption coefficient becomes low at a high frequency.

More specifically, assuming that sound absorption is performed using membrane vibration in a case where the hardness and size of the membrane are changed, membrane vibration of a fundamental vibration mode mainly contributes to the sound absorption. However, it is found that the higher a frequency in the fundamental vibration mode, the lower the sound absorption coefficient due to the membrane vibration since the sound is reflected by a membrane.

In addition, in electric apparatus such as an electric motor and an inverter, a plurality of sounds having different frequencies may be generated. In such a case, it is conceivable to use a plurality of sound reduction means having different frequencies for the sound absorption.

However, in electronic apparatus and the like, an installation space of the sound reduction means is often limited. For this reason, as a structure for absorbing the sound of the plurality of frequencies, a structure capable of absorbing each frequency sound while maintaining the same installation space is required instead of disposing a sound reduction means for each frequency.

JP2010-097145A discloses that sound reduction due to membrane vibration and sound reduction due to Helmholtz resonance are combined (paragraph [0051] of JP2010-097145A). However, the sound absorbing structure disclosed in JP2010-097145A is a configuration for obtaining a high sound absorbing effect in a low sound range, and does not consider reducing a sound having a plurality of frequency bands at a higher frequency.

An object of the present invention is to provide a soundproof structure that solves the above-mentioned problems of the related art, is small and light, and can reduce a noise with a high specific frequency of a sound source at a plurality of frequencies at the same time.

The present inventors have conducted intensive studies to achieve the above object, and as a result, the inventors have found that the above problems can be solved by including a soundproof structure having a membrane-like member; a plate-like member that is disposed to face one surface of the membrane-like member and in which at least one through-hole is formed; and a support that is formed of a rigid body and supports the plate-like member and the membrane-like member, in which the membrane-like member is supported by the support so as to perform membrane vibration, in which a rear surface space is provided between the membrane-like member and the plate-like member, in which a first space is provided on a side opposite to the rear surface space with the plate-like member sandwiched therebetween, in which the membrane-like member, the support, the plate-like member, and the rear surface space form a first sound absorbing portion that absorbs a sound by membrane vibration, in which the plate-like member having the through-hole, the support, and the first space form a second sound absorbing portion that absorbs a sound by Helmholtz resonance, and in which assuming that a fundamental frequency of membrane vibration of the membrane-like member in a case where the plate-like member is regarded as a rigid body in which the through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied.

[1] The soundproof structure having a membrane-like member; a plate-like member that is disposed to face one surface of the membrane-like member and in which at least one through-hole is formed; and a support that is formed of a rigid body and supports the plate-like member and the membrane-like member, in which the membrane-like member is supported by the support so as to perform membrane vibration, in which a rear surface space is provided between the membrane-like member and the plate-like member, in which a first space is provided on a side opposite to the rear surface space with the plate-like member sandwiched therebetween, in which the membrane-like member, the support, the plate-like member, and the rear surface space form a first sound absorbing portion that absorbs a sound by membrane vibration, in which the plate-like member having the through-hole, the support, and the first space form a second sound absorbing portion that absorbs a sound by Helmholtz resonance, and in which assuming that a fundamental frequency of membrane vibration of the membrane-like member in a case where the plate-like member is regarded as a rigid body in which the through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied.

[2] The soundproof structure according to [1], in which a sound absorption coefficient of the vibration of the membrane-like member at a frequency in at least one high-order vibration mode existing at frequencies of 1 kHz or more is higher than a sound absorption coefficient at a frequency in a fundamental vibration mode.

[3] The soundproof structure according to [1] or [2], in which assuming that a Young's modulus of the membrane-like member is E (Pa), a thickness of the membrane-like member is t (m), a thickness of the rear surface space is d (m), and an equivalent circle diameter of a region where the membrane-like member vibrates is $\Phi$ (m), a hardness $E \times t^3$ (Pa·m$^3$) of the membrane-like member is $21.6 \times d^{-1.25} \times \Phi^{4.15}$ or less.

[4] The soundproof structure according to [3], in which the hardness $E \times t^3$ (Pa·m$^3$) of the membrane-like member is $2.49 \times 10^{-7}$ or more.

[5] The soundproof structure according to any one of [1] to [4], in which there are a plurality of frequency bands where the soundproof structure is capable of absorbing a sound, and in which the plurality of frequency bands where the soundproof structure is capable of absorbing a sound include a sound absorbing region on a low frequency side where the membrane vibration and the Helmholtz resonance provide phase variations in the same direction to absorb a sound, and a sound absorbing region on a high frequency side where the membrane vibration and the Helmholtz resonance provide phase variations in opposite directions to absorb a sound.

[6] The soundproof structure according to any one of [1] to [5], in which the support comprises a tubular outer frame and an inner frame having an opening portion, in which the membrane-like member, the outer frame, the plate-like member and the inner frame are laminated in this order, in which the membrane-like member is fixed to one opening surface of the outer frame, in which the plate-like member is fixed to an opening surface of the inner frame in which the opening portion is formed, in which the rear surface space is a space surrounded by the membrane-like member, the outer frame, and the plate-like member, and in which the first space is a space surrounded by the plate-like member and the inner frame.

[7] The soundproof structure according to any one of [1] to [6], in which the fundamental frequency $f_{h1}$ of the Helmholtz resonance of the second sound absorbing portion and the fundamental frequency $f_{m1}$ of the membrane vibration of the first sound absorbing portion satisfy $1.3 \times f_{m1} \leq f_{h1} \leq 12 \times f_{m1}$.

[8] The soundproof structure according to any one of [1] to [7], in which a thickness of each of the first space and the rear surface space is 10 mm or less.

[9] The soundproof structure according to any one of [1] to [8], in which a total thickness of the soundproof structure is 10 mm or less.

[10] The soundproof structure according to any one of [1] to [9], in which a thickness of the membrane-like member is 100 μm or less.

[11] The soundproof structure according to any one of [1] to [10], in which a through-hole is provided in at least one of the support or a bottom surface.

[12] The soundproof structure according to any one of [1] to [11], in which a through-hole is formed in the membrane-like member.

[13] The soundproof structure according to any one of [1] to [12], further having one or more second membrane-like members provided on a surface side of the membrane-like member opposite to the plate-like member side.

[14] The soundproof structure according to [13], in which a through-hole is formed in all the second membrane-like members.

[15] The soundproof structure according to any one of [1] to [14], further having one or more second plate-like members having at least one through-hole on a surface side of the plate-like member opposite to the membrane-like member side.

[16] The soundproof structure according to any one of [1] to [15], further having a porous sound absorbing body disposed in at least a portion of the rear surface space.

[17] The soundproof structure according to any one of [1] to [16], further having a mesh member covering the through-hole of the plate-like member.

[18] The soundproof structure according to any one of [1] to [17], in which the membrane-like member and the plate-like member having the through-hole are disposed in this order with respect to a sound source as a sound absorbing target.

According to the present invention, it is possible to provide the soundproof structure that is reduced in size and weight and can reduce a noise with a high specific frequency of a sound source at a plurality of frequencies at the same time.

DESCRIPTION OF THE PREFERRED EMBODIMENTS

Figure 1:
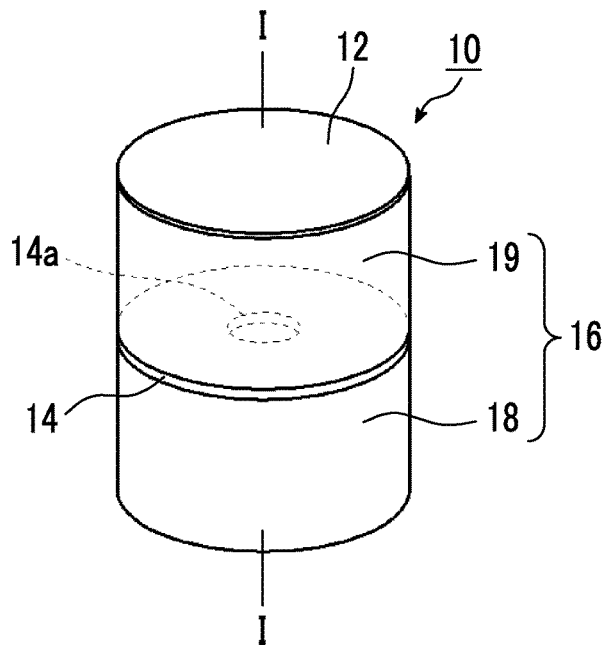
FIG. 1 is a perspective view schematically showing an example of a soundproof structure of the present invention.

Hereinafter, a soundproof structure of the present invention will be described in detail.

The description of the constituent elements described below may be made on the basis of typical embodiments of the present invention, but the invention is not limited to such embodiments. That is, in the following, the soundproof structure according to the embodiment of the present invention has been described with various embodiments, but the present invention is not limited to these embodiments, and various modifications or changes may be made without departing from a gist of the present invention.

In this specification, a numerical range expressed using "to" means a range including numerical values described before and after "to" as a lower limit value and an upper limit value.

Further, in this specification, for example, angles such as "45°", "parallel", "vertical", and "orthogonal" mean that a difference from an exact angle is within a range of less than 5 degrees, unless otherwise specified. The difference from the exact angle is preferably less than 4 degrees and more preferably less than 3 degrees.

In addition, in this specification, "the same" or "identical" include an error range generally accepted in the technical field.

In this specification, "entire part", "all", and "entire surface" may be 100%, and may include an error range generally accepted in the technical field, for example, 99% or more, 95% or more, or 90% or more.

In the following description, "thickness" means a length in a direction in which a plate-like member and a membrane-like member described later are arranged (hereinafter, a thickness direction). In addition, "outer" and "inner" in the following description are located on sides opposite to each other in the thickness direction, and the "outer" means a side close to a sound source, that is, a side through which a sound emitted from the sound source enters the soundproof structure. On the other hand, "inner" means a side farther from the sound source, that is, a side towards which the sound that has entered the soundproof structure goes.

<<Soundproof Structure>>

The soundproof structure according to the embodiment of the present invention is a soundproof structure having a membrane-like member; a plate-like member that is disposed to face one surface of the membrane-like member and in which at least one through-hole is formed; and a support that is formed of a rigid body and supports the plate-like member and the membrane-like member, in which the membrane-like member is supported by the support so as to perform membrane vibration, in which a rear surface space is provided between the membrane-like member and the plate-like member, in which a first space is provided on a side opposite to the rear surface space with the plate-like member sandwiched therebetween, in which the membrane-like member, the support, the plate-like member, and the rear surface space form a first sound absorbing portion that absorbs a sound by membrane vibration, in which the plate-like member having the through-hole, the support, and the first space form a second sound absorbing portion that absorbs a sound by Helmholtz resonance, and in which assuming that a fundamental frequency of membrane vibration of the membrane-like member in a case where the plate-like member is regarded as a rigid body in which the through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied.

Here, the plate-like member and the membrane-like member are overlapped so that the normal direction of a surface of the membrane-like member (plate-like member) is aligned in a state of being spaced from each other. The support is formed of a rigid body, supports the plate-like member and the membrane-like member in a predetermined positional relationship, and supports the membrane-like member so as to perform membrane vibration.

The soundproof structure according to the embodiment of the present invention can be suitably used as a sound reduction means for reducing sounds generated by various kinds of electronic apparatus, transportation apparatus, and the like.

The electronic apparatus includes household appliance such as an air conditioner, an air conditioner outdoor unit, a water heater, a ventilation fan, a refrigerator, a vacuum cleaner, an air purifier, an electric fan, a dishwasher, a microwave oven, a washing machine, a television, a mobile phone, a smartphone, and a printer; office equipment such as a copier, a projector, a desktop PC (personal computer), a notebook PC, a monitor, and a shredder, computer apparatus that use high power such as a server and a supercomputer, scientific laboratory equipment such as a constant-temperature tank, an environmental tester, a dryer, an ultrasonic cleaner, a centrifugal separator, a cleaner, a spin coater, a bar coater, and a transporter.

Transportation apparatus includes vehicles, motorcycles, trains, airplanes, ships, bicycles (especially electric bicycles), personal mobility, and the like.

Examples of a moving object include a consumer robot (a cleaning use, a communication use such as a pet use and a guidance use, and a movement assisting use such as an automatic wheelchair) and an industrial robot.

In addition, the structure can also be used for an apparatus set to emit at least one or more specific single frequency sounds as a notification sound or a warning sound in order to send notification or warning to a user. In addition, in a case where the metal body and the machine resonate and vibrate at a frequency according to the size, as a result, at least one or more single frequency sounds emitted at a relatively large volume cause a problem as noise, but the soundproof structure according to the embodiment of the present invention can be applied to such noise.

Further, the soundproof structure according to the embodiment of the present invention can also be applied to a room, a factory, a garage, and the like in which the above-described apparatus are housed.

An example of a sound source of a sound which is to be reduced by the soundproof structure of the invention is an electronic part or a power electronics device part including an electric control device such as an inverter, a power supply, a booster, a large-capacity condenser, a ceramic condenser, an inductor, a coil, a switching power supply, and a transformer, a rotary part such as an electric motor or a fan, a mechanical part such as a moving mechanism using a gear and an actuator, and a metal body such as a metal rod, which are included in the various apparatus described above.

In a case where the sound source is an electronic part such as an inverter, the sound source generates a sound (switching noise) according to a carrier frequency.

In a case where the sound source is an electric motor, the sound source generates a sound (electromagnetic noise) with a frequency corresponding to a rotation speed.

In a case where the sound source is the metal body, a sound (single frequency noise) in a frequency according to a resonant vibration mode (primary resonance mode) is generated.

That is, each sound source generates a specific frequency sound to the sound source.

The sound source having a specific frequency often has a physical or electrical mechanism that performs oscillation at a specific frequency. For example, rotation speed and its multiples of a rotating system (such as a fan and a motor) are directly emitted as a sound. Specifically, for example, in the case of an axial fan, a strong peak sound is generated at a fundamental frequency determined according to the number of blades and its rotation velocity, and at a frequency that is an integral multiple of the fundamental frequency. The motor also generates the strong peak sound in a mode according to the rotation velocity and in a high-order mode.

In addition, a portion receiving an alternating electrical signal of an inverter often oscillates a sound corresponding to an alternating frequency. In addition, in the metal body such as the metal rod, a resonance vibration according to the size of the metal body occurs, and as a result, the single frequency sound is strongly emitted. Therefore, the rotating system, an alternating circuit system, and the metal body is a sound source with a specific frequency of the sound source.

More generally, the following experiment can be performed to determine whether a sound source has a specific frequency.

The sound source is disposed in an anechoic room or a semi-anechoic room, or in a situation surrounded by a sound absorbing body such as urethane. By setting a sound absorbing body in the periphery, the influence of reflection interference of a room or a measurement system is eliminated. Then, the sound source is allowed to generate a sound and measurement is performed with a microphone from a separated position to acquire frequency information. A distance between the sound source and the microphone can be appropriately selected depending on the size of the measurement system, and it is desirable to perform the measurement at a distance of appropriately 30 cm or more.

In the frequency information of the sound source, a maximum value is referred to as a peak, and a frequency thereof is referred to as a peak frequency. In a case where the maximum value is higher than that of a sound with a peripheral frequency by 3 dB or higher, the sound with the peak frequency can be sufficiently recognized by human beings, and accordingly, it can be referred to as a sound source with a specific frequency. In a case where the maximum value is higher by 5 dB or more, it can be more recognized, and in a case where the maximum value is higher by 10 dB or more, it can be even more recognized. The comparison with the peripheral frequencies is made by evaluating a difference between a minimum value of the nearest frequency at which the frequency is minimum excluding signal noise and fluctuation, and the maximum value.

In addition, in contrast to a white noise and a pink noise that frequently exist as environmental sounds in the natural world, since a sound in which only a specific frequency component sounds strongly is likely to stand out and gives an unpleasant impression, it is important to remove such noise.

In addition, in a case where the sound emitted from the sound source resonates in a housing of various apparatus, a volume of a sound with a resonance frequency or the frequency of an overtone may increase. Alternatively, in a case where the sound emitted from the sound source in a room, a factory, a garage, and the like in which the above-described apparatus are housed is resonated, the volume of the sound with the resonance frequency or the frequency of the overtone may increase.

In addition, due to resonance occurring due to a space inside a tire and a cavity inside a sport ball, in a case where vibration is applied, a sound corresponding to the cavity resonance or a high-order vibration mode thereof may also greatly oscillate.

In addition, the sound emitted from the sound source is oscillated with a resonance frequency of a mechanical structure of a housing of various apparatus, or a member disposed in the housing, and a volume of a sound with the resonance frequency or a frequency of the overtone thereof may increase. For example, even in a case where the sound source is a fan, a resonance sound may be generated at a rotation speed much higher than the rotation speed of the fan due to the resonance of the mechanical structure.

The structure of the present invention can be used by directly attaching to a noise-generating electronic part or a motor. In addition, it can be disposed in a ventilation section such as a duct portion and a sleeve and used for sound reduction of a transmitted sound. Further, it can also be attached to a wall of a box having an opening (a box or a room containing various electronic apparatus) to be used as a sound reduction structure for noise emitted from the box.

Furthermore, it can also be attached to a wall of a room to suppress noise inside the room. It can also be used without limitation thereto.

<<Configuration Example of Soundproof Structure>>

An example of the soundproof structure according to the embodiment of the present invention will be described with reference to FIGS. 1, 2, and 3.

FIG. 1 is a schematic perspective view showing an example (hereinafter, a soundproof structure 10) of the soundproof structure according to the embodiment of the present invention. FIG. 2 is an exploded view of the soundproof structure 10. FIG. 3 is a cross-sectional view taken along line I-I of the soundproof structure 10 shown in FIG. 1.

The soundproof structure 10 exhibits a sound absorbing function by using membrane vibration and Helmholtz resonance, and selectively reduces a specific frequency sound (frequency band).

Figure 2:
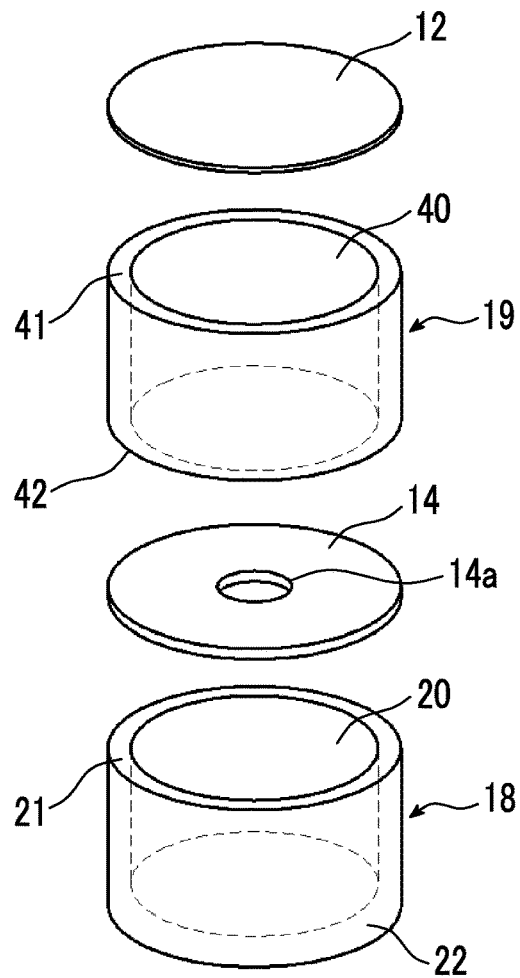
FIG. 2 is an exploded view showing an example of the soundproof structure of the present invention.
Figure 3:
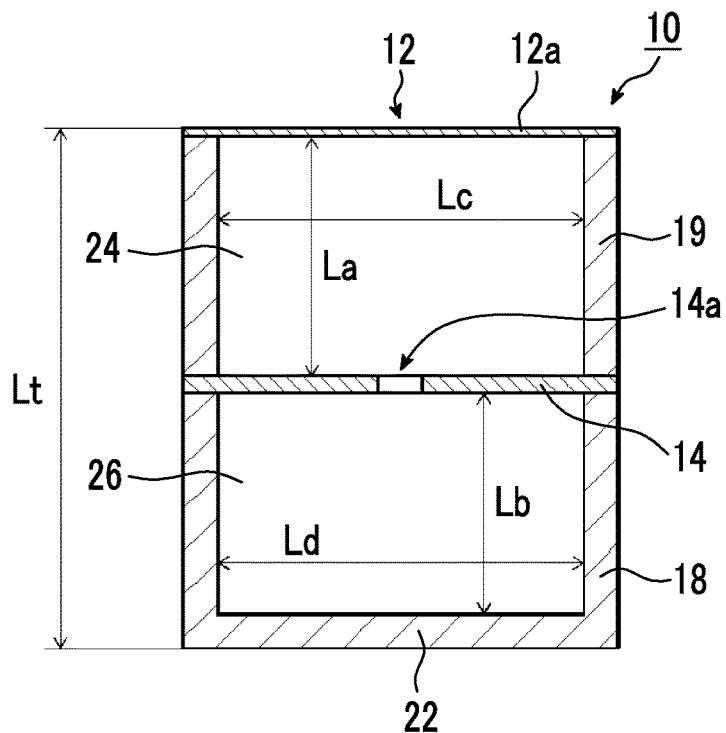
FIG. 3 is a cross-sectional view taken along line I-I of FIG. 1.

As shown in FIGS. 1 to 3, the soundproof structure 10 has a membrane-like member 12, a plate-like member 14 having a through-hole 14a disposed to face one surface of the plate-like member 14, and a support 16 supporting the plate-like member 14 and the membrane-like member 12. In addition, a rear surface space 24 is formed between the plate-like member 14 and the membrane-like member 12, and a first space 26 is formed on a side opposite to the rear surface space 24 with the plate-like member 14 sandwiched therebetween.

The support 16 is configured with a plurality of frames, and in the soundproof structure 10 shown in FIGS. 1 to 3, the support 16 consists of two frames, that is, an inner frame 18 and an outer frame 19.

The outer frame 19 is a tubular frame having an opening portion 40 penetrating in the thickness direction. The membrane-like member 12 is disposed on one opening surface 41 of the outer frame 19, and the plate-like member 14 is disposed on the other opening surface 42.

The inner frame 18 is a bottomed tubular frame having a bottom wall 22. The plate-like member 14 is disposed on an opening surface 21 of the inner frame 18. That is, the plate-like member 14 is supported by being sandwiched between the outer frame 19 and the inner frame 18.

The inner frame 18 and the outer frame 19 consist of a rigid body, fix and support an edge portion of the plate-like member 14, and fix an edge portion of the membrane-like member 12 and support the membrane-like member 12 so as to vibrate.

Here, in the present invention, the "rigid body" can be regarded as a substantially rigid body. Specifically, it is a material which has a stiffness sufficiently larger than the stiffness of the membrane-like member 12 and is stationary without vibrating while the membrane-like member 12 is vibrating, and it is the material which has an overwhelming thickness with respect to the membrane-like member 12 and has a large bending stiffness. Assuming that a hardness is sufficiently large with respect to the membrane-like member 12, substantially, the vibration of the rigid body can be ignored with respect to the vibration of the membrane-like member 12 in a case where a sound is incident.

Since the edge portion of the membrane-like member 12 is a fixed end portion and is fixed to the outer frame 19 which is a rigid body, the edge portion does not vibrate. Whether or not the edge portion of the membrane-like member 12 (that is, the outer frame 19) does not vibrate (is stationary) can be confirmed by measurement using laser interference. Specifically, in a case where an amount of displacement of the edge portion of the membrane-like member 12 is about $1/100$ or less of the amplitude of a vibrating portion (a membrane portion 12a) of the membrane-like member 12, it is regarded as a rigid body. The amount of displacement is in inverse proportion to the product of a Young's modulus (modulus of longitudinal elasticity) and a secondary moment of a cross section. The secondary moment of a cross section is in proportion to the thickness to the power of 3 and the width to the power of 1. Therefore, in a case where the Young's modulus is denoted by E, the thickness is denoted by h, and the width is denoted by w, the amount of displacement is in proportion to $1/(E \times w \times h^3)$. Therefore, in order to reduce the amount of displacement to $1/100$ or less, it is only necessary that $(E \times w \times h^3)$ of the outer frame 19 is 100 times or more of the membrane-like member 12.

Alternatively, in a case where salt or white fine particles are scattered on the membrane-like member 12 and the membrane-like member 12 is vibrated, it can be visually confirmed by observing that the fine particles stand still at the edge portion of the membrane-like member 12.

The inner frame 18 is a cylindrical frame having a bottom as shown in FIG. 2, and an opening portion 20 consisting of a circular cavity is provided in a radial direction center portion thereof. In addition, one end surface (outer end portion) of the inner frame 18 in the thickness direction is the opening surface 21. The edge portion (outer edge portion) of the plate-like member 14 is fixed to the opening surface 21 of the inner frame 18.

In addition, the inner frame 18 is provided with a bottom wall 22 that covers the surface of the opening portion 20 opposite to the opening surface 21 on which the membrane-like member 12 is disposed. That is, the opening portion 20 of the inner frame 18 has a bottom surface at a position opposite to the opening surface 21. In the example shown in FIG. 3, the bottom wall 22 is formed integrally with the inner frame 18, but the present invention is not limited thereto, and the inner frame 18 and the bottom wall 22 may be separate bodies and joined for integration. In addition, the bottom wall 22 may be formed of a plate-like member, or may be formed of a thin member such as a film.

The outer frame 19 corresponds to a tubular frame, and is a cylindrical frame as shown in FIG. 2. In addition, an opening portion 40 consisting of a circular cavity penetrating from one end to the other end of the outer frame 19 in the thickness direction is formed in the outer frame 19. The opening portion 40 of the outer frame 19 has the same diameter as the opening portion 20 of the inner frame 18.

The edge portion of the plate-like member 14 is fixed to the opening surface 42 of the outer frame 19 on the inner frame 18 side. Further, the edge portion (outer edge portion) of the membrane-like member 12 is fixed to the opening surface 41 of the outer frame 19, which is located on a side opposite to the inner frame 18. Thus, the membrane-like member 12 is supported by the outer frame 19 in a state where the membrane portion 12a can perform the membrane vibration. Here, the membrane portion 12a refers to a membrane main body portion of the membrane-like member 12, which faces the opening portion 40 inside the fixed outer edge portion and performs the membrane vibration.

The membrane-like member 12 is a circular thin membrane body having an outer shape substantially the same size as the opening surface 41 of the outer frame 19. The edge portion (outer edge portion) of the membrane-like member 12 is fixed to the opening surface 41 of the outer frame 19. Thus, the membrane-like member 12 is supported by the outer frame 19 in a state where the membrane portion 12a can perform the membrane vibration.

As shown in FIG. 1, the membrane-like member 12 is disposed at the outer end in the thickness direction of the soundproof structure 10, and is exposed to the sound source. That is, the soundproof structure 10 is disposed in a direction in which the membrane-like member 12 and the plate-like member 14 are disposed in this order with respect to a sound source as a sound absorbing target.

The plate-like member 14 is a circular plate-like member having an outer diameter substantially the same size as the opening surface 21 of the inner frame 18. The edge portion (outer edge portion) of the plate-like member 14 is sandwiched and fixed between the opening surface 21 of the inner frame 18 and the opening surface 42 of the outer frame 19. In addition, the through-hole 14a is formed in a substantially center portion of the plate-like member 14.

As shown in FIGS. 2 and 3, the inner frame 18, the plate-like member 14, the outer frame 19, and the membrane-like member 12 are overlapped in this order from the inner side in the thickness direction to form the soundproof structure 10. In addition, as shown in FIG. 3, the membrane-like member 12 and the plate-like member 14 face each other via the outer frame 19 in the thickness direction.

As shown in FIG. 3, the rear surface space 24 is formed between the plate-like member 14 and the membrane-like member 12 inside the soundproof structure 10. The rear surface space 24 is sandwiched between the plate-like member 14 and the membrane-like member 12 in the thickness direction, and the surroundings thereof are surrounded by the outer frame 19. As described above, the plate-like member 14 and the membrane-like member 12 sandwiching the rear surface space 24 face each other via the outer frame 19.

Further, as shown in FIG. 3, the first space 26 is formed on a side opposite (that is, inner) to the rear surface space 24 with the plate-like member 14 sandwiched inside the soundproof structure 10. The first space 26 is a space surrounded by the plate-like member 14 fixed to the opening surface 21 of the inner frame 18 and the inner frame 18.

In addition, as shown in FIG. 1, the membrane-like member 12 is disposed at an outer end (that is, an end farther from the first space 26) of both ends of the soundproof structure 10 in the thickness direction, and the membrane-like member 12 covers one end surface (opening surface 41) of the opening portion 40 of the outer frame 19. Further, the plate-like member 14 is disposed between the outer frame 19 and the inner frame 18, and the plate-like member 14 covers the other end surface (opening surface 42) of the opening portion 20 of the outer frame 19.

That is, the rear surface space 24 and the first space 26 communicate with each other through the through-hole 14a formed in the plate-like member 14.

In the soundproof structure 10 according to the embodiment of the present invention configured as described above, there are a plurality of sound absorbing portions, and each of the sound absorbing portions absorbs a specific frequency sound. Specifically, the soundproof structure 10 has the first sound absorbing portion that absorbs a sound by vibrating the membrane-like member and the second sound absorbing portion that resonates by Helmholtz resonance. In the soundproof structure 10 according to the embodiment of the present invention, there are a plurality of frequency bands capable of absorbing a sound, and the plurality of frequency bands include a sound absorption frequency band where the membrane vibration and Helmholtz resonance are phases in the same direction and a sound absorption frequency band where the membrane vibration and Helmholtz resonance are phases in opposite directions, in which a sound is absorbed by an interaction between the membrane-like member and the plate-like member.

Here, the first sound absorbing portion is a sound absorbing portion configured with the membrane-like member 12, the outer frame 19, the plate-like member 14 and the rear surface space 24. The first sound absorbing portion absorbs a sound at a relatively high frequency (for example, 3 kHz to 5 kHz) due to the membrane vibration of the membrane-like member 12. That is, the frequency band of the sound absorption mainly contributed by the first sound absorbing portion corresponds to the frequency band of the sound absorption mainly caused by the membrane vibration of the membrane-like member 12 adjacent to the rear surface space 24.

The second sound absorbing portion is a sound absorbing portion configured with the plate-like member 14, the inner frame 18, and the first space 26. In the second sound absorbing portion, Helmholtz resonance is generated and a sound is absorbed by the through-hole 14a formed in the plate-like member 14 and the first space 26. That is, the frequency band of the sound absorption mainly contributed by the second sound absorbing portion corresponds to the frequency band of the sound absorption mainly caused due to the Helmholtz resonance generated by the through-hole 14a formed in the plate-like member 14 and the first space 26.

The soundproof structure 10 has a mode in which the membrane vibration of the first sound absorbing portion and the Helmholtz resonance of the second sound absorbing portion act at the same time. The soundproof structure 10 has a mode in which the membrane vibration and the Helmholtz resonance are phases in the same direction and a mode in which the membrane vibration and the Helmholtz resonance are phases in opposite directions as modes in which the membrane vibration and the Helmholtz resonance interact with each other.

Here, in the mode in which the membrane vibration and the Helmholtz resonance are phases in opposite directions, a sound is absorbed in a frequency band (for example, 8 kHz to 9 kHz) higher than the sound absorption by a single membrane vibration of the membrane-like member 12 of the first sound absorbing portion and the sound absorption by a single Helmholtz resonance of the second sound absorbing portion.

Hereinafter, each sound absorbing portion will be described in detail.

(About First Sound Absorbing Portion)

The first sound absorbing portion selectively absorbs a sound in a predetermined frequency band by the membrane vibration of the membrane-like member 12.

The frequency of the membrane vibration is determined by the thickness, hardness, size, fixing method and the like of the membrane-like member 12.

The membrane vibration includes a fundamental vibration mode and a high-order vibration mode.

Here, in the first sound absorbing portion, in order to absorb a sound in a higher frequency band, it is preferable that the sound absorption coefficient of the membrane vibration of the membrane-like member 12 adjacent to the rear surface space 24 in the frequency of at least one high-order vibration mode existing at 1 kHz or more is higher than the sound absorption coefficient in the frequency of the fundamental vibration mode. How such a configuration has been achieved will be described in detail below.

Various electronic apparatus such as copiers have sound sources such as electronic circuits and electric motors, which are noise sources, and these sound sources generate loud sounds with specific frequencies.

In a porous sound absorbing body that is generally used as a sound reduction means, noise with a specific frequency of the sound source is difficult to be sufficiently reduced, since the porous sound absorbing body reduces a sound at a wide frequency, and accordingly, the noise may be audible relatively more than sounds at other frequencies. In addition, in order to reduce a louder sound using the porous sound absorbing body, it is necessary to use a large amount of the porous sound absorbing body, and it is difficult to reduce the size and weight.

In addition, as a means for reducing a specific frequency sound more significantly, a sound reduction means using membrane vibration is known.

Here, with a further increase in speed and output of various electronic apparatus, a frequency of noise generated by the above-described electronic circuits and electric motors has become higher. In a case of reducing a high frequency sound by the sound reduction means using membrane vibration, it is considered to increase a specific frequency of the membrane vibration by adjusting a hardness and a size of the membrane-like member.

However, according to the study of the present inventors, it is found that, in the sound reduction means using the membrane vibration, in a case where the specific frequency of the membrane vibration is increased by adjusting a hardness and size of the membrane, a sound absorption coefficient becomes low at a high frequency.

Specifically, in order to absorb the high frequency sound, it is necessary to increase the specific frequency of the membrane vibration. Here, in the sound reduction means using a membrane vibration in the related art, a sound is absorbed mainly by using the membrane vibration in the fundamental vibration mode. In a case where using the membrane vibration in the fundamental vibration mode, it is necessary to increase a frequency (primary specific frequency) in the fundamental vibration mode by making the membrane-like member harder (or thicker).

However, according to the study of the present inventors, in a case where the membrane-like member is excessively hard (or excessively thick), a sound tends to be reflected by the membrane. Therefore, as shown in FIG. 4, as the frequency in the fundamental vibration mode increases, the absorption of sound (sound absorption coefficient) due to the membrane vibration decreases.

As the frequency of the sound becomes higher, the force that interacts with the membrane vibration becomes smaller, but the membrane-like member needs to be made harder for the higher frequency. Hardening the membrane-like member leads to greater reflection at the membrane surface. It is considered that since the higher the frequency of the sound, the harder the membrane-like member is required for resonance, most of the sound is reflected by the membrane surface instead of being absorbed by the resonance vibration, so that the absorption is reduced.

Therefore, it is clear that a large sound absorption at a high frequency is difficult with the sound reduction means using the membrane vibration using the fundamental vibration mode based on the design theory of the related art. These properties are not suitably used in the sound reduction of a specific sound with a high frequency.

Figure 4:
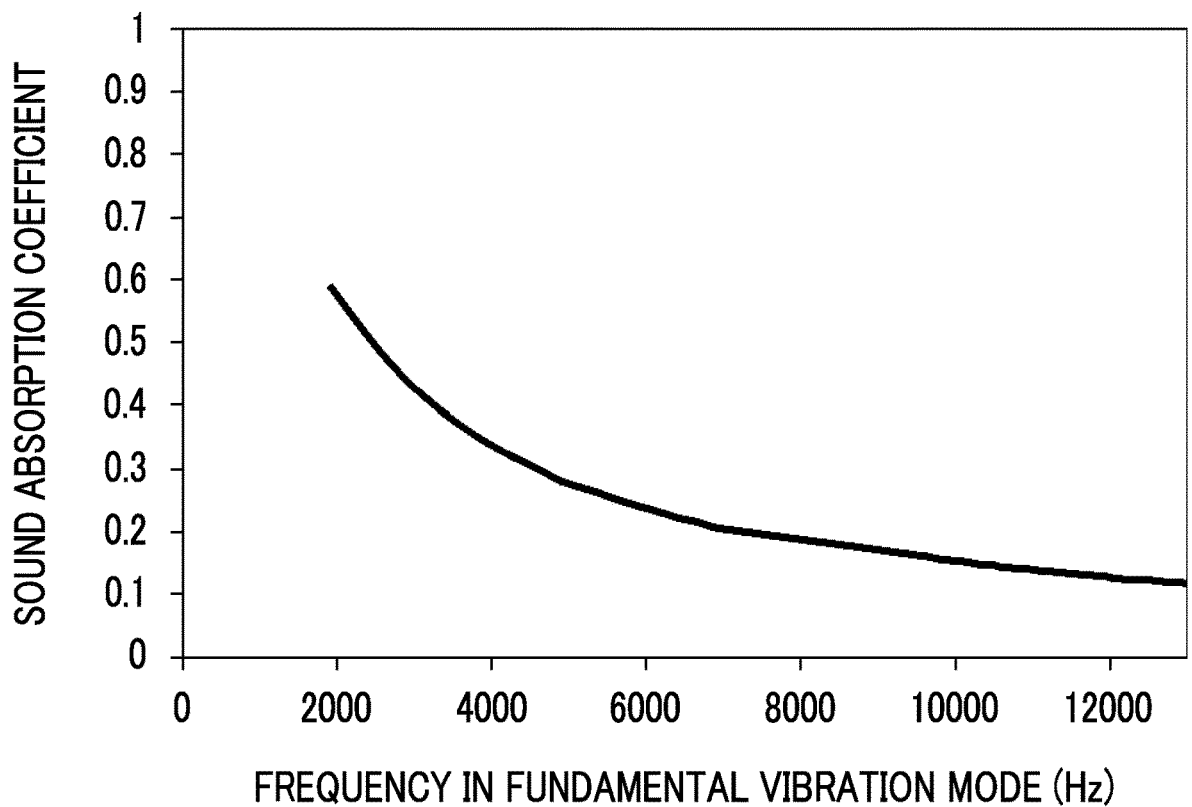
FIG. 4 is a graph showing a relationship between a frequency in a fundamental vibration mode and a sound absorption coefficient.

A graph shown in FIG. 4 is a result of a simulation performed using finite element method calculation software COMSOL ver.5.3 (COMSOL Inc.). A calculation model is set to a two-dimensional axially symmetric structure calculation model, a frame is set to cylindrical, a diameter of an opening portion is set to 10 mm, and a thickness of a rear surface space is set to 20 mm. A thickness of a membrane-like member is set to 250 µm, and a Young's modulus, which is a parameter indicating a hardness of the membrane-like member, is variously changed in a range of 0.2 GPa to 10 GPa. The evaluation is performed in a normal incidence sound absorption coefficient arrangement, and the maximum value of the sound absorption coefficient and the frequency at that time are calculated.

On the other hand, in the first sound absorbing portion of the soundproof structure 10 according to the embodiment of the present invention, as a preferable aspect, a sound absorption coefficient of the membrane vibration of the membrane-like member 12 at a frequency in at least one high-order vibration mode existing at 1 kHz or higher is higher than a sound absorption coefficient at a frequency in a fundamental vibration mode.

The first sound absorbing portion is configured to increase the sound absorption coefficient at a frequency in a high-order vibration mode, that is, at a high-order specific frequency such as a secondary or tertiary-order specific frequency to absorb the sound by the membrane vibration of the high-order vibration mode. Therefore, since it is not necessary to make the membrane-like member hard (or thick), it is possible to suppress the sound from being reflected by the membrane surface and to obtain a high sound absorbing effect even at a high frequency.

In addition, since the first sound absorbing portion having a single-layer membrane structure absorbs a sound using the membrane vibration, it can appropriately reduce a specific frequency sound while being small and light.

The present inventors have surmised a mechanism of exciting the high-order vibration mode as follows.

There are frequency bands in the fundamental vibration mode and the high-order vibration mode determined by the conditions of the membrane-like member (thickness, hardness, size, fixing method, and the like), and a distance of the rear surface space determines which mode in which the frequency is strongly excited to contribute to the sound absorption. This will be described below.

In a case where resonance of a sound absorbing structure using the membrane-like member is considered separately, there are a portion where the membrane-like member is involved and a portion where the rear surface space is involved. Accordingly, the sound absorption occurs by an interaction between these.

In a case where an acoustic impedance of the membrane-like member is denoted by Zm and an acoustic impedance of the rear surface space is denoted by Zb in terms of mathematical expressions, a total acoustic impedance is expressed as $Zt=Zm+Zb$. A resonance phenomenon occurs in a case where the total acoustic impedance coincides with an acoustic impedance of a fluid (such as air). Here, the acoustic impedance Zm of the membrane-like member is determined by specification of the membrane-like member. For example, the resonance in the fundamental vibration mode occurs, in a case where a component (mass law) according to the equation of motion due to a mass of the membrane-like member, and a component (stiffness law) under the control of tension such as a spring due to the fixation of the membrane-like member coincide with each other. In the same manner as described above, in the high-order vibration mode, the resonance also occurs due to a more complicated form of the membrane vibration than the fundamental vibration.

In a case where a high-order vibration mode is less likely to occur in the membrane-like member, such as in a case where the membrane-like member has a large thickness, the band in the fundamental vibration mode becomes wider. However, as described above, the sound absorption is reduced since the membrane-like member is hard and easily reflects. Under conditions where the high-order vibration mode is likely to occur in the membrane-like member, such as by reducing the thickness of the membrane-like member, the frequency bandwidth in which the fundamental vibration mode occurs becomes smaller, and the high-order vibration mode is in a high frequency range.

The acoustic impedance Zb of one rear surface space is different from the impedance of the open space because the flow of an airborne sound is restricted by the closed space or the through-hole portion. For example, an effect of hardening of the rear surface space is obtained, as the thickness of the rear surface space becomes smaller. Qualitatively, as the rear surface distance becomes shorter, it becomes a distance suitable for a sound with a shorter wavelength, that is, a high frequency sound. In this case, a sound at a lower frequency has a smaller resonance because the rear surface space is too small with respect to the wavelength. That is, a change in rear surface distance determines which frequency of sound can be resonated.

Summarizing these, it is determined in which frequency band the fundamental vibration occurs depending on the specification of the membrane-like member, and in another band, the high-order vibration occurs. The rear surface space determines which frequency band of sound is easily excited, and accordingly, by setting this to a frequency corresponding to high-order vibration, it is possible to increase the sound absorption coefficient caused by the high-order vibration mode. This is a sound absorbing mechanism of the first sound absorbing portion.

Therefore, it is necessary to determine both the membrane-like member and the rear surface space so as to excite the high-order vibration mode.

In regard to this point, a simulation is performed using an acoustic module of the finite element method calculation software COMSOL ver.5.3 (COMSOL Inc.).

The calculation model of the soundproof structure 10 will be described. A frame is set to a cylindrical shape, a diameter of an opening portion is set to 20 mm, a thickness of a membrane-like member is set to 50 μm, and a Young's modulus of the membrane-like member is set to 4.5 GPa which is a Young's modulus of a polyethylene terephthalate film (PET). The calculation model is a two-dimensional axially symmetric structure calculation model.

In the above calculation model, the thickness of the rear surface space is changed from 10 mm to 0.5 mm in increments of 0.5 mm, and the coupled calculation of sound and structure is performed, the structural calculation is performed regarding the membrane-like member, and numerical calculation regarding the rear surface space is performed by calculating the airborne of the sound. The evaluation is performed in a normal incidence sound absorption coefficient arrangement, and a maximum value of a sound absorption coefficient and a frequency at that time are calculated.

Figure 5:
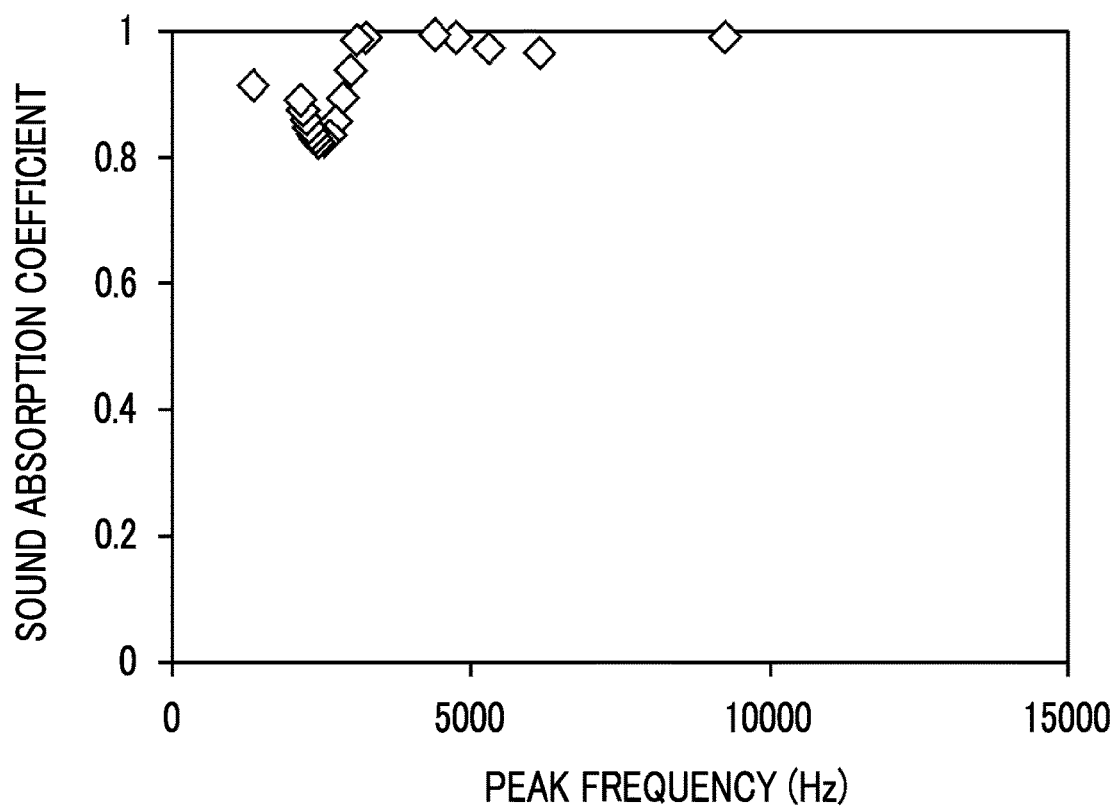
FIG. 5 is a graph showing a relationship between a peak frequency and a sound absorption coefficient.

The results thereof are shown in FIG. 5. FIG. 5 is a graph in which a frequency at which a sound absorption coefficient is maximum in each calculation model (hereinafter, referred to as a peak frequency) and a sound absorption coefficient at this peak frequency are plotted. In FIG. 5, a point plotted on the leftmost side is a case where the thickness of the rear surface space is 10 mm, and a point plotted on the rightmost side is a case where the thickness of the rear surface space is 0.5 mm.

As shown in FIG. 5, it is found that a high sound absorption coefficient can be obtained even at a high frequency.

In addition, the order of the vibration mode of the peak frequency in each calculation model is analyzed.

Figure 6:
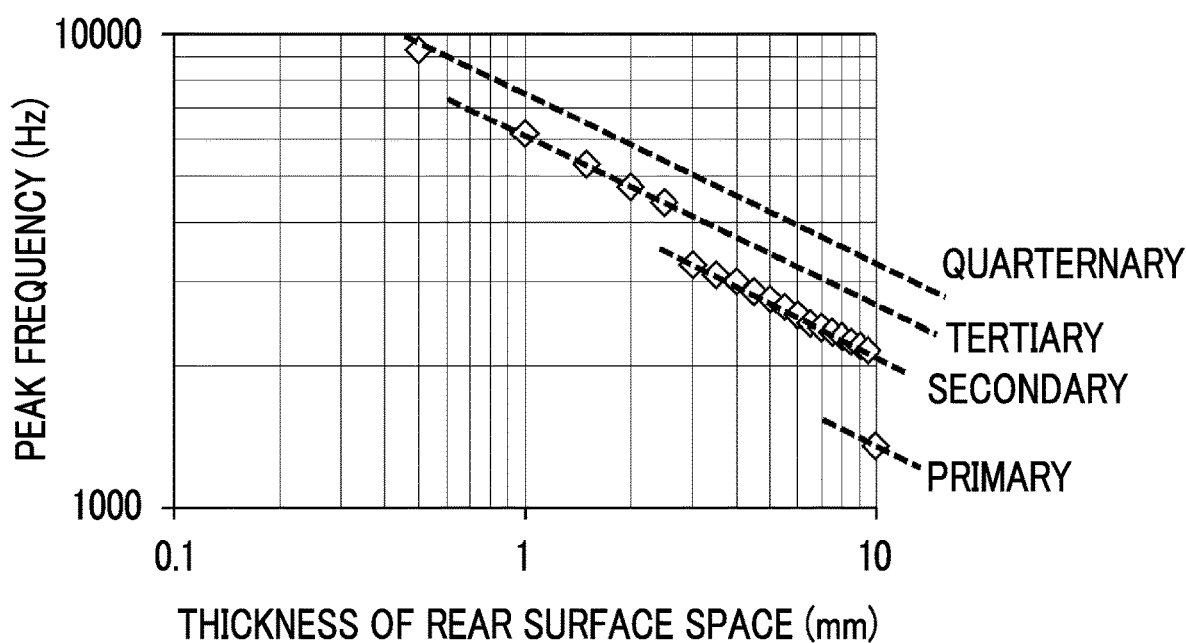
FIG. 6 is a graph showing a relationship between a thickness of a rear surface space and a peak frequency.
Figure 7:
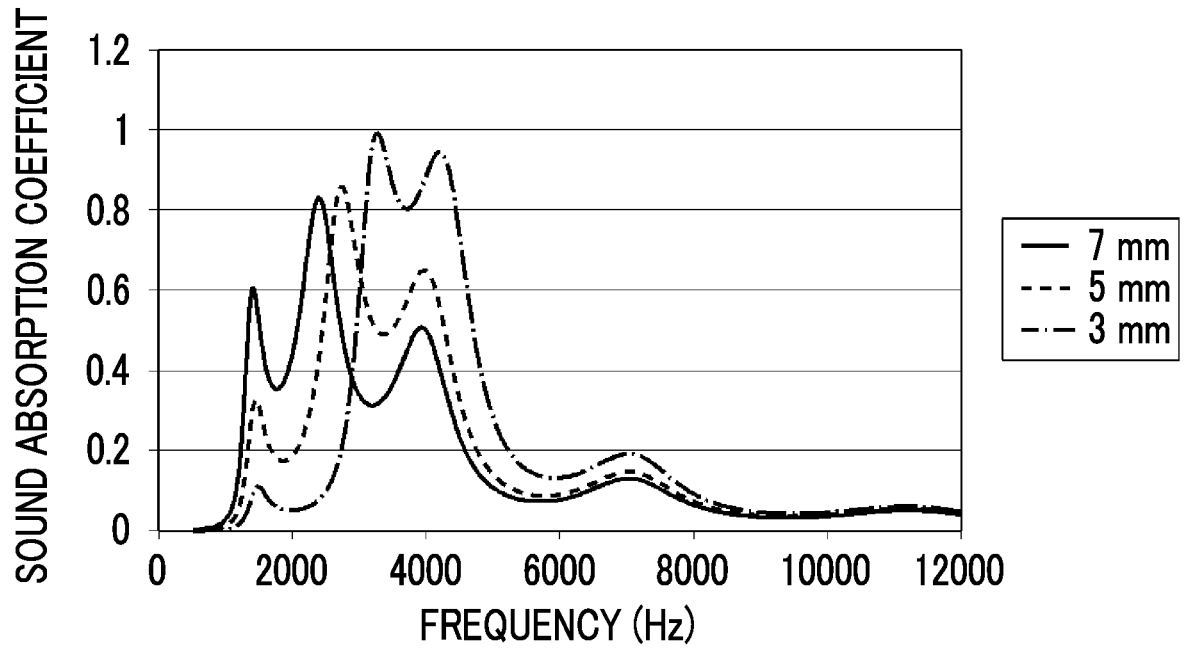
FIG. 7 is a graph showing a relationship between a frequency and a sound absorption coefficient.
Figure 8:
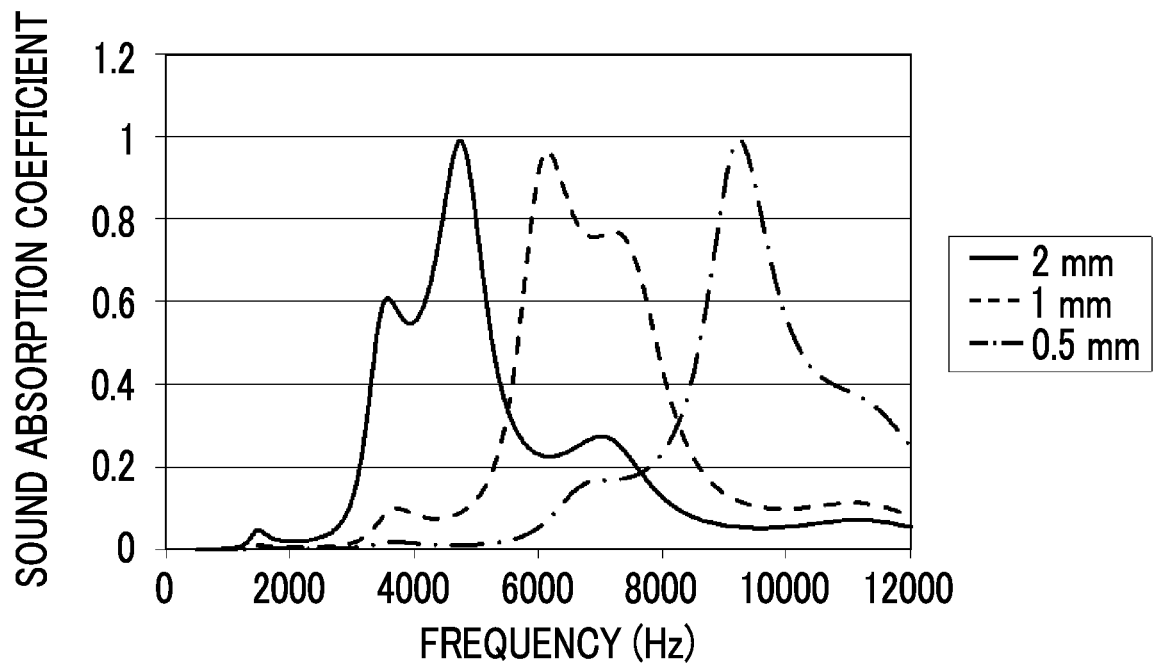
FIG. 8 is a graph showing a relationship between a frequency and a sound absorption coefficient.

FIG. 6 shows a graph in which a relationship between a peak frequency of each calculation model and a thickness of a rear surface space is plotted in a log-log graph, and a line is drawn for each order of the vibration mode. FIGS. 7 and 8 are graphs showing a relationship between a frequency and a sound absorption coefficient in each calculation model in a case where the thickness of the rear surface space is 7 mm, 5 mm, 3 mm, 2 mm, 1 mm, and 0.5 mm.

As clearly seen from FIG. 6, a peak frequency of the sound absorption coefficient is increased by reducing the thickness of the rear surface space. Here, it is found that, as the thickness of the rear surface space is reduced, the peak frequency is not continuously increased on the log-log axes, but a plurality of discontinuous changes are generated on the log-log axes. These properties indicate that the vibration mode in which the sound absorption coefficient becomes maximum shifts from the fundamental vibration mode to the high-order vibration mode or a higher-order vibration mode of the high-order vibration mode. That is, it is found that the high-order vibration mode is easily excited by the thin membrane-like member, and that the effect of the sound absorption by the high-order vibration mode rather than the fundamental vibration mode is significantly exhibited by reducing the thickness of the rear surface space. Therefore, a large sound absorption coefficient in a high frequency range is not caused by the fundamental vibration mode, but is caused by resonance in the high-order vibration mode. As can be seen from a line drawn for each order of the vibration mode shown in FIG. 6, as the thickness of the rear surface space becomes thinner, the frequency in the higher-order vibration mode becomes a peak frequency, that is, a frequency in which the sound absorption coefficient is maximum.

Here, the reason why the high-order vibration mode has appeared is particularly important in that the membrane thickness of the membrane-like member is reduced to 50 μm. The high-order vibration mode has a complicated vibration pattern on the membrane as compared with the fundamental vibration mode. That is, it has antinodes of a plurality of amplitudes on the membrane. Therefore, it is necessary to bend in a smaller plane size as compared with the fundamental vibration mode, and there are many vibration modes that need to bend near the membrane fixing portion (the edge portion of the membrane-like member). Since the smaller the thickness of the membrane is, the more easily it bends, it is important to reduce the membrane thickness in order to use the high-order vibration mode. In addition, by reducing the length of the rear surface space to several mm, a system is obtained in which the sound absorption can be efficiently excited in the high-order vibration mode than in the fundamental vibration mode, which is the important point.

In addition, a configuration in which the membrane thickness is thin is a system in which the hardness of the membrane-like member is thin. In such a system, it is considered that the reflection on the high frequency sound is reduced, so that a large sound absorption coefficient can be obtained even on the high frequency side.

It is found from FIGS. 7 and 8 that, in each calculation model, the sound absorption coefficient has maximum values (peaks) at a plurality of frequencies. The frequency at which the sound absorption coefficient has a maximum value is a frequency in a certain vibration mode. Among these, the lowest frequency of approximately 1,500 Hz is a frequency in the fundamental vibration mode. That is, all of the calculation models have the frequency of the fundamental vibration mode as approximately 1,500 Hz. In addition, a frequency having the maximum value existing at a frequency higher than the fundamental vibration mode of 1,500 Hz is the frequency in the high-order vibration mode. In all of the calculation models, the sound absorption coefficient at the frequency in the high-order vibration mode is higher than the sound absorption coefficient at the frequency in the fundamental vibration mode.

It is found from FIGS. 7 and 8 that the thinner the thickness of the rear surface space, the lower the sound absorption coefficient at the frequency in the fundamental vibration mode, and the higher the sound absorption coefficient at the frequency in the high-order vibration mode.

In addition, it is found that in a case where the thickness of the rear surface space of FIG. 8 is 0.5 mm, a large sound absorption coefficient of almost 100% can be obtained in an extremely high frequency band of 9 kHz or higher.

It is found from FIGS. 7 and 8 that there are a plurality of high-order vibration modes, each of which has a high sound absorption peak (maximum value of the sound absorption coefficient) at each frequency. Therefore, it is also found that the high sound absorption peaks are overlapped and exhibit a sound absorbing effect over a comparatively wide band.

It is found from the above that a higher sound absorbing effect can be obtained even at a higher frequency by adopting a configuration in which the sound absorption coefficient at the frequency in the high-order vibration mode is higher than the sound absorption coefficient at the frequency in the fundamental vibration mode.

As is well known, the fundamental vibration mode is a vibration mode that appears on the lowest frequency side, and the high-order vibration mode is a vibration mode other than the fundamental vibration mode.

Whether the vibration mode is the fundamental vibration mode or the high-order vibration mode can be determined from the state of the membrane-like member 12. In the membrane vibration in the fundamental vibration mode, the center of gravity of the membrane-like member 12 has the largest amplitude, and the amplitude around a fixed end portion (edge portion) in the periphery is small. In addition, the membrane-like member 12 has a velocity in the same direction in all regions. On the other hand, in the membrane vibration in the high-order vibration mode, the membrane-like member 12 has a portion having a velocity in a direction opposite depending on a position.

Alternatively, in the fundamental vibration mode, the edge portion of the fixed membrane-like member 12 becomes a node of vibration, and no node exists on the membrane portion 12a. On the other hand, in the high-order vibration mode, since there is a portion that becomes a node of vibration on the membrane portion 12a in addition to the edge portion (fixed end portion) according to the above definition, it can be actually measured by the method described below.

In the analysis of the vibration mode, direct observation of the vibration mode is possible by measuring the membrane vibration using laser interference. Alternatively, the position of the node is visualized by scattering salt or white fine particles on the membrane surface and vibrating the membrane surface, so that direct observation is possible even by using this method. This visualization of the vibration mode is known as the Chladni figure.

In addition, in a case of a circular membrane or a rectangular membrane, the frequency in each vibration mode can be obtained analytically. Further, in a case of using a numerical calculation method such as a finite element method calculation, the frequency in each vibration mode for any membrane shape can be obtained.

The sound absorption coefficient can be obtained by sound absorption coefficient evaluation using an acoustic tube. The evaluation is performed by producing a measurement system for the normal incidence sound absorption coefficient based on JIS A 1405-2. The same measurement can be performed using WinZacMTX manufactured by Japan Acoustic Engineering. An inner diameter of the acoustic tube is set to 20 mm, and a soundproof structure to be measured is disposed at an end portion of the acoustic tube in a state where the outer end surface faces a front side (acoustic incident side) to measure a reflectivity, and (1-reflectivity) is obtained to evaluate the sound absorption coefficient.

The smaller the diameter of the acoustic tube, the higher the frequency can be measured. In this case, the acoustic tube having a diameter of 20 mm is selected because it is necessary to measure the sound absorption coefficient properties up to high frequencies.

By the way, in order to have a configuration in which a sound absorption coefficient of the vibration of the membrane-like member 12 at a frequency in at least one high-order vibration mode is higher than a sound absorption coefficient at a frequency in a fundamental vibration mode, a thickness of the rear surface space 24, a size, a thickness, a hardness, or density of the membrane-like member 12, and the like may be adjusted.

Specifically, the thickness of the rear surface space 24 (La in FIG. 3) is preferably 10 mm or less, more preferably 5 mm or less, even more preferably 2 mm or less, and particularly preferably 1 mm or less.

In a case where the thickness of the rear surface space 24 is not uniform, an average value may be within the above range.

The thickness of the membrane-like member 12 is preferably less than 100 μm, more preferably 70 μm or less, and even more preferably 50 μm or less. In a case where the thickness of the membrane-like member 12 is not uniform, an average value may be within the above range.

The Young's modulus of the membrane-like member 12 is preferably from 1 MPa to 100 GPa, more preferably from 10 MPa to 50 GPa, and most preferably from 100 MPa to 30 GPa.

The density of the membrane-like member 12 is preferably 10 kg/m$^3$ to 30,000 kg/m$^3$, more preferably 100 kg/m$^3$ to 20,000 kg/m$^3$, and most preferably 500 kg/m$^3$ to 10,000 kg/m$^3$.

A shape of the membrane portion 12a of the membrane-like member 12 (shape of a region where the membrane vibrates), in other words, a shape of an opening cross section of the frame (the inner frame 18 and outer frame 19) is not particularly limited and may be, for example, a polygonal shape including a square such as a square, a rectangle, a rhombus, or a parallelogram, a triangle such as a regular triangle, an isosceles triangle, or a right triangle, a regular polygon such as a regular pentagon or a regular hexagon, a circle, an ellipse, or an indeterminate shape.

The size of the membrane portion 12a of the membrane-like member 12 (the size of the region where the membrane vibrates), in other words, the size of an opening cross section of the frame is preferably 1 mm to 100 mm, more preferably 3 mm to 70 mm, and even more preferably 5 mm to 50 mm, in terms of an equivalent circle diameter (Lc in FIG. 3).

In addition, the sound absorption coefficient at the frequency in at least one high-order vibration mode, which has a higher sound absorption coefficient than the sound absorption coefficient at the frequency in the fundamental vibration mode, is preferably 20% or more, and more preferably 30% or more, even more preferably 50% or more, particularly preferably 70% or more, and most preferably 90% or more.

In the following description, a high-order vibration mode having a higher sound absorption coefficient than the sound absorption coefficient at the frequency of the fundamental vibration mode is simply referred to as a "high-order vibration mode", and the frequency thereof is simply referred to as a "frequency in the high-order vibration mode".

In addition, it is preferable that each of sound absorption coefficients at frequencies in two or more high-order vibration modes is 20% or more.

By setting the sound absorption coefficient to be 20% or more at frequencies in a plurality of high-order vibration mode, a sound can be absorbed at a plurality of frequencies.

In addition, a vibration mode in which high-order vibration modes having sound absorption coefficients of 20% or more continuously exist is preferable. That is, for example, it is preferable that the sound absorption coefficient at the frequency in the secondary vibration mode and the sound absorption coefficient at the frequency in the tertiary vibration mode are respectively 20% or more.

Furthermore, in a case where there are continuous high-order vibration modes in which the sound absorption coefficient is 20% or more, it is preferable that the sound absorption coefficient is 20% or more in the entire band between the frequencies of these high-order vibration modes.

Accordingly, a sound absorbing effect in a wide band can be obtained.

(About Second Sound Absorbing Portion)

As described above, the second sound absorbing portion is a sound absorbing portion configured with the plate-like member 14, the inner frame 18, and the first space 26. In the second sound absorbing portion, Helmholtz resonance is generated and a sound is absorbed by the through-hole 14a formed in the plate-like member 14 and the first space 26.

As is well known, the fundamental frequency of Helmholtz resonance is determined by an opening area of the through-hole, the length of the through-hole, and the volume of the first space. In addition, the single Helmholtz resonance has basically a structure that absorbs a sound in a band centered at one frequency depending on a frequency of a fundamental resonance mode, and a high-order resonance mode does not occur.

(About Interaction Between First Sound Absorbing Portion and Second Sound Absorbing Portion)

The interaction between the first sound absorbing portion and the second sound absorbing portion is obtained by vibrating both the membrane vibration of the membrane-like member 12 in the first sound absorbing portion and air vibration by the Helmholtz resonance in the second sound absorbing portion with the rear surface space 24 sandwiched therebetween at the same time. In this case, there are a mode in which the membrane vibration and the Helmholtz resonance provide phase variations in the same direction to absorb a sound (that is, the vibration direction of the membrane and phase of sound passing through a Helmholtz neck portion are in the same direction) and a mode in which the membrane vibration and the Helmholtz resonance provide phase variations in the opposite direction to absorb a sound (that is, the vibration direction of the membrane and phase of sound passing through a Helmholtz neck portion are in opposite directions). The mode in which the membrane vibration and the Helmholtz resonance provide phase variations in the same direction to absorb a sound absorbs a sound on a low frequency side, and the mode in which the membrane vibration and the Helmholtz resonance provide phase variations in the opposite direction to absorb a sound absorbs a sound on a high frequency side. Here, in the mode in which the membrane vibration and the Helmholtz resonance provide phase variations in the opposite direction to absorb a sound on a high frequency side, a sound is absorbed in a frequency band (for example, 8 kHz to 9 kHz) higher than the sound absorption by a single membrane vibration of the membrane-like member 12 of the first sound absorbing portion and the sound absorption by a single Helmholtz resonance of the second sound absorbing portion.

This point will be described in more detail with reference to FIGS. 9 and 10.

Figure 9:
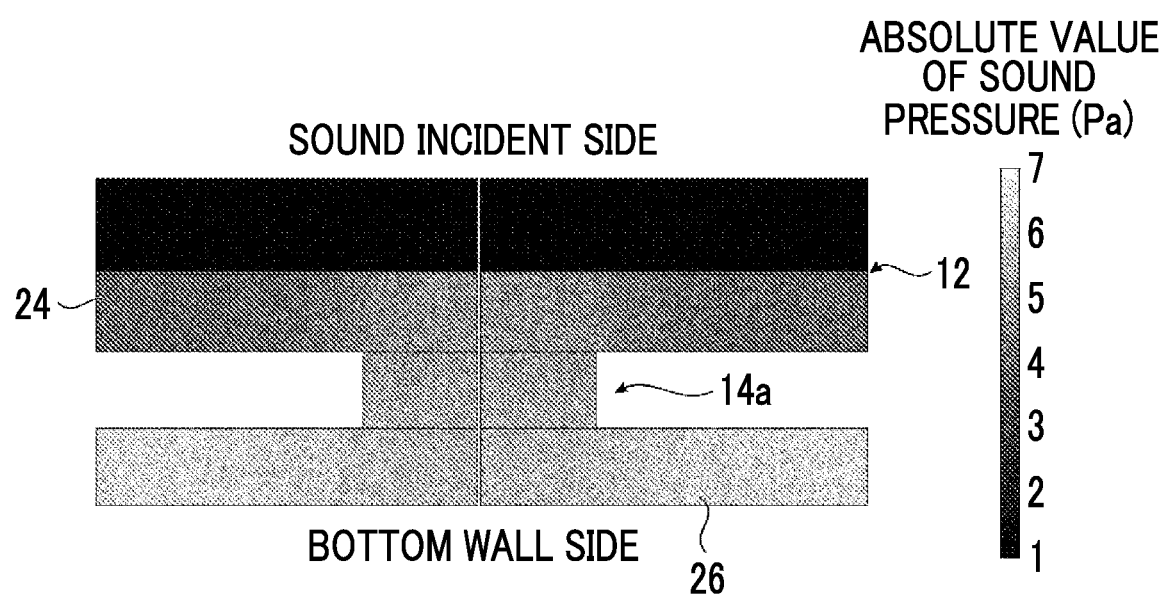
FIG. 9 is a diagram showing a distribution of sound pressure in the soundproof structure.
Figure 10:
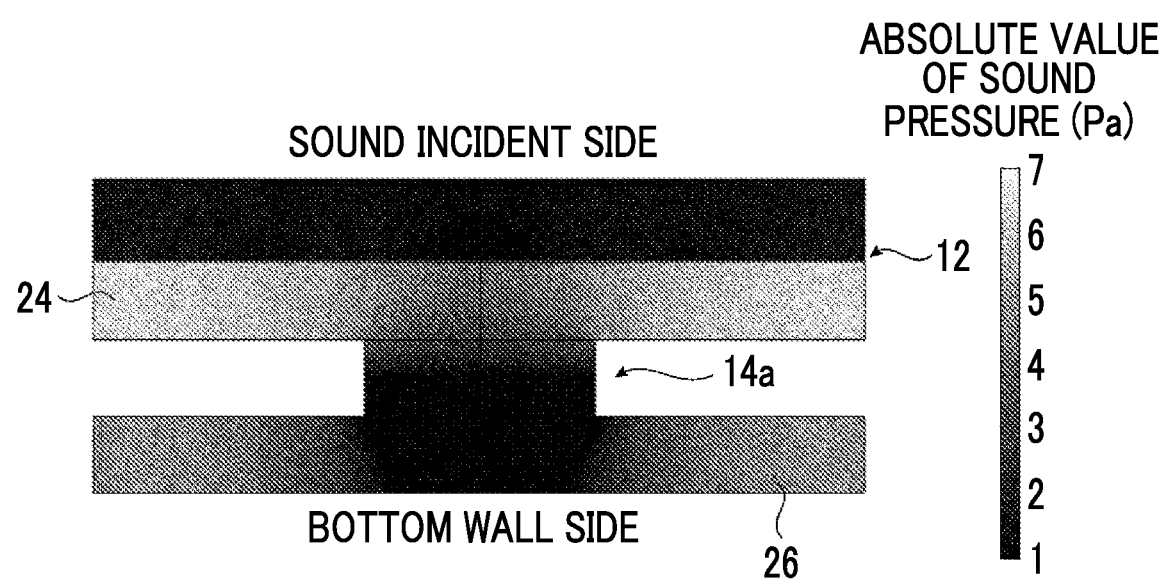
FIG. 10 is a diagram showing a distribution of sound pressure in the soundproof structure.

FIGS. 9 and 10 are diagrams showing the distribution of sound pressure in the soundproof structure in a case where a sound having each frequency of 2.7 kHz and 7.4 kHz and a sound pressure of 1 Pa is incident on the soundproof structure having a configuration in which the fundamental frequency of the membrane vibration in the single first sound absorbing portion is 1.7 kHz and the fundamental frequency of Helmholtz resonance in the single second sound absorbing portion is 4.5 kHz from the upper side in the drawing. As is well known, the sound pressure is a fluctuation of a pressure due to a sound from the atmospheric pressure.

For example, in a case where a sound around 2.7 kHz is incident on the soundproof structure, the membrane vibration and the Helmholtz resonance provide phase variations in the same direction to absorb a sound. At that time, as shown in FIG. 9, the sound pressure in the rear surface space 24 of the membrane-like member 12, the first space 26 constituting a Helmholtz resonator, and the through-hole 14a of the plate-like member 14 becomes high.

On the other hand, in a case where a sound having a frequency of 8.6 kHz, which is higher than the fundamental frequency of the membrane vibration of the single first sound absorbing portion and the fundamental frequency of the Helmholtz resonance of the single second sound absorbing portion is incident on the soundproof structure, he sound pressure in the rear surface space 24 between the plate-like member 14 and the membrane-like member 12 increases as shown in FIG. 10.

This is because the membrane vibration of the membrane-like member 12 of the first sound absorbing portion and the air vibration due to the Helmholtz resonance of the second sound absorbing portion vibrate so as to be phase in the opposite direction each other. As a result, sounds in the vertical direction in a space between the two intermediate regions cancel each other. As a result, in the rear surface space 24, a sound component in the horizontal direction increases, and the sound pressure increases. As described above, the cancellation of the phase relationship in the opposite direction becomes vibration equivalent to a decrease in the thickness of the rear surface space 24, and the membrane-like member 12 vibrates in a higher-order vibration mode, thereby absorbing a sound on the high frequency side.

FIGS. 9 and 10 all show the results of simulations performed using the acoustic module of the finite element method calculation software COMSOL ver. 5.3 (COMSOL Inc.). Specifically, the soundproof structure in which the circular membrane-like member 12, the outer frame 19, the plate-like member 14, and the inner frame 18 are laminated in this order is modeled and thereby a coupled acoustic-structure analysis calculation is performed. At this time, the simulation is performed in such a manner that a structural calculation is performed for the membrane-like member 12, and the airborne sound is calculated for the rear surface space 24 and the first space 26. The calculation model is a two-dimensional axially symmetric structure calculation model. FIGS. 9 and 10 are displayed by joining the right and left axisymmetric views. In addition, a thermal viscous acoustic calculation is performed inside the through-hole in which Helmholtz resonance occurs, and thereby the calculation is accurately performed including frictional heat absorption due to viscous friction. The calculation is performed by coupling these physical modes.

In addition, regarding the calculation model of the soundproof structure 10, the inner frame 18 and the outer frame 19 are set as a cylindrical shape, and diameters of the opening portion 20 and the opening portion 40 are set to 20 mm. The thickness of the membrane-like member 12 is set to 50 μm, and a Young's modulus thereof is set to 4.5 GPa which is a Young's modulus of a polyethylene terephthalate (PET) film. The thickness of the plate-like member 14 is set to 2 mm, and the through-hole 14a having a diameter of 6 mm is formed at the center.

Additionally, the thickness of each of the rear surface space 24 and the first space 26 is set to 2 mm.

The evaluation is performed in a normal incidence sound absorption coefficient arrangement, and the maximum value of the sound absorption coefficient and the frequency at that time are calculated.

As described above, in the soundproof structure 10 according to the embodiment of the present invention, the first sound absorbing portion and the second sound absorbing portion are overlapped with each other, and the membrane vibration of the membrane-like member 12 and the air vibration due to the Helmholtz resonance vibrate in opposite phases to each other, so that the sound pressure in the rear surface space 24 is increased. As a result, it is possible to absorb a higher frequency sound. As a result, the soundproof structure 10 according to the embodiment of the present invention can absorb a sound at the same time in a sound absorbing region on a low frequency side where the membrane vibration and the Helmholtz resonance provide phase variations in the same direction to absorb a sound, and in a sound absorbing region on a high frequency side where the membrane vibration and the Helmholtz resonance provide phase variations in opposite directions to absorb a sound. Therefore, a sound can be absorbed over a wider band. The effectiveness of the soundproof structure 10 according to the embodiment of the present invention will be described in detail below with reference to FIGS. 11 to 15.

Figure 11:
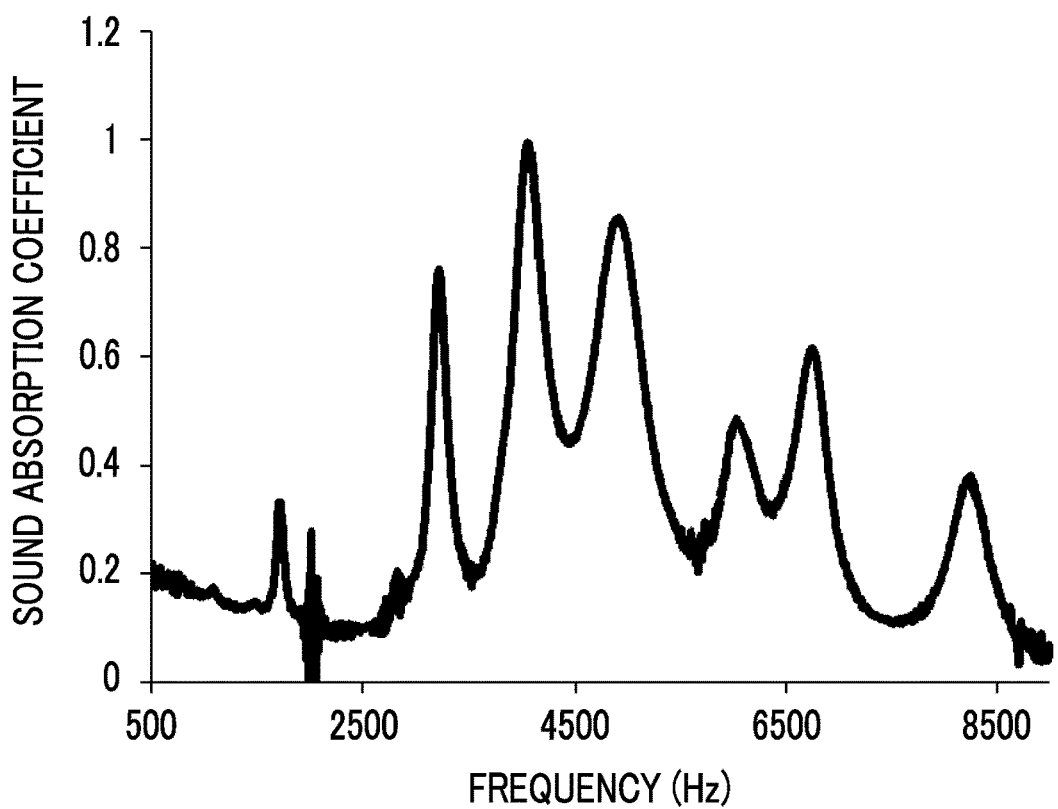
FIG. 11 is a graph showing a relationship between a frequency and a sound absorption coefficient.

FIG. 11 is Reference Example 1, and is a graph showing a relationship between a frequency and a sound absorption coefficient in a case where the plate-like member 14 is a rigid body having no through-hole formed therein in a soundproof structure (that is, a soundproof structure consisting of only a single-layer membrane structure without comprising the inner frame 18, and the first space 26, and hereinafter also referred to as a "soundproof structure of single membrane vibration") comprising only the first sound absorbing portion.

Figure 12:
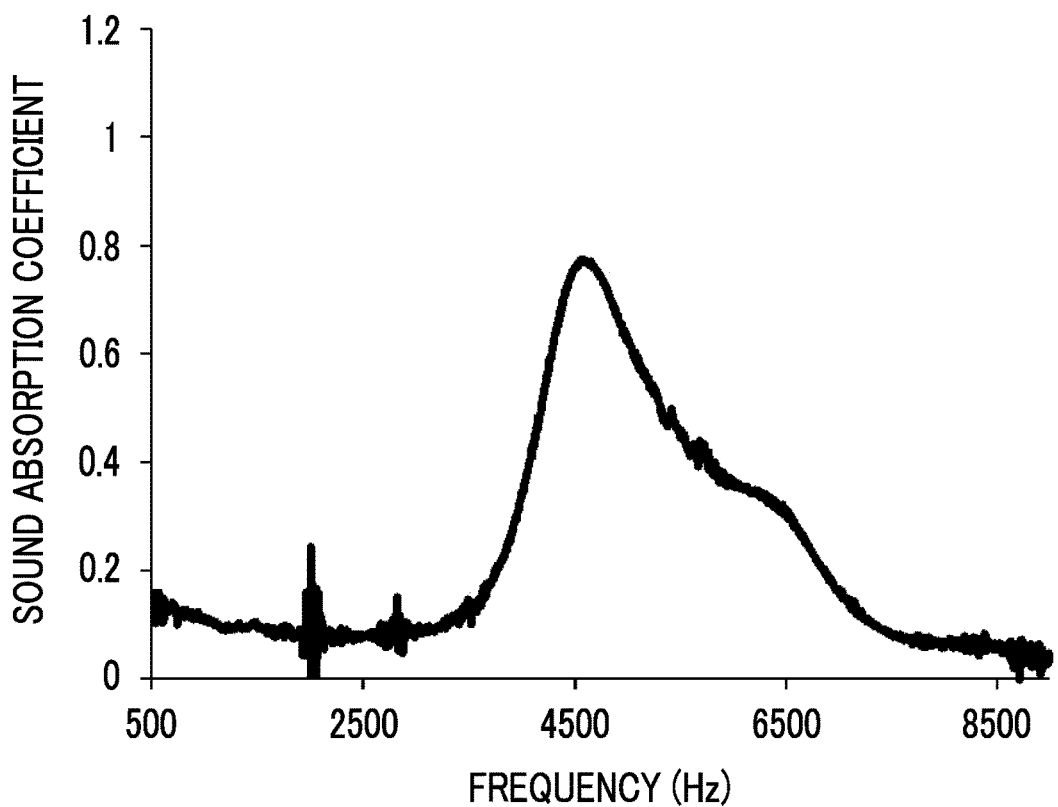
FIG. 12 is a graph showing a relationship between a frequency and a sound absorption coefficient.

FIG. 12 is Reference Example 2, and a graph showing a relationship between a frequency and a sound absorption coefficient in a soundproof structure (that is, a single Helmholtz resonator not comprising the membrane-like member 12, the outer frame 19, and the rear surface space 24, and hereinafter also referred to as a "soundproof structure of the single Helmholtz resonance") comprising only the second sound absorbing portion.

Figure 13:
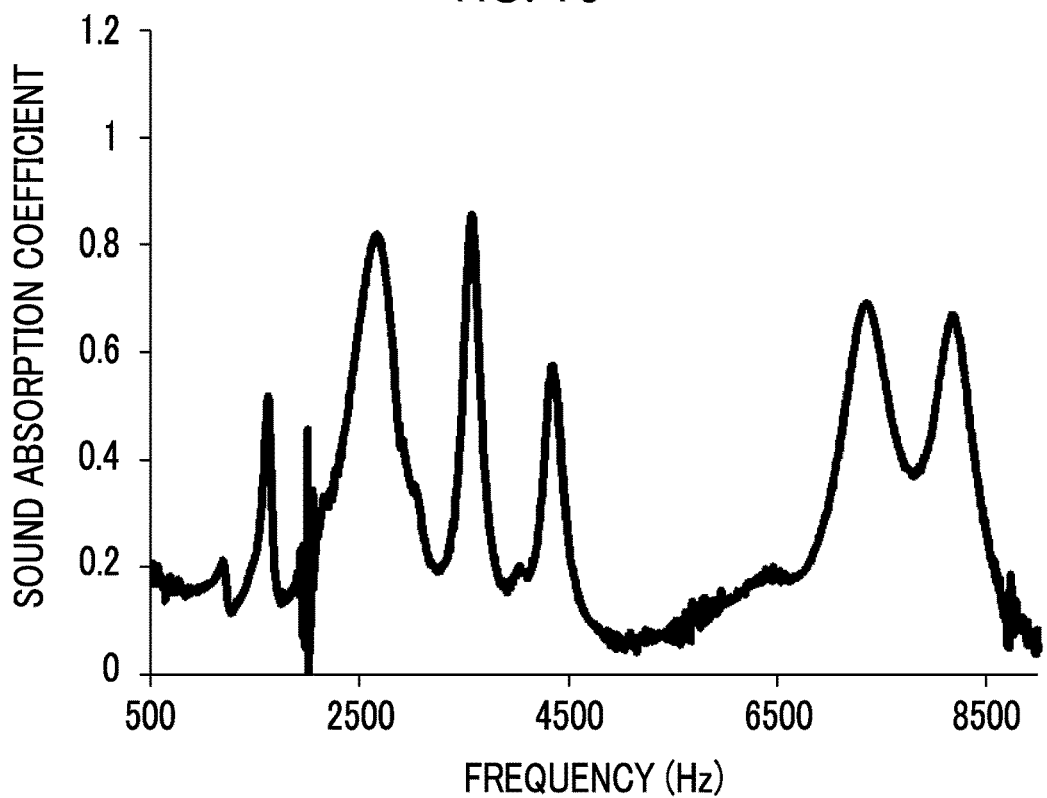
FIG. 13 is a graph showing a relationship between a frequency and a sound absorption coefficient.
Figure 14:
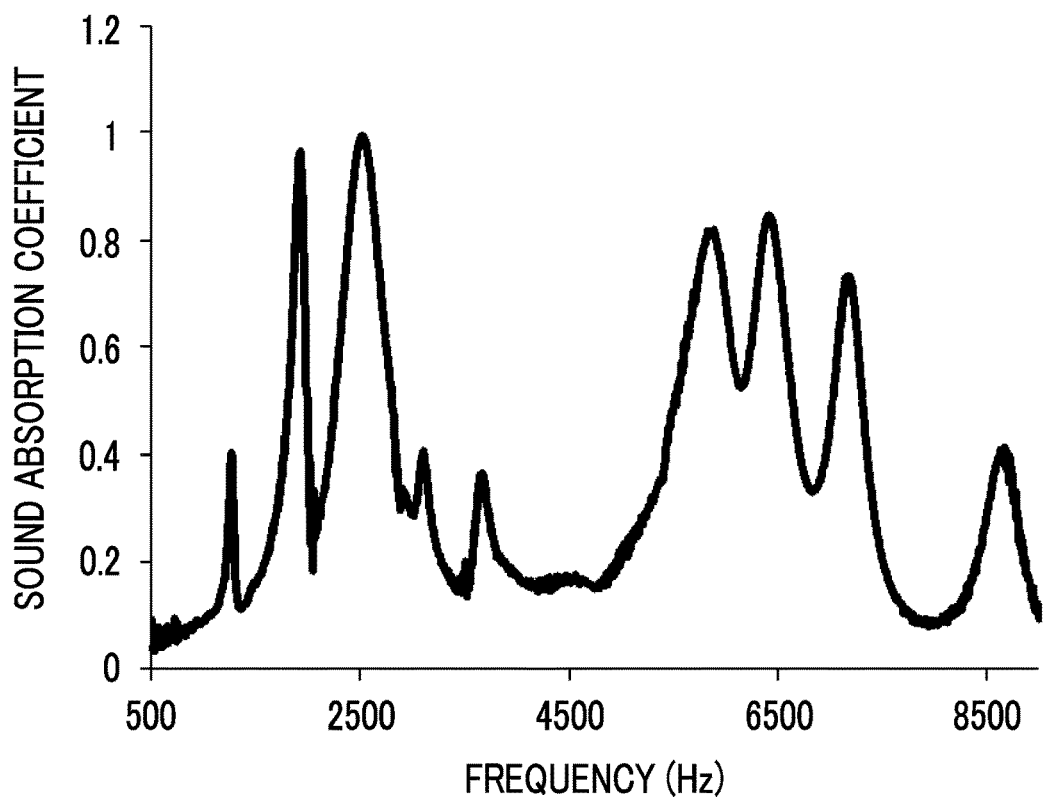
FIG. 14 is a graph showing a relationship between a frequency and a sound absorption coefficient.
Figure 15:
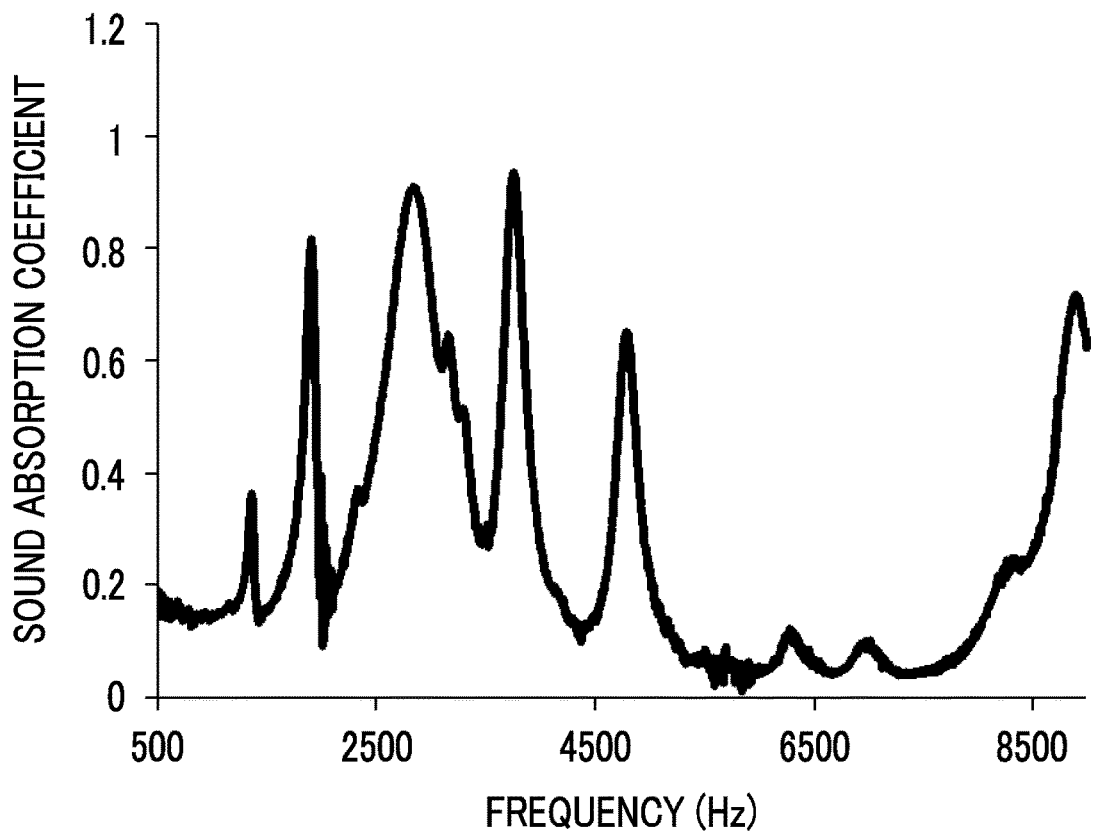
FIG. 15 is a graph showing a relationship between a frequency and a sound absorption coefficient.

FIGS. 13 to 15 are graphs showing the relationship between the frequency and the sound absorption coefficient in Examples 1 to 3 of the soundproof structure 10 according to an example of the present invention, respectively.

The graphs shown in each of FIGS. 11 to 15 are obtained by disposing the soundproof structure at the end portion of the acoustic tube in a state in which the plate-like member (membrane-like member for soundproof structure of the single membrane vibration) faces the front side (acoustic incident side) and measuring the normal incidence sound absorption coefficient and the frequency thereof in accordance with the acoustic tube measurement method described above.

REFERENCE EXAMPLE 1

In the soundproof structure of the single membrane vibration of Reference Example 1, the outer frame 19 is set to a cylindrical acrylic plate, the outer diameter of the outer frame 19 is set to 40 mm, the diameter of the opening portion 40 is set to 20 mm, and the membrane-like member 12 is set to a polyethylene terephthalate (PET) film having a thickness of 50 μm. In addition, the soundproof structure of the single membrane vibration has a structure in which a rear surface plate consisting of a rigid body (aluminum plate having a thickness of 100 mm) is pressed against the bottom surface of the rear surface space 24. That is, in the soundproof structure of the single membrane vibration, the rear surface space 24 is a closed space. The thickness of the rear surface space 24 is 2 mm.

The outer frame 19 is produced by processing an acrylic plate (manufactured by Hikari Co., Ltd.) having a thickness of 2 mm using a laser cutter.

In addition, a PET film is attached to the outer frame 19 and the membrane-like member 12 using a double-sided tape (GENBA NO CHIKARA manufactured by ASKUL Corporation) in a state where an outer edge of the donut-shaped acrylic plate and an outer edge of the PET film coincided with each other.

Therefore, a range in which the membrane-like member can vibrate is 20 mm in diameter, and the end portion thereof has a fixed vibration.

In addition, instead of the structure in which the rigid body consisting of the aluminum plate having the thickness of 100 mm is pressed against the rear surface of the soundproof structure, the normal incidence sound absorption coefficient is similarly measured using the following configuration.

Using a laser cutter, one circular plate having an outer diameter of 40 mm is produced, and in a state where the outer edge of the above-described donut-shaped plate and the outer edge of the circular plate coincide with the outer diameter, the circular plate is bonded to the surface of the donut-shaped plate on the side opposite to the membrane-like member using a double-sided tape (GENBA NO CHIKARA manufactured by ASKUL Corporation) to produce a frame.

Also in the above configuration, the same measurement result as in the structure in which the rigid body consisting of the aluminum plate having the thickness of 100 mm is pressed against the rear surface of the soundproof structure is obtained.

REFERENCE EXAMPLE 2

In the soundproof structure of the single Helmholtz resonance, the inner frame 18 is set to a cylindrical acrylic plate, the outer diameter of the inner frame 18 is set to 40 mm, the diameter of the opening portion 20 is set to 20 mm, and the plate-like member 14 is set to an acrylic plate having a thickness of 2 mm. In addition, the through-hole 14a having a diameter of 6 mm is provided at a central position of the plate-like member 14. In addition, the soundproof structure of the single membrane vibration has a structure in which a rear surface plate consisting of a rigid body (aluminum plate having a thickness of 100 mm) is pressed against the bottom surface of the rear surface space 24. The thickness of the first space 26 is 2 mm.

Additionally, although not shown, a case where the diameter of the through-hole 14a formed in the plate-like member 14 is 4 mm is referred to as Reference Example 3, and a case where the diameter of the through-hole 14a is 8 mm is referred to as Reference Example 4.

EXAMPLES 1 to 3

In a soundproof structure 10 according to an example of the present invention, the inner frame 18, the plate-like member 14, the outer frame 19, and the membrane-like member 12 are disposed in this order from the inside. The inner frame 18 and the outer frame 19 consist of a cylindrical acrylic plate, each outer diameter is 40 mm and the diameter of each opening portion is 20 mm. The membrane-like member 12 is a polyethylene terephthalate (PET) film having a thickness of 50 μm. The plate-like member 14 is an acrylic plate having a thickness of 2 mm, and a through-hole 14a is provided at the central position of the plate-like member 14. In addition, the soundproof structure 10 according to an example of the present invention includes the bottom wall 22 at a bottom portion of the opening portion 20 of the inner frame 18. That is, in the soundproof structure 10 according to an example of the present invention, a space obtained by combining the rear surface space 24 and the first space 26 (hereinafter, also referred to as an internal space of the soundproof structure) is a closed space. In addition, in the soundproof structure 10 according to an example of the present invention, the thickness of each of the rear surface space 24 and the first space 26 is 2 mm.

FIG. 13 is a graph obtained by measuring a relationship between a frequency and a sound absorption coefficient in a case where the diameter of the through-hole 14a formed in the plate-like member 14 is 6 mm, that is, in a case of a configuration in which Reference Example 1 and Reference Example 2 are combined (Example 1). FIG. 14 is a graph obtained by measuring a relationship between a frequency and a sound absorption coefficient in a case where the diameter of the through-hole 14a formed in the plate-like member 14 is 4 mm, that is, in a case of a configuration in which Reference Example 1 and Reference Example 3 are combined (Example 2), and FIG. 15 is a graph obtained by measuring a relationship between a frequency and a sound absorption coefficient in a case where the diameter of the through-hole 14a formed in the plate-like member 14 is 8 mm, that is, in a case of a configuration in which Reference Example 1 and Reference Example 4 are combined (Example 3).

It can be seen from FIG. 11 that the soundproof structure of the single membrane vibration has a structure in which a sound is absorbed at a plurality of frequencies by the vibration of the fundamental vibration mode and the high-order vibration mode of the membrane-like member 12 adjacent to the rear surface space 24. It can be seen from FIG. 11 that the frequency of the fundamental vibration mode is 1.7 kHz. Particularly, as shown in FIG. 11, a plurality of high sound absorption peaks appear in the band of 3 kHz to 5 kHz, and each peak shows a high sound absorption coefficient. On the other hand, at the sound absorption peak that appears around 8 kHz which is a higher frequency, the sound absorption coefficient is less than 50%. That is, in a case of the soundproof structure according to Reference Example having the configuration of the single membrane vibration, the high sound absorption coefficient is obtained by the membrane vibration in the fundamental vibration mode or the high-order vibration mode of the membrane in a specific frequency band, but the sound absorption coefficient tends to be low in the other vibration modes.

It can be seen from FIG. 12, it can be seen that the soundproof structure of the single Helmholtz resonance is a structure that absorbs a sound in a band centered at one frequency by the frequency of the fundamental vibration mode of the Helmholtz resonance. FIG. 12 shows that the frequency of the fundamental vibration mode is 4.5 kHz. It can be seen from FIG. 12 that the sound absorption coefficient peak is gentler than in the case of the single membrane vibration. Also, it can be seen that no peak other than the fundamental vibration mode appears.

That is, in the case of the soundproof structure according to Reference Example having the configuration of the single Helmholtz resonance, the high sound absorption coefficient is obtained by the fundamental vibration mode of the Helmholtz resonance in the band centered at the frequency of the fundamental vibration mode of the Helmholtz resonance, but since the vibration mode does not appear in the other frequency bands, the sound absorption coefficient is low.

On the other hand, in the soundproof structure 10 according to an example of the present invention, as shown in FIGS. 13 to 15, each of the plurality of sound absorption peaks appearing in the band of 2.0 kHz to 4.5 kHz shows a high sound absorption coefficient, and even the sound absorption peak appearing around 7.0 kHz to 8.5 kHz shows a sound absorption coefficient of 60% or more. As described above, the soundproof structure 10 according to an example of the present invention can absorb a sound in a plurality of high frequency bands at the same time.

The above results are summarized in Tables 1 and 2. Table 2 also shows a value of a ratio $f_{h1}/f_{m1}$ between the fundamental frequency $f_{m1}$ of the membrane vibration and the fundamental frequency $f_{h1}$ of the Helmholtz resonance. In Examples 1 to 3 described above, the ratio $f_{h1}/f_{m1}$ between the fundamental frequency $f_{m1}$ of the membrane vibration and the fundamental frequency $f_{h1}$ of the Helmholtz resonance is larger than 1. In addition, the sound absorption properties of Examples 1 to 3 having a configuration in which the membrane vibration resonator and the Helmholtz resonator are laminated have a large sound absorption coefficient since the high frequency side peak frequency appears on a side larger than a fundamental frequency of either the single Helmholtz resonator or the single membrane vibration.

TABLE 1

| | Configuration | Fundamental frequency | Sound absorption coefficient |
|---|---|---|---|
| Reference Example 1 | Single membrane vibration_ membrane thickness 50 μm | 1705 Hz | 0.33 |

TABLE 1-continued

| | Configuration | Fundamental frequency | Sound absorption coefficient |
|---|---|---|---|
| Reference Example 2 | Single Helmholtz resonance_ through-hole ø 6 | 4550 Hz | 0.77 |
| Reference Example 3 | Single Helmholtz resonance_ through-hole ø 4 | 3450 Hz | 0.96 |
| Reference Example 4 | Single Helmholtz resonance_ through-hole ø 8 | 6010 Hz | 0.86 |

TABLE 2

| | Configuration | High frequency side peak frequency | Sound absorption coefficient | $f_{h1}/f_{m1}$ |
|---|---|---|---|---|
| Example 1 | Reference Example 1 + Reference Example 2 | 7350 Hz | 0.69 | 2.67 |
| Example 2 | Reference Example 1 + Reference Example 3 | 5880 Hz | 0.82 | 2.02 |
| Example 3 | Reference Example 1 + Reference Example 4 | 8900 Hz | 0.72 | 3.52 |

Here, in the frequency band where the soundproof structure 10 according to an example of the present invention is capable of absorbing a sound, a sound absorbing region on a low frequency side where the membrane vibration and the Helmholtz resonance provide phase variations in the same direction to absorb a sound is, for example, 2.0 kHz to 4.5 kHz, and a sound absorbing region on a high frequency side where the membrane vibration and the Helmholtz resonance provide phase variations in opposite directions to absorb a sound is, for example, 7.0 kHz to 8.5 kHz. Therefore, the soundproof structure 10 according to an example of the present invention can absorb a plurality of relatively high frequency sounds such as motor sounds or inverter sounds at the same time.

In the following description, a frequency band where the membrane vibration and the Helmholtz resonance provide phase variations in the same direction to absorb a sound is referred to as a "sound absorption frequency band of the low frequency side" or a "sound absorbing region on the low frequency side", and a frequency band where the membrane vibration and the Helmholtz resonance provide phase variations in opposite directions to absorb a sound is referred to as a "sound absorption frequency band of the high frequency side" or a "sound absorbing region on the high frequency side". In addition, a sound absorption peak appearing in the sound absorption frequency band on the low frequency side is referred to as a "sound absorption peak on the low frequency side", and a sound absorption peak appearing in the sound absorption frequency band on the high frequency side is referred to as a "sound absorption peak on the high frequency side".

In the soundproof structure 10 according to the embodiment of the present invention, the sound absorption peak frequency on the low frequency side can be changed by adjusting the thickness of the membrane-like member 12, the thickness of the rear surface space 24, the thickness of the first space 26, the thickness of the plate-like member 14, the size of the through-hole 14a formed in the plate-like member 14, and the like. Similarly, the sound absorption peak frequency on the high frequency side can be changed by adjusting the thickness of the membrane-like member 12, the thickness of the rear surface space 24, the thickness of the first space 26, the thickness of the plate-like member 14, the size of the through-hole 14a formed in the plate-like member 14, and the like. Here, as shown in Simulation 2 described later, in the soundproof structure 10 according to the embodiment of the present invention, the sound absorption peak frequencies on the low frequency side and the high frequency side can be independently controlled. That is, since the pressure distribution varies depending on the sound absorbing region, the sound absorption peak frequencies can be independently controlled. Specifically, in the sound absorbing region on the low frequency side, the pressure increases to the low wall side, and thus the influence of the thickness and volume of the first space is large. On the other hand, in the sound absorbing region on the high frequency side, the pressure increases in the rear surface space, and thus the influence of the thickness and volume of the rear surface space is large. Accordingly, for example, in a case where the thicknesses of the first space and the rear surface space are changed, the low frequency range and the high frequency range can be independently changed.

This makes it possible to appropriately control the sound absorption peak frequency according to a frequency of noise to be absorbed, and as a result, the sound absorption is performed efficiently.

In addition, the fact that each sound absorption peak frequency on the low frequency side and the high frequency side can be independently changed is also effective for simple noise caused by vibration of a metal rod or the like.

That is, in the sound absorbing device in the related art using the membrane vibration, since a frequency interval is different for each order between the vibration mode of the membrane (resonance based on two-dimensional vibration) and the vibration mode of the metal rod or the like (resonance based on one-dimensional vibration), it is difficult to match the resonance peak of the membrane vibration with a plurality of frequencies with respect to the simple noise derived from the metal rod, and it is difficult to suitably absorb such simple noise. The same problem occurs in a motor, an inverter, and fan noises in which a peak noise appears for each integral multiple.

On the other hand, in a case of the soundproof structure 10 according to the embodiment of the present invention, since the sound absorption peak frequency can be appropriately changed in each sound absorption frequency band as described above, the simple noise can be appropriately absorbed by setting the peak frequency suitable for absorbing the simple noise due to the one-dimensional vibration such as the noise derived from the metal rod and the motor noise.

In addition, since the soundproof structure according to the embodiment of the present invention has a configuration in which the plate-like member having the through-hole and the membrane-like member are disposed to be spaced from each other by a predetermined distance, the soundproof structure can be reduced in size, weight, and thickness, and can be suitably used for electronic apparatus or the like in which the installation space of the sound reduction means is limited.

Here, the soundproof structure according to the embodiment of the present invention has a configuration in which assuming that a fundamental frequency of membrane vibration in a case where the plate-like member is regarded as a rigid body in which a through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied. By adopting the configuration satisfying $f_{m1} < f_{h1}$, as described above, the sound absorbing effect can be obtained at a higher frequency by an interaction between the membrane vibration of the membrane-like member 12 and the Helmholtz resonance.

This will be described below using the results of simulation.

[Simulation 1]

First, with respect to the configuration of the measurement result of the sound absorption coefficient shown in FIG. 13, a simulation using the finite element method calculation software COMSOLver.5.3 (COMSOLInc.) is performed. A calculation model is set to a two-dimensional axially symmetric structure calculation model, the inner frame is set to cylindrical, a diameter of an opening portion is set to 20 mm, and a thickness of a rear surface space is set to 2 mm. The thickness of the membrane-like member is set to 50 μm, and a Young's modulus, which is a parameter indicating the hardness of the membrane-like member, is set to 4.5 GPa which is a Young's modulus of a polyethylene terephthalate (PET) film. The outer frame has a cylindrical shape, the diameter of the opening portion is set to 20 mm, and the thickness of the first space is set to 2 mm. The thickness of the plate-like member 14 is set to 2 mm, and a through-hole 14a having a diameter of 6 mm is provided at the central position.

In the above calculation model, the coupled calculation of sound and structure is performed, the structural mechanics calculation is performed regarding the membrane-like member, and numerical calculation regarding the rear surface space is performed by calculating the airborne of the sound. The evaluation is performed in a normal incidence sound absorption coefficient arrangement, and the relationship between the frequency and the sound absorption coefficient is calculated. In addition, a thermal viscous acoustic calculation is performed inside the opening in which Helmholtz resonance occurs, and thereby the calculation is accurately performed including frictional heat absorption due to viscous friction.

Figure 16:
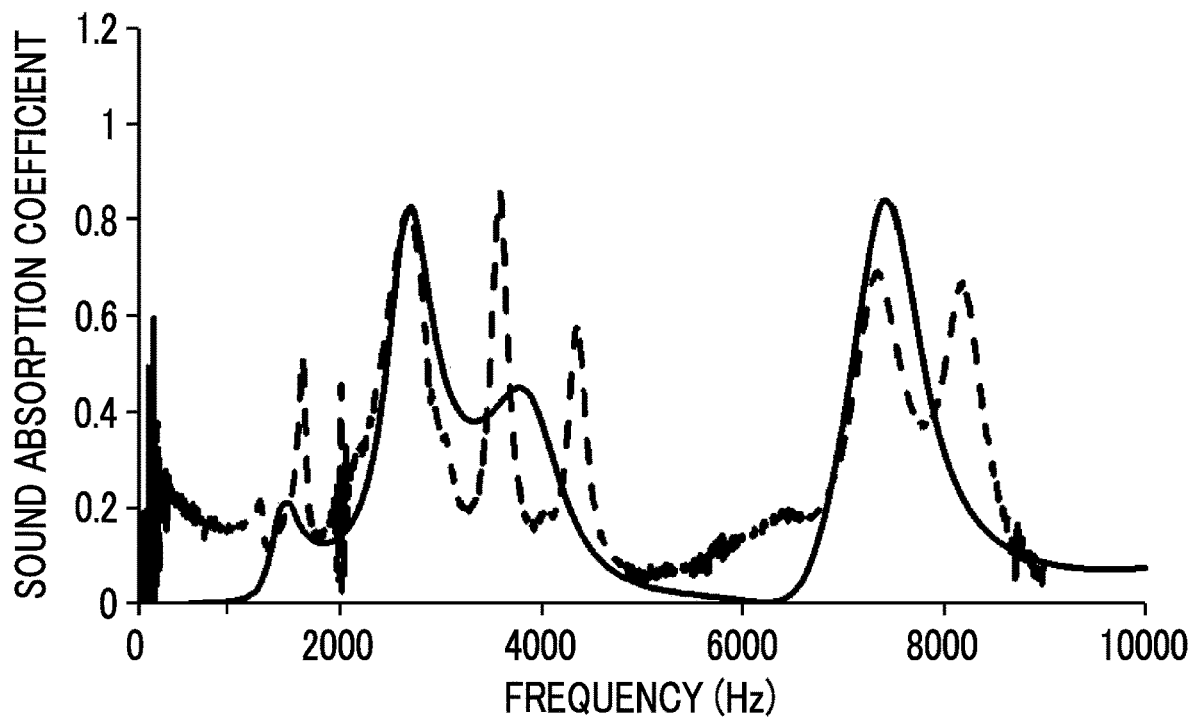
FIG. 16 is a graph showing a relationship between a frequency and a sound absorption coefficient.

FIG. 16 shows the result of the above simulation (the relationship between the calculated frequency and the sound absorption coefficient). In FIG. 16, the simulation result is indicated by a solid line, and an actual measurement result (the measurement result shown in FIG. 13) is indicated by a dotted line as comparison information.

As shown in FIG. 16, in the actual measurement result, the number of sound absorption peaks is larger than that in the simulation result, and the degree of change in the sound absorption coefficient at each peak is larger, but the overall tendency substantially coincides between the actual measurement result and the simulation result. That is, even in both the actual measurement result and the simulation result, a sound absorption peak exists around 2.7 kHz, and a sound absorption peak also exists around 7.4 kHz. That is, as a result of the simulation, it is found that, similarly to the actual measurement result, the sound absorption occurs in the sound absorption frequency band broadly divided into two in the soundproof structure according to the embodiment of the present invention in a case of roughly being divided.

[Simulation 2]

The simulation is performed in the same manner as in Simulation 1 except that the diameter (through-hole diameter) of the through-hole 14a formed in the plate-like member 14 is changed from 1 mm to 16 mm in increments of 1 mm.

Figure 17:
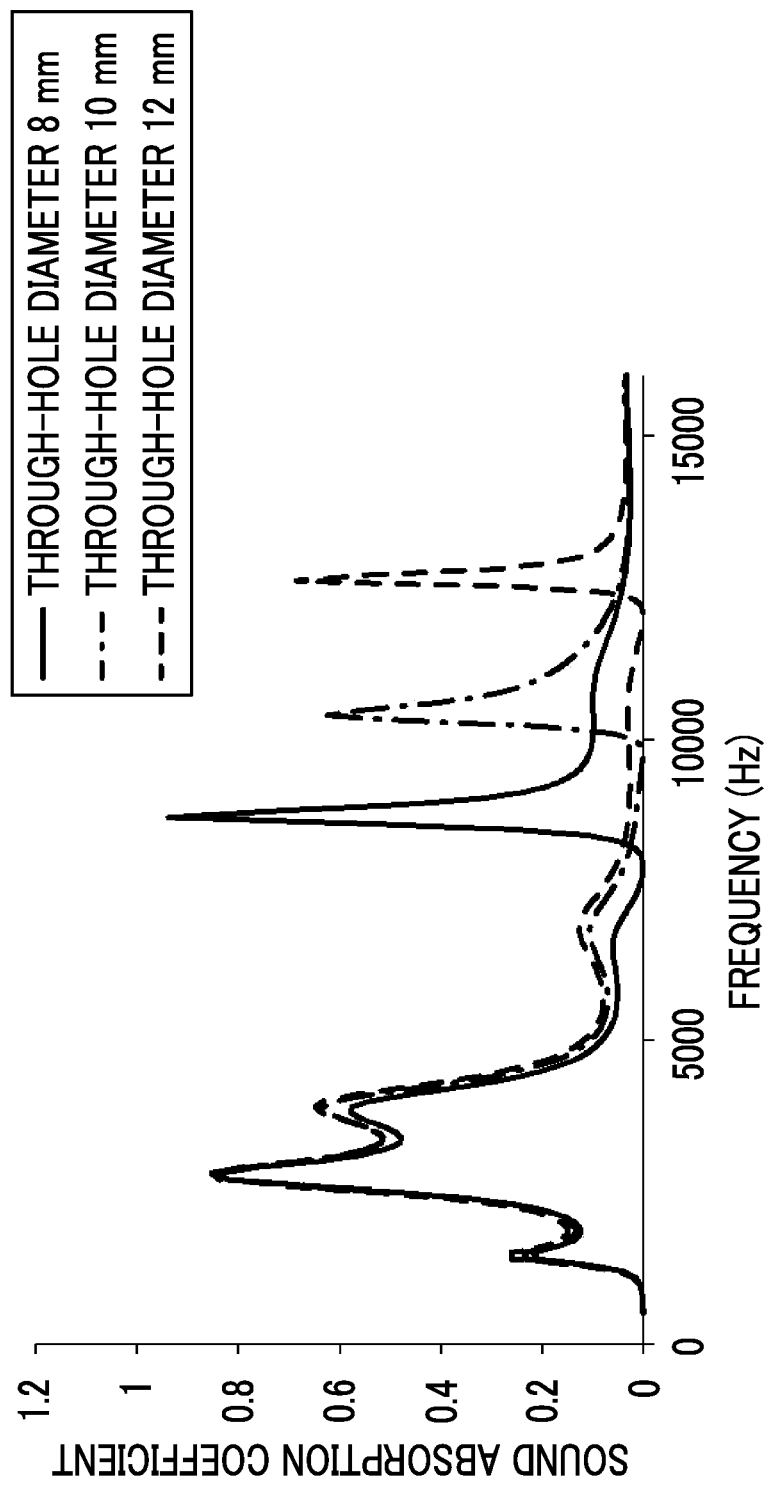
FIG. 17 is a graph showing a relationship between a frequency and a sound absorption coefficient.
Figure 18:
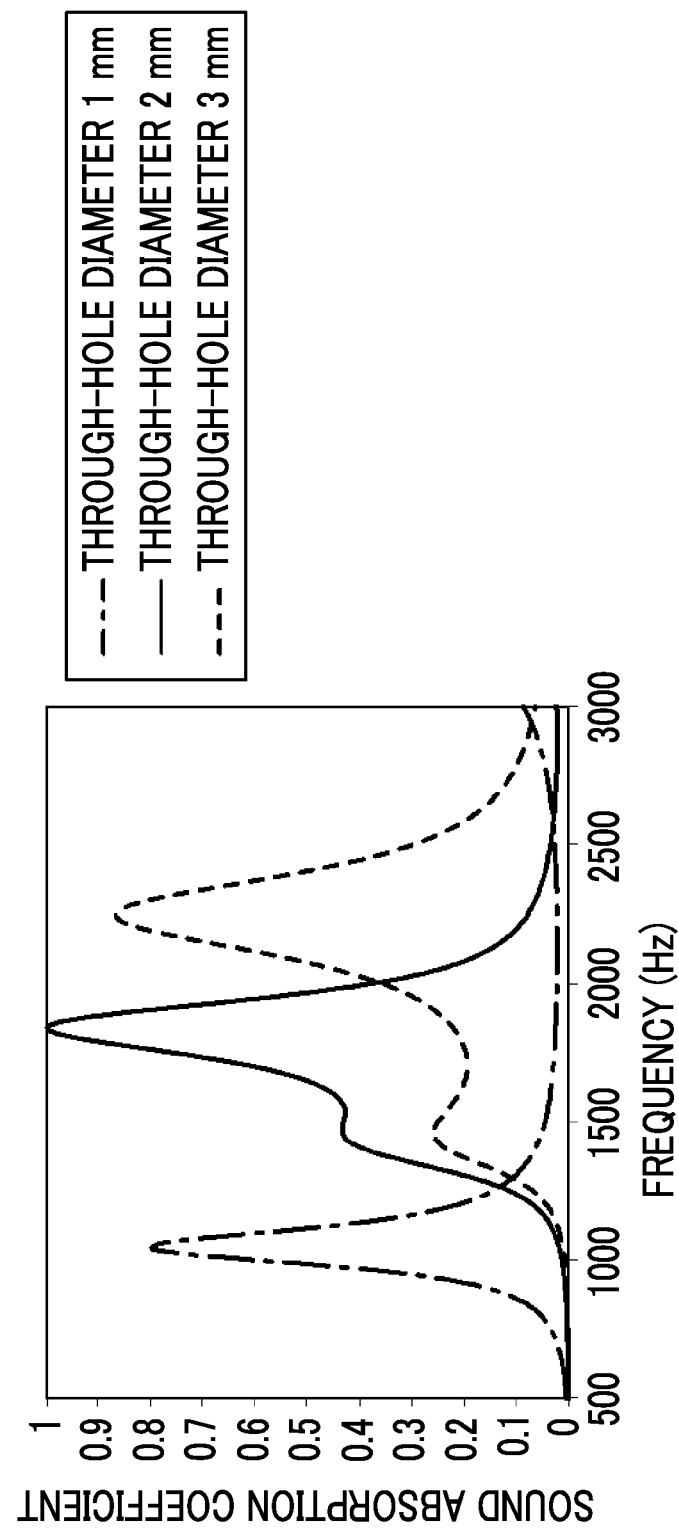
FIG. 18 is a graph showing a relationship between a frequency and a sound absorption coefficient.

FIG. 17 is a graph showing a relationship between a frequency and a sound absorption coefficient in a case where the through-hole diameter is 8 mm, 10 mm, and 12 mm. FIG. 18 is a graph showing a relationship between a frequency and a sound absorption coefficient in a case where the through-hole diameter is 1 mm, 2 mm, and 3 mm.

As described above, the frequency and the sound absorption coefficient are calculated by simulation for each through-hole diameter from 1 mm to 19 mm, and from the simulation result, the sound absorption coefficient (hereinafter, also referred to as a maximum sound absorption coefficient on the low frequency side) that becomes maximum in the sound absorbing region on the low frequency side, the frequency (hereinafter, also referred to as a maximum sound absorption frequency on the low frequency side) at which the sound absorption coefficient becomes maximum, the sound absorption coefficient (hereinafter, also referred to as a maximum sound absorption coefficient on the high frequency side) that becomes maximum in the sound absorbing region on the high frequency side, and the frequency (hereinafter, also referred to as a maximum sound absorption frequency on the high frequency side) at which the sound absorption coefficient becomes maximum are read.

Figure 19:
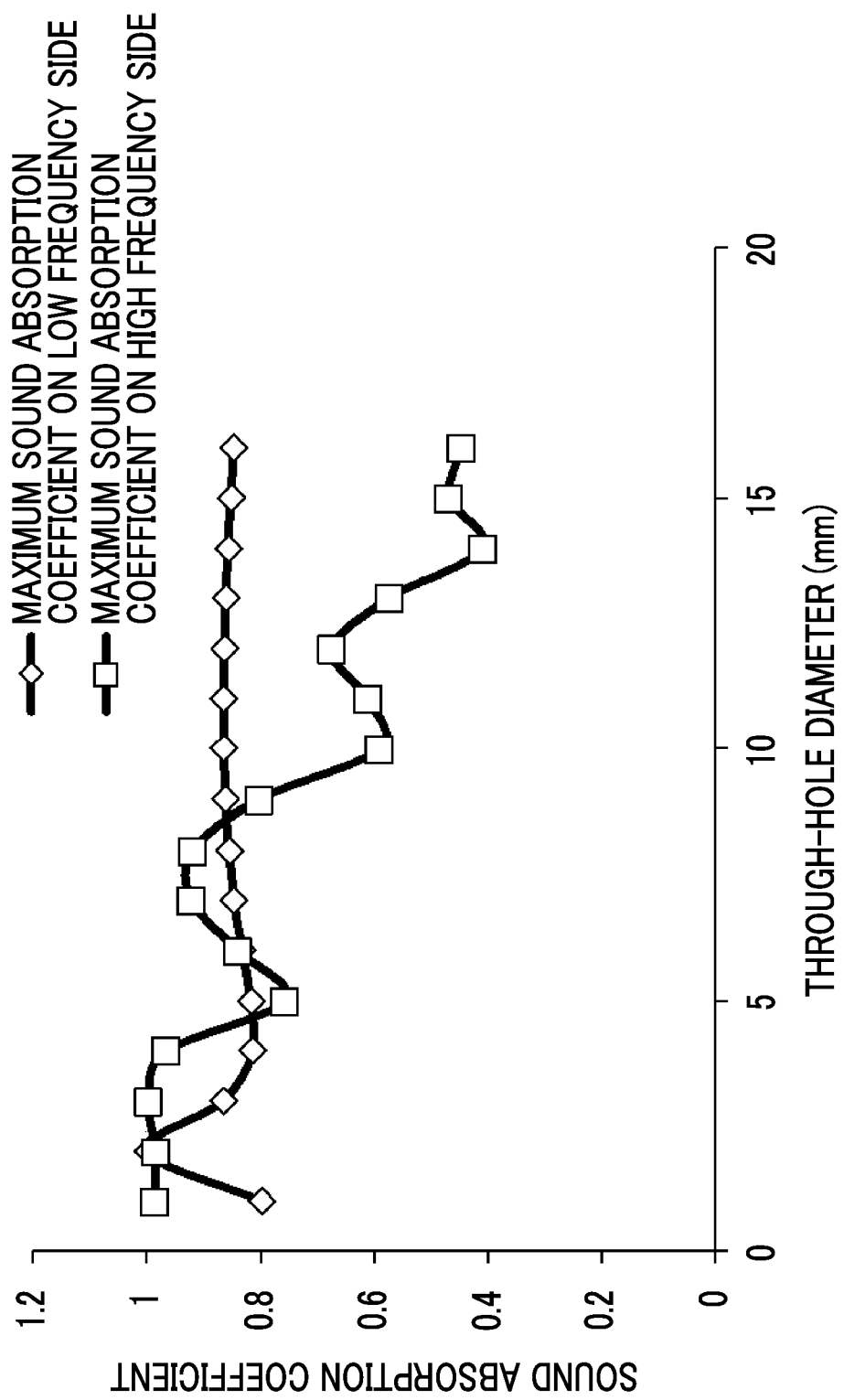
FIG. 19 is a graph showing a relationship between a through-hole diameter and a sound absorption coefficient.
Figure 20:
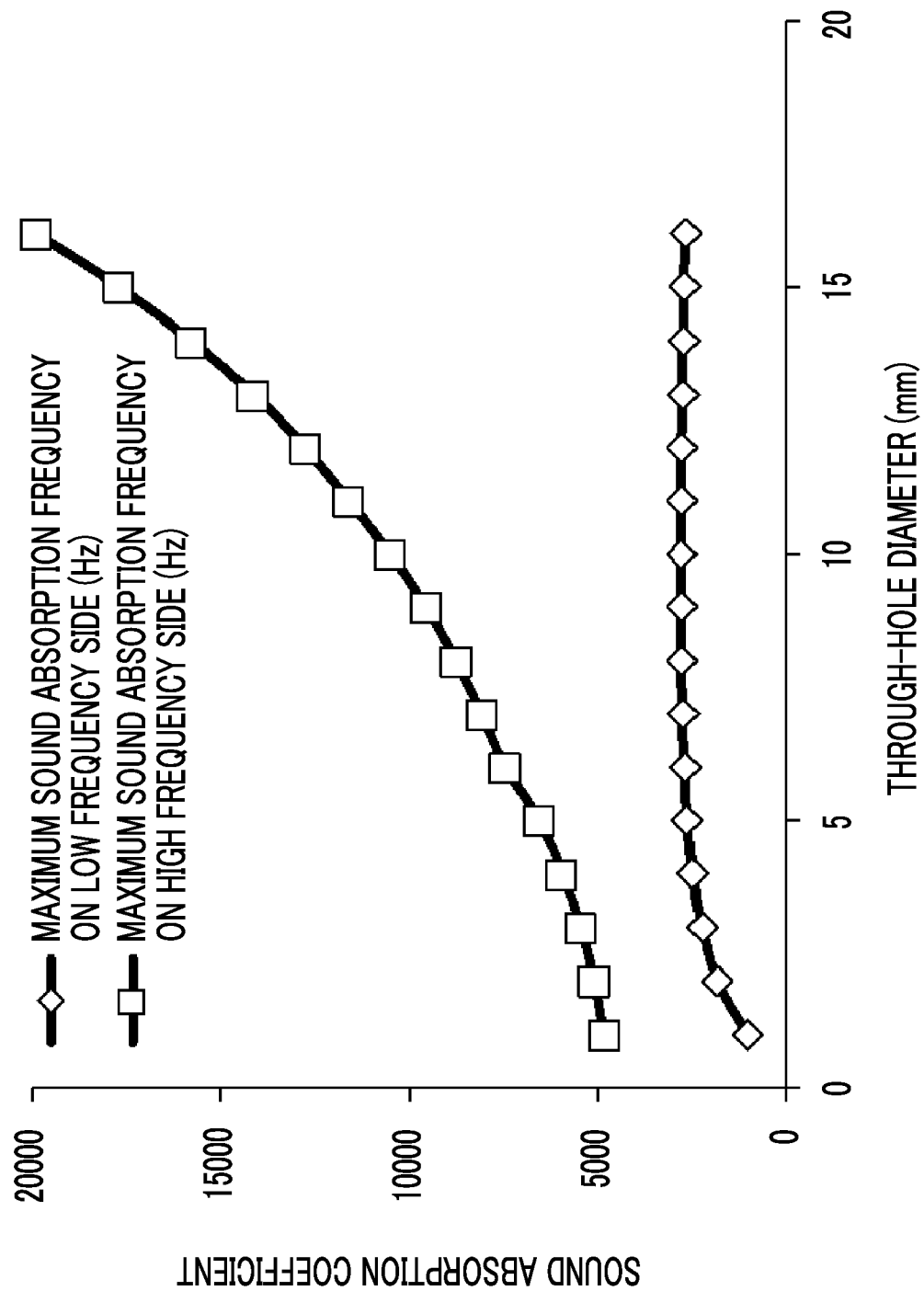
FIG. 20 is a graph showing a relationship between a through-hole diameter and a sound absorption frequency.
Figure 21:
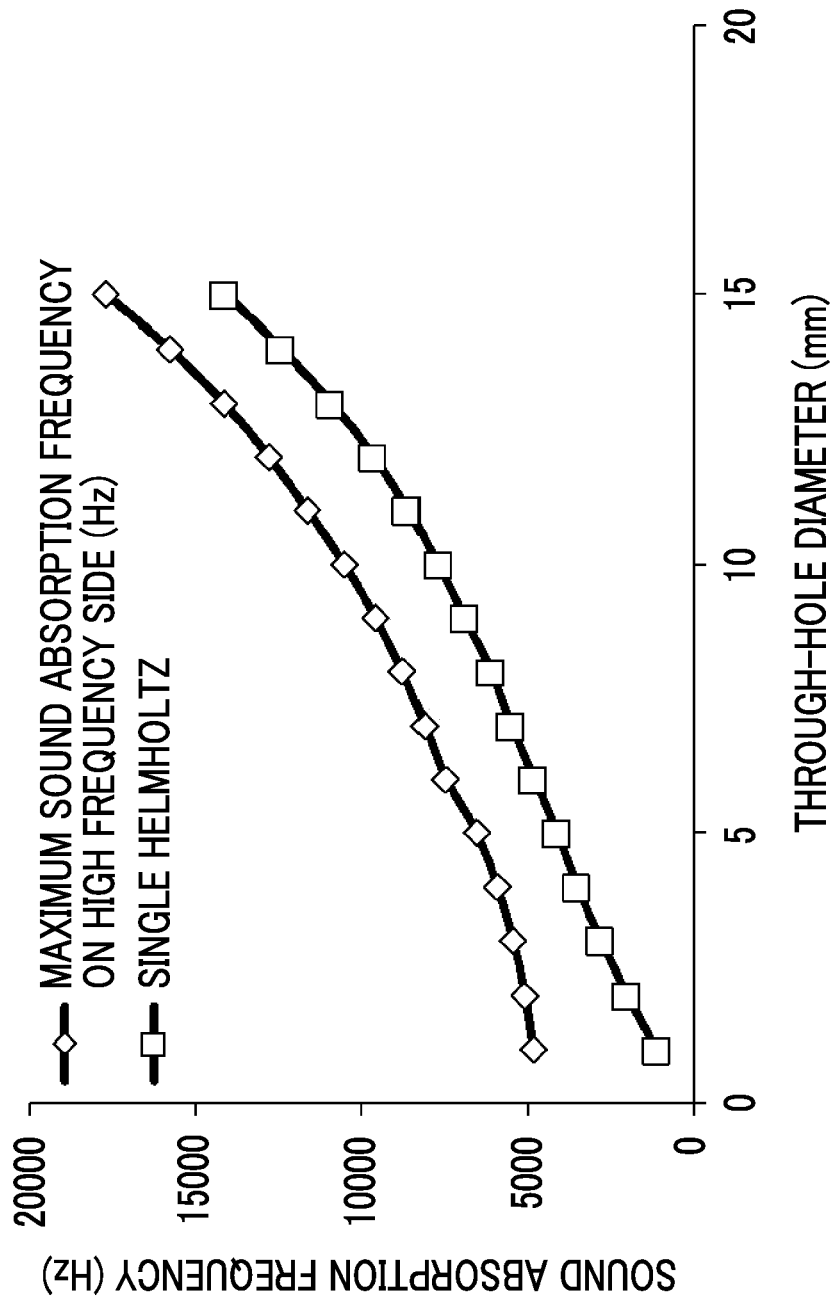
FIG. 21 is a graph showing a relationship between a through-hole diameter and a sound absorption frequency.

The results are shown in FIGS. 19 and 20. In addition, Table 3 summarizes the through-hole diameter, the maximum sound absorption coefficient on the low frequency side, the maximum sound absorption frequency on the low frequency side, the maximum sound absorption coefficient on the high frequency side, the maximum sound absorption frequency on the high frequency side, the fundamental frequency $f_{h1}$ of the single Helmholtz, the fundamental frequency $f_{m1}$ of the single membrane vibration, and the frequency ratio $f_{h1}/f_{m1}$ in each simulation result. FIG. 21 shows a relationship between the sound absorption frequency of the single Helmholtz resonance, the maximum sound absorption frequency on the high frequency side, and the through-hole diameter.

In addition, the sound absorbing region on the low frequency side is a frequency band of 4 kHz or less, and the sound absorbing region on the high frequency side is a frequency band of 4.8 kHz or more.

Since a plane wave that is difficult experimentally can be created by using a simulation, the sound absorption coefficient up to the high frequency can be obtained.

TABLE 3

| Through-hole diameter (mm) | Maximum sound absorption coefficient on low frequency side | Maximum sound absorption frequency on low frequency side (Hz) | Maximum sound absorption coefficient on high frequency side | Maximum sound absorption frequency on high frequency side (Hz) | Fundamental frequency of single Helmholtz resonance $f_{h1}$(Hz) | Fundamental frequency of single membrane vibration $f_{m1}$(Hz) | Ratio of fundamental frequency $f_{h1}/f_{m1}$ |
|---|---|---|---|---|---|---|---|
| 1 | 0.8 | 1040 | 0.99 | 4820 | 1100 | 1500 | 0.73 |
| 2 | 1 | 1840 | 0.98 | 5080 | 2000 | 1500 | 1.33 |

TABLE 3-continued

| Through-hole diameter (mm) | Maximum sound absorption coefficient on low frequency side | Maximum sound absorption frequency on low frequency side (Hz) | Maximum sound absorption coefficient on high frequency side | Maximum sound absorption frequency on high frequency side (Hz) | Fundamental frequency of single Helmholtz resonance $f_{h1}$(Hz) | Fundamental frequency of single membrane vibration $f_{m1}$(Hz) | Ratio of fundamental frequency $f_{h1}/f_{m1}$ |
|---|---|---|---|---|---|---|---|
| 3 | 0.87 | 2240 | 1 | 5440 | 2800 | 1500 | 1.87 |
| 4 | 0.81 | 2480 | 0.97 | 5920 | 3500 | 1500 | 2.33 |
| 5 | 0.82 | 2620 | 0.76 | 6540 | 4100 | 1500 | 2.73 |
| 6 | 0.83 | 2700 | 0.84 | 7460 | 4800 | 1500 | 3.2 |
| 7 | 0.85 | 2740 | 0.92 | 8080 | 5500 | 1500 | 3.67 |
| 8 | 0.86 | 2760 | 0.92 | 8760 | 6100 | 1500 | 4.07 |
| 9 | 0.86 | 2780 | 0.8 | 9560 | 6900 | 1500 | 4.6 |
| 10 | 0.86 | 2780 | 0.59 | 10500 | 7700 | 1500 | 5.13 |
| 11 | 0.86 | 2780 | 0.61 | 11620 | 8600 | 1500 | 5.73 |
| 12 | 0.86 | 2760 | 0.67 | 12780 | 9600 | 1500 | 6.4 |
| 13 | 0.86 | 2740 | 0.57 | 14140 | 10900 | 1500 | 7.27 |
| 14 | 0.86 | 2720 | 0.41 | 15780 | 12400 | 1500 | 8.27 |
| 15 | 0.85 | 2700 | 0.47 | 17700 | 14100 | 1500 | 9.4 |
| 16 | 0.85 | 2660 | 0.45 | 19900 | 16300 | 1500 | 10.87 |

From the results shown in FIG. 17, it became clear that the sound absorbing region on the high frequency side extends to 12 kHz or more. On the other hand, the sound absorbing region on the low frequency side has hardly changed. From the above results, it is found that the sound absorbing region on the low frequency side and the sound absorbing region on the high frequency side can be independently controlled.

Further, from FIGS. 19 and 20 and Table 3, in the sound absorbing region on the low frequency side, the frequency change is small in a case where the through-hole diameter is about 5 mm or more. On the other hand, the sound absorbing region on the high frequency side shifts to a high frequency as the through-hole diameter increases.

In a case where the plate-like member 14 is regarded as a rigid body in which the through-hole 14a is not formed, the fundamental frequency of the membrane vibration of the membrane-like member 12 is 1.5 kHz. Accordingly, only in a case where the through-hole diameter is 1 mm, the fundamental frequency $f_{h1}$ of Helmholtz resonance is lower than the fundamental frequency $f_{m1}$ of membrane vibration.

It is found from the results shown in FIG. 18 that in a case where the through-hole diameter is 1 mm, there is only one sound absorption peak in the low frequency side region, and therefore the band is narrowed. On the other hand, it can be seen that in a case where through-hole diameter is 2 mm or more, there are a plurality of sound absorption peaks and the band becomes wide.

The sound absorption properties on the low frequency side are affected by both the membrane vibration and the Helmholtz resonance. In a case where the fundamental frequency $f_{h1}$ of the Helmholtz resonance is smaller than the fundamental frequency $f_{m1}$ of the membrane vibration, only the fundamental vibration of the membrane-like member in the upper portion can interact, and therefore only one sound absorption peak appears in the low frequency side region. On the other hand, in a case where the fundamental frequency $f_{h1}$ of the Helmholtz resonance exceeds the fundamental frequency $f_{m1}$ of the membrane vibration, not only the fundamental vibration of the membrane vibration but also the high-order vibration of the membrane vibration existing on the higher frequency side interact with each other, and a plurality of sound absorption peaks appear.

Therefore, $f_{m1}<f_{h1}$ is a necessary condition for widening the band in a configuration in which the membrane-like member capable of vibrating the membrane is disposed above the Helmholtz resonator.

In addition, it can be seen that in the case of $f_{m1}>f_{h1}$, the resonance frequency in the low frequency side region of the laminated structure is small than both $f_{m1}$ and $f_{h1}$, and the frequency is lowered.

It can be seen from FIG. 21 that the maximum frequency is shifted to a higher frequency side than the fundamental frequency of the single Helmholtz resonance by the configuration in which the membrane-like member capable of vibrating the membrane is disposed above the Helmholtz resonator.

As described above, in the soundproof structure according to the embodiment of the present invention, assuming that the fundamental frequency of membrane vibration in a case where the plate-like member is regarded as a rigid body in which a through-hole is not formed in the first sound absorbing portion is $f_{m1}$ and the fundamental frequency of Helmholtz resonance of the second sound absorbing portion is $f_{h1}$, $f_{m1}<f_{h1}$ is satisfied. Therefore, the sound absorbing effect can be obtained at a higher frequency by the interaction between the membrane vibration of the membrane-like member 12 and the Helmholtz resonance, and the sound absorbing effect can be obtained in a plurality of frequency bands.

Each fundamental frequency may be appropriately selected according to a target noise, but from the viewpoint of sound absorption coefficient, the sound absorption in a high frequency band, and the like, the frequency ratio $f_{h1}/f_{m1}$ preferably satisfies $1.3 \leq f_{h1}/f_{m1} \leq 12$, more preferably satisfies $1.5 \leq f_{h1}/f_{m1} \leq 8$, and still more preferably satisfies $2 \leq f_{h1}/f_{m1} \leq 5$.

In a case where the ratio of the fundamental frequency is too large, the sound absorption coefficient on the high frequency side tends to decrease.

The fundamental frequency of the Helmholtz resonance of the second sound absorbing portion may be adjusted by adjusting the thickness of the first space 26, the size of the through-hole 14a and the thickness of the plate-like member 14, and the like.

As is well known, the fundamental frequency of Helmholtz resonance is determined by an opening area of the through-hole, the length of the through-hole, and the volume of the first space. Specifically, the fundamental frequency $f_{h1}$ of Helmholtz resonance is given by $f_{h1}=c/(2\pi)\times\sqrt{(S/(V\times L))}$. Here, c is the speed of sound, V is the volume of the first space, S is the cross-sectional area of the through-hole, and L is the length of the through-hole (more precisely, the length in consideration of an open end correction distance). Among these, the length of the through-hole does not necessarily have to be the same as the thickness of the plate-like member. For example, in a case where a tubular member is attached so as to extend from the through-hole portion, the length of the through-hole can be increased while the plate-like member remains thin. This configuration is advantageous in a case where it is necessary to reduce the weight of the entire sound absorbing structure. In addition, for example, a burr-like structure generated in a case where punching is performed by using punching or the like in a case of forming a through-hole can be made to function as the above-described tubular member.

Specifically, the thickness (Lb in FIG. 3) of the first space 26 is preferably 10 mm or less, more preferably 5 mm or less, even more preferably 2 mm or less, and particularly preferably 1 mm or less. In a case where the thickness of the first space 26 is not uniform, an average value may be within the above range.

The size of the through-hole 14a is preferably 0.5 mm to 10 mm, more preferably 1 mm to 7 mm, and even more preferably 2 mm to 5 mm in equivalent circle diameter.

In a case where the through-hole diameter is too small, the thermal viscous friction generated in the through-hole increases and resistance in a case where a sound passes through the through-hole of the plate-like member increases, so that reflection tends to increase. On the other hand, in a case where the through-hole diameter is too large, it is necessary to increase the rear surface volume or the length of the through-hole in order to absorb the same frequency, and thus the entire sound absorbing structure tends to increase.

The thickness of the plate-like member 14 is preferably 0.5 mm to 10 mm, more preferably 1 mm to 7 mm, and further preferably 2 mm to 5 mm. In addition, the thickness of the plate-like member 14 is the thickness at the through-hole portion.

In addition, from a viewpoint of obtaining a sound absorbing effect in an audible range, as the frequency band in which the soundproof structure 10 can absorb a sound, the frequency band in which the sound absorption coefficient is 20% or more is preferably in a range of 1 kHz to 20 kHz, more preferably in a range of 1 kHz to 15 kHz, even more preferably in a range of 1 kHz to 12 kHz, and particularly preferably in a range of 1 kHz to 10 kHz.

In the present invention, the audible range is from 20 Hz to 20000 Hz.

In addition, within the audible range, the frequency at which the sound absorption coefficient is maximum is preferably at 2 kHz or more, more preferably at 4 kHz or more.

In addition, from the viewpoint of device miniaturization, a total thickness of the soundproof structure 10 (Lt in FIG. 3 is a length from one end to the other end of the soundproof structure 10 in the thickness direction, and strictly, a thickness of the thickest portion in the soundproof structure 10) is preferably 10 mm or less, more preferably 7 mm or less, and even more preferably 5 mm or less.

A lower limit value of the thickness of the soundproof structure 10 is not particularly limited as long as the membrane-like member 12 and the plate-like member 14 can be appropriately supported, but is preferably 0.1 mm or more, and more preferably 0.3 mm or more.

In addition, the present inventors have studied in more detail about the mechanism by which a high-order vibration mode is excited in the membrane vibration of the membrane-like member of the soundproof structure 10.

As a result, in a case where the Young's modulus of membrane-like member 12 is denoted by E (Pa), the thickness of the membrane-like member is denoted by t (m), the thickness of the rear surface space (rear surface distance) is denoted by d (m), and the equivalent circle diameter of the region where the membrane-like member vibrates, that is, the equivalent circle diameter of the opening portion of the frame in a case where the membrane-like member is fixed to the frame (for example, the inner frame 18) is denoted by $\Phi$ (m), the hardness of the one membrane-like member $E \times t^3$ (Pa·m$^3$) is preferably denoted by $21.6 \times d^{-1.25} \times \Phi^{4.15}$ or less. In addition, in a case where the coefficient a is represented as $a \times d^{-1.25} \times \Phi^{4.15}$, it is found that a smaller coefficient a is preferable, as the coefficient a is 11.1 or less, 8.4 or less, 7.4 or less, 6.3 or less, 5.0 or less, 4.2 or less, and 3.2 or less.

It is found that the hardness $E \times t^3$ (Pa·m$^3$) of the membrane-like member is preferably $2.49 \times 10^{-7}$ or more, more preferably $7.03 \times 10^{-7}$ or more, even more preferably $4.98 \times 10^{-6}$ or more, still preferably $1.11 \times 10^{-5}$ or more, particularly preferably $3.52 \times 10^{-5}$ or more, and most preferably $1.40 \times 10^{-4}$ or more.

By setting the hardness of the membrane-like member in the above range, the high-order vibration mode can be suitably excited in the membrane vibration of the membrane-like member of the soundproof structure 10. This will be described in detail below.

First, as physical properties of the membrane-like member, in a case where the hardness of the membrane-like members and the weight of the membrane-like members coincides, it is considered that the properties of the membrane vibration are the same, even in a case where the materials, the Young's modulus, the thicknesses, and the densities are different.

The hardness of the membrane-like member is a physical property represented by (Young's modulus of the membrane-like member)×(thickness of the membrane-like member)$^3$. In addition, the weight of the membrane-like member is a physical property proportional to (density of the membrane-like member)×(thickness of the membrane-like member).

Here, the hardness of the membrane-like member corresponds to a hardness in a case where tension is set as zero, that is, a case where the membrane-like member is attached to the frame without being stretched, for example, just being placed on a base. In a case where the membrane-like member is attached to the frame while applying tension, the same properties can be obtained by correcting the Young's modulus of the membrane-like member to include the tension.

Figure 35:
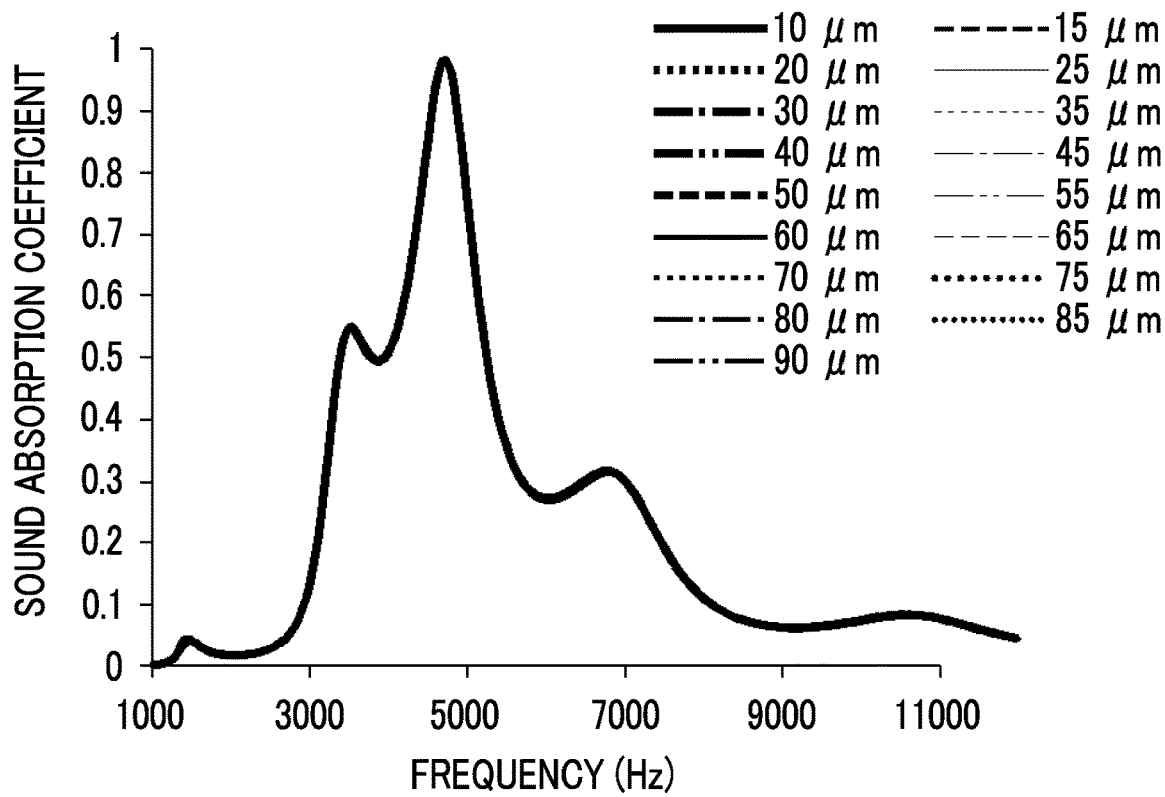
FIG. 35 is a graph showing a relationship between a frequency and a sound absorption coefficient.
Figure 36:
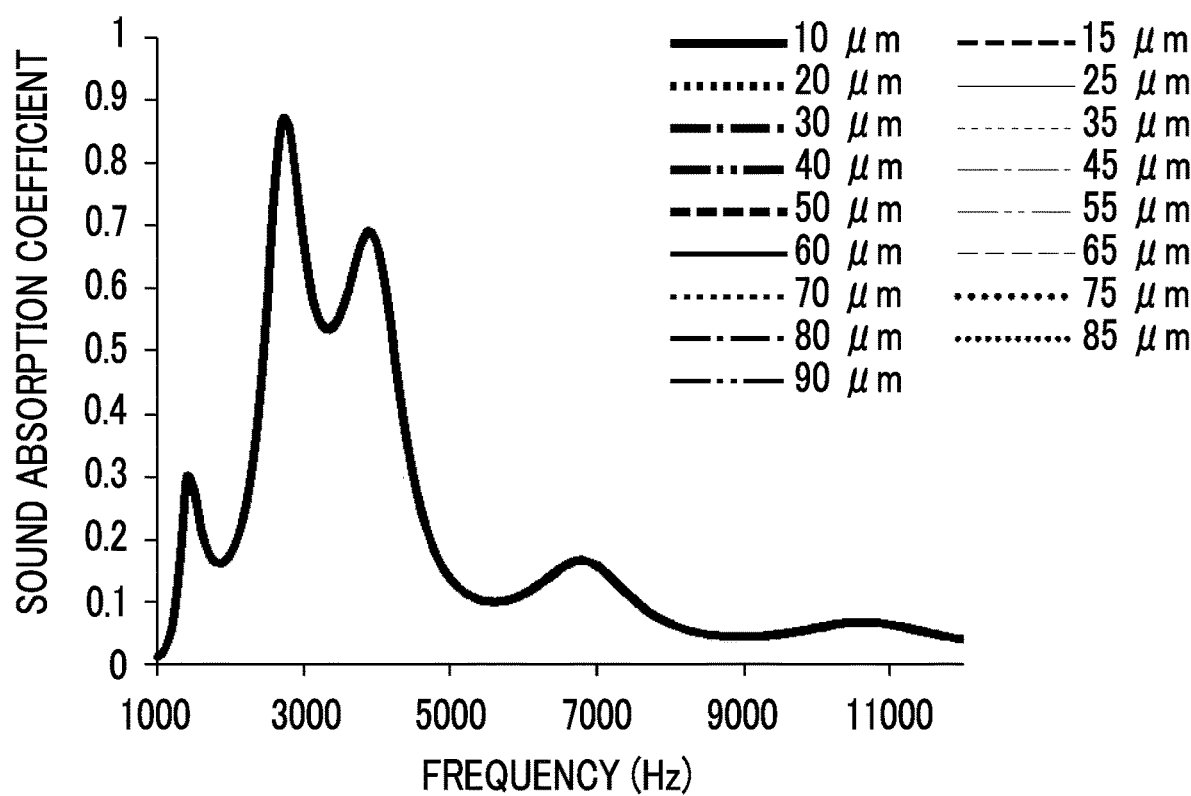
FIG. 36 is a graph showing a relationship between a frequency and a sound absorption coefficient.

FIGS. 35 and 36 show graphs showing results in which sound absorption coefficients by the soundproof structure are obtained by the simulation, in a case where the thickness of the membrane-like member is changed from 10 μm to 90 μm in increments of 5 μm, while keeping the hardness of the membrane-like member=(Young's modulus of the membrane-like member)×(thickness of the membrane-like member)$^3$ and the weight of the membrane-like member≈(density of the membrane-like member)×(thickness of the membrane-like member) constant. The simulation is performed using an acoustic module of the finite element method calculation software COMSOL ver.5.3 (COMSOL Inc.).

The thickness, the Young's modulus, and density of the membrane-like member are changed according to the thickness of the membrane-like member by setting the thickness of 50 μm, the Young's modulus of 4.5 GPa, and the density of 1.4 g/cm³ (corresponding to a PET membrane) as references. The diameter of the opening portion of the frame is set to 20 mm.

FIG. 35 shows a result in a case where the rear surface distance is set to 2 mm, and FIG. 36 shows a result in a case where the rear surface distance is set to 5 mm.

As shown in FIGS. 35 and 36, it is found that the same sound absorbing performance is obtained, although the thickness of the membrane-like member is changed from 10 μm to 90 μm. That is, it is found that assuming that the hardness of the membrane-like members and the weight of the membrane-like members coincide, even in a case where the thicknesses, the Young's modulus, and the densities are different, the same properties are exhibited.

Figure 37:
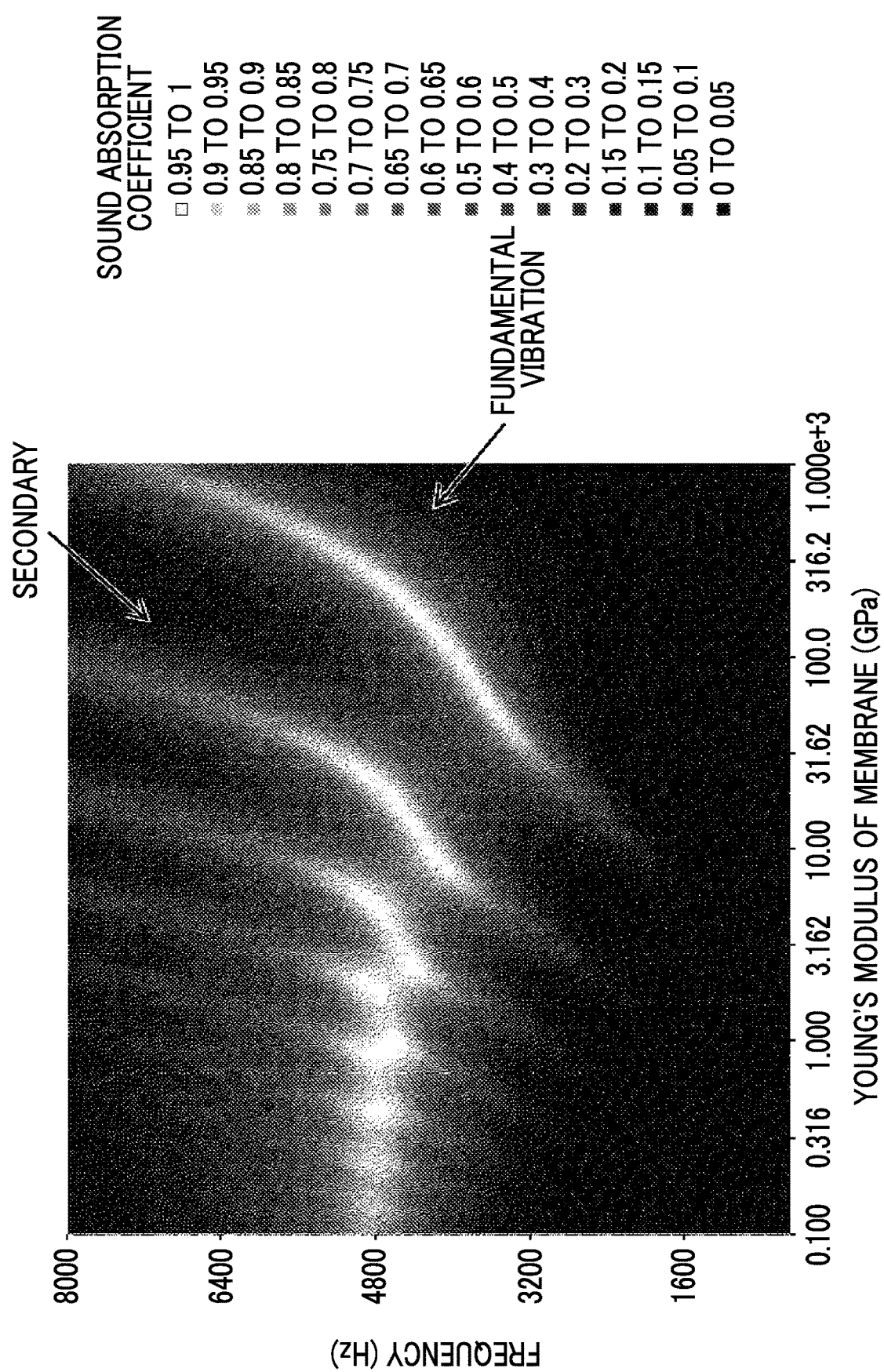
FIG. 37 is a graph showing a relationship between Young's modulus of a membrane, a frequency, and a sound absorption coefficient.

Next, by setting the thickness of the membrane-like member as 50 μm, the density as 1.4 g/cm³, the diameter of the opening portion of the frame as 20 mm, and the rear surface distance as 2 mm, the simulation is performed respectively by changing the Young's modulus of the membrane-like member from 100 MPa to 1000 GPa, and sound absorption coefficients are obtained. The calculation is performed by increasing an index from $10^8$ Pa to $10^{12}$ Pa in 0.05 steps. The results thereof are shown in FIG. 37. FIG. 37 is a graph showing a relationship between a Young's modulus of the membrane-like member, a frequency, and a sound absorption coefficient. This condition can be converted so that the same hardness is obtained for different thicknesses, depending on the result of the above simulation.

In the graph shown in FIG. 37, a band-like region on the rightmost side in the graph, that is, on a side where the Young's modulus is high and the sound absorption coefficient is high, is a region where the sound absorption caused by the fundamental vibration mode occurs. The fundamental vibration mode means that a low-order mode does not appear any more, and the fundamental vibration mode can be confirmed by visualizing membrane vibration in the simulation. The fundamental vibration mode can also be confirmed experimentally by measuring the membrane vibration.

A band-like region on the left side, that is, on a side where the Young's modulus of the membrane-like member is small and the sound absorption coefficient is high, is a region where the sound absorption caused by the secondary vibration mode occurs. In addition, a band-like region on the left side thereof where the sound absorption coefficient is high is a region where the sound absorption caused by the tertiary vibration mode occurs. Further, the sound absorption due to a high-order vibration mode occurs, towards the left side, that is, as the membrane-like member becomes softer.

From FIG. 37, it is found that in a case where the Young's modulus of the membrane-like member is high, that is, the membrane-like member is hard, sound absorption in the fundamental vibration mode becomes dominant, and as the membrane-like member becomes softer, sound absorption in the high-order vibration mode becomes more dominant.

Figure 38:
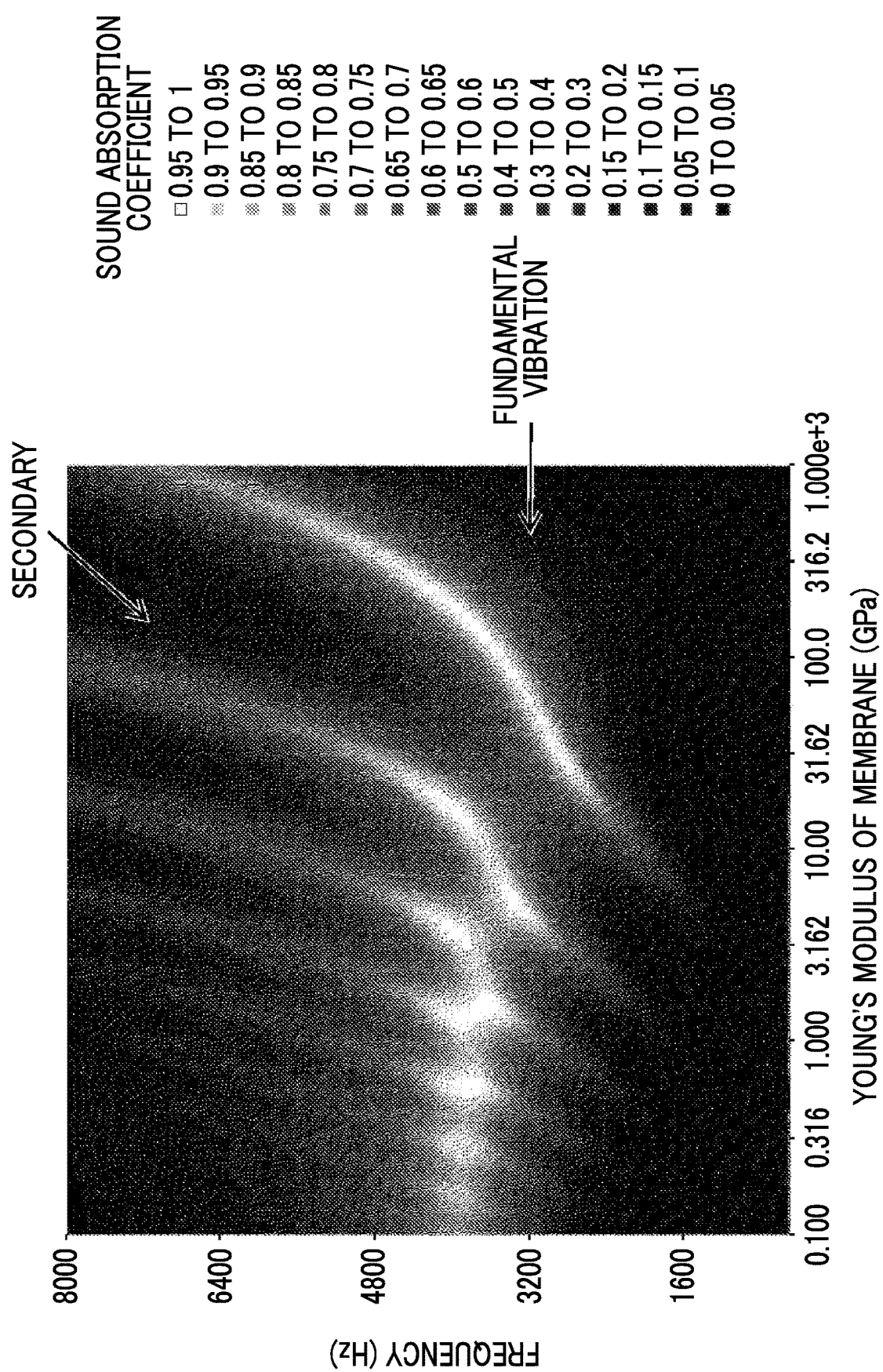
FIG. 38 is a graph showing a relationship between a Young's modulus of a membrane, a frequency, and a sound absorption coefficient.
Figure 39:
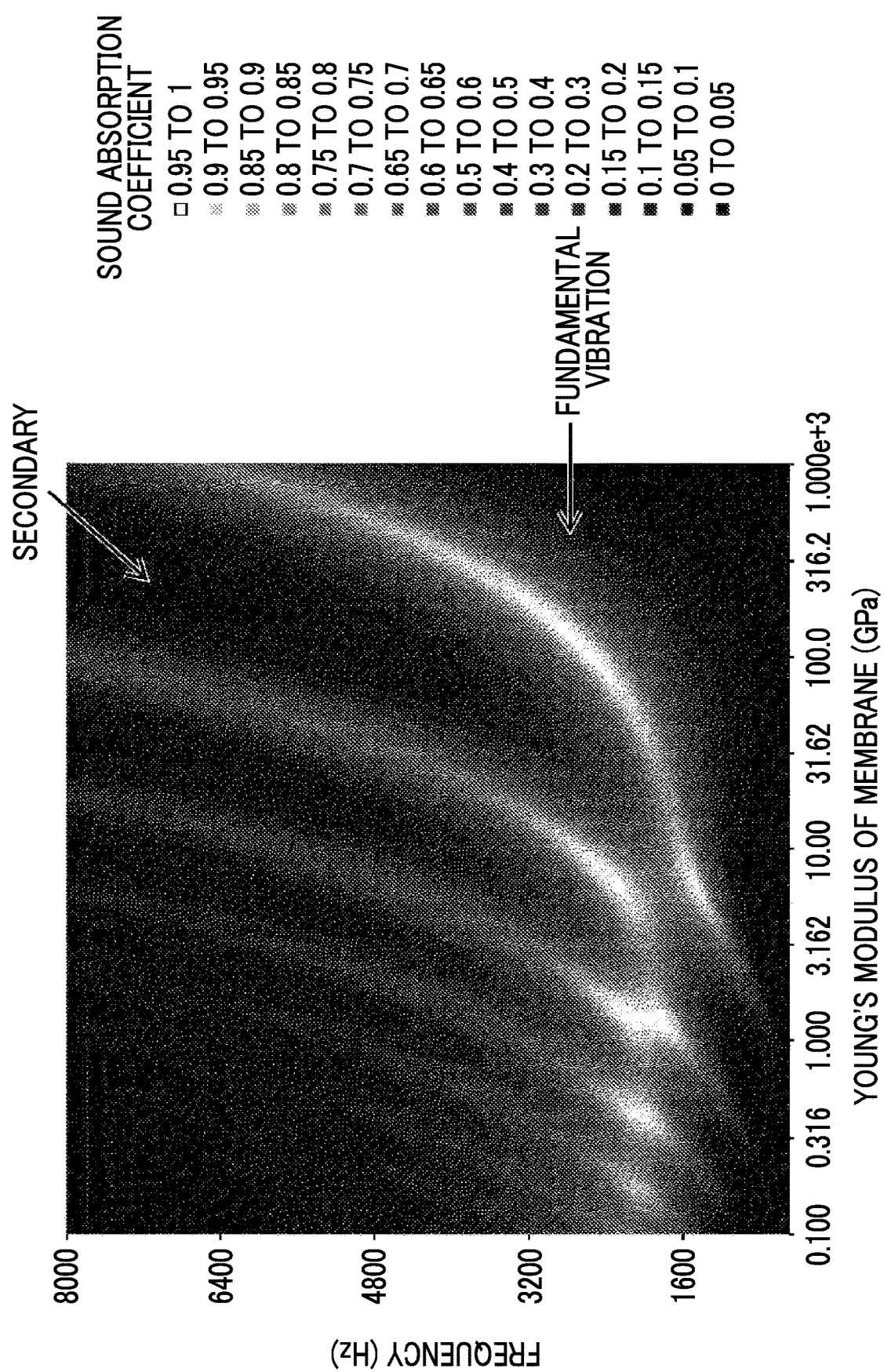
FIG. 39 is a graph showing a relationship between a Young's modulus of a membrane, a frequency, and a sound absorption coefficient.

FIGS. 38 and 39 show results in which sound absorption coefficients are obtained by performing the simulations by changing the Young's modulus of the membrane-like member in various ways in the same manner as described above except that the rear surface distance is set to 3 mm and 10 mm.

From FIGS. 38 and 39, it is also found that in a case where the membrane-like member is hard, the sound absorption in the fundamental vibration mode becomes dominant, and as the membrane-like member becomes softer, sound absorption in the high-order vibration mode becomes more dominant.

From FIGS. 37 to 39, it is found that in a case of sound absorption in the fundamental vibration mode, the frequency (peak frequency) at which the sound absorption coefficient becomes highest with respect to a change in the Young's modulus of the membrane-like member easily changes. In addition, it is found that the higher the order, the smaller the change in the peak frequency even in a case where the Young's modulus of the membrane-like member changes.

Further, on the side where the hardness of the membrane-like member is small (in the range of 100 MPa to 5 GPa), even in a case where the hardness of the membrane-like member changes, the sound absorption frequency hardly changes, and the vibration mode switches to a different order vibration mode. Therefore, even in a case where the softness of the membrane greatly changes due to an environmental change or the like, it can be used without substantially changing the sound absorption frequency.

In addition, it is found that the peak sound absorption coefficient is reduced in the region where the membrane-like member is soft. This is because the sound absorption due to the bending of the membrane-like member becomes small, and only the mass (weight) of the membrane-like member becomes important.

In addition, it is found from the comparison in FIGS. 37 to 39 that the peak frequency decreases as the rear surface distance increases. That is, it is found that the peak frequency can be adjusted by the rear surface distance.

Here, from FIG. 37, the Young's modulus at which the sound absorption coefficient in the high-order (secondary) vibration mode is higher than the sound absorption coefficient in the fundamental vibration mode (hereinafter, also referred to as "high-order vibration Young's modulus") is 31.6 GPa. In the same manner, from FIGS. 38 and 39, the Young's modulus at which the sound absorption coefficient in the high-order (secondary) vibration mode is higher than the sound absorption coefficient in the fundamental vibration mode are respectively 22.4 GPa and 4.5 GPa.

In addition, in cases of the rear surface distances of 4 mm, 5 mm, 6 mm, 8 mm, and 12 mm, a simulation is performed by variously changing the Young's modulus of the membrane-like member in the same manner as described above to obtain the sound absorption coefficient, and the Young's modulus at which the sound absorption coefficient in the high-order (secondary) vibration mode is higher than the sound absorption coefficient in the fundamental vibration mode is read. The results are shown in FIG. 40 and Table 4.

Figure 40:
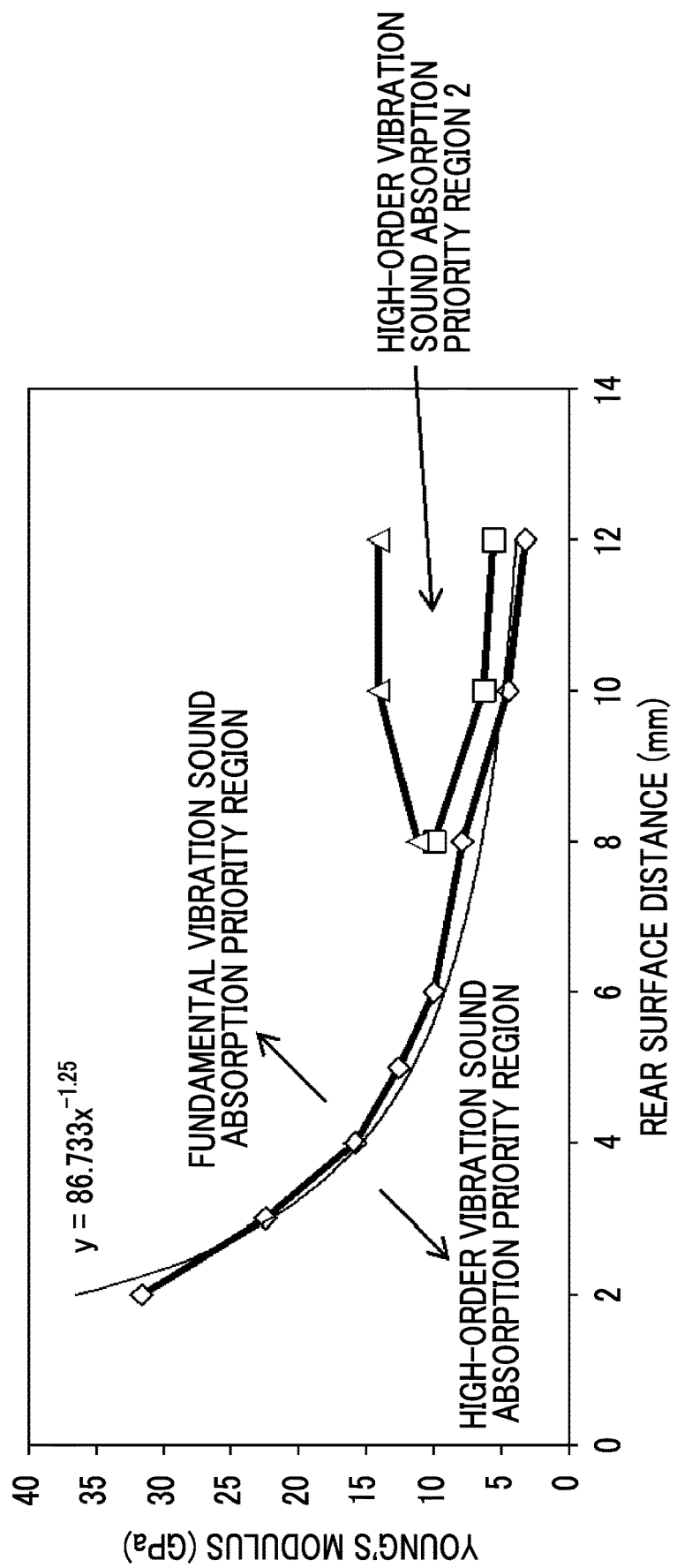
FIG. 40 is a graph showing a condition in which a sound absorption coefficient in a high-order vibration mode is higher than a sound absorption coefficient in a fundamental vibration mode, using a rear surface distance and a Young's modulus as parameters.

FIG. 40 is a graph in which the values of the rear surface distance and the Young's modulus where the sound absorption coefficient in the high-order vibration mode is higher than the sound absorption coefficient in the fundamental vibration mode are plotted. In a case where the rear surface distance is 8 mm, 10 mm, or 12 mm, the sound absorption coefficient in the fundamental vibration mode decreases as the Young's modulus of the membrane-like member decreases, but there is a region where the sound absorption coefficient once increases in a case where the sound absorption coefficient further decreases. Therefore, in a region where the Young's modulus of the membrane-like member is low, there is a region where the sound absorption coefficient in the high-order vibration mode and the sound absorption coefficient in the fundamental vibration mode are reversed again.

TABLE 4

| Rear surface distance mm | High-order vibration Young's modulus GPa | Re-inversion lower limit Young's modulus GPa | Re-inversion upper limit Young's modulus GPa |
|---|---|---|---|
| 2 | 31.6 | — | — |
| 3 | 22.4 | — | — |
| 4 | 15.8 | — | — |
| 5 | 12.6 | — | — |
| 6 | 10 | — | — |
| 8 | 7.9 | 10 | 11.2 |
| 10 | 4.5 | 6.3 | 14.1 |
| 12 | 3.2 | 5.6 | 14.1 |

In FIG. 40, a region on the lower left side of a line connecting the plotted points is a region where sound absorption in the high-order vibration mode is higher (high-order vibration sound absorption priority region), and a region on the upper right side is a region where sound absorption in the fundamental vibration mode is higher (fundamental vibration sound absorption priority region).

A boundary line between the high-order vibration sound absorption priority region and the fundamental vibration sound absorption priority region is represented by an approximate expression, $y=86.733 \times x^{-1.25}$.

Figure 41:
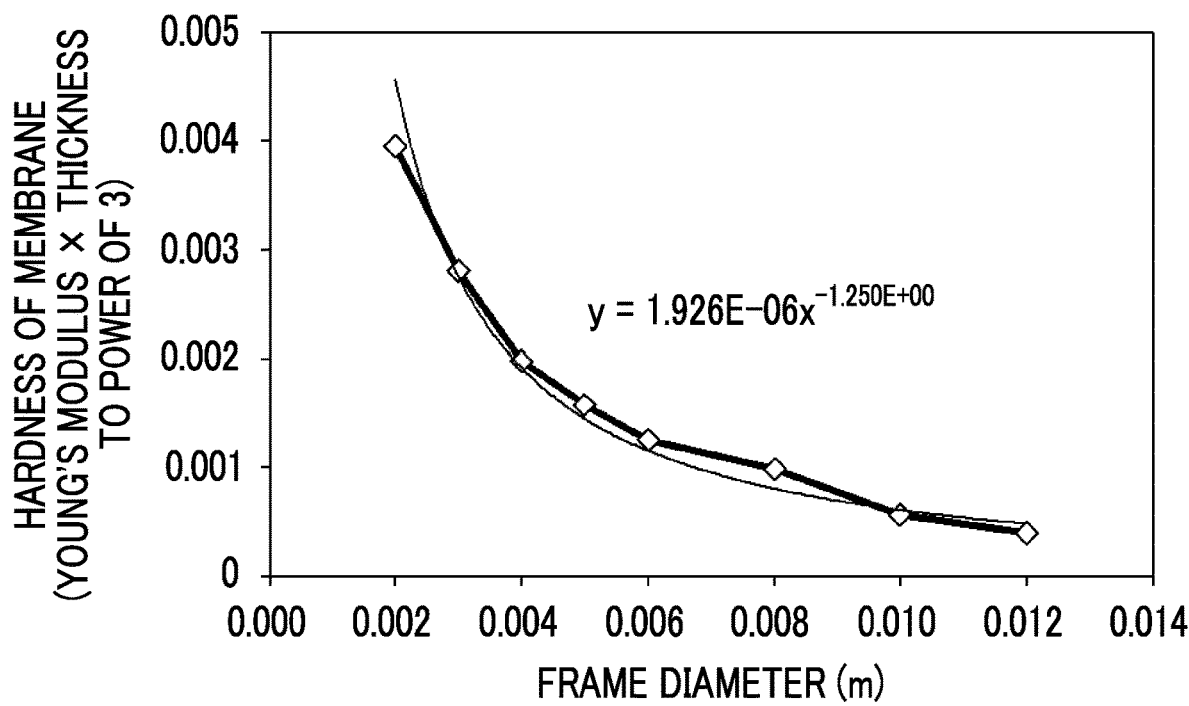
FIG. 41 is a graph showing a condition in which a sound absorption coefficient in a high-order vibration mode is higher than a sound absorption coefficient in a fundamental vibration mode, using a rear surface distance and a hardness of a membrane as parameters.

In addition, FIG. 41 shows a result of converting the graph shown in FIG. 40 into a relationship between the hardness ((Young's modulus)×(thickness)$^3$ (Pa·m$^3$)) of the membrane-like member and the rear surface distance (m). From FIG. 41, a boundary line between the high-order vibration sound absorption priority region and the fundamental vibration sound absorption priority region is represented by an approximate expression, $y=1.926\times10^{-6}\times x^{1.25}$. That is, in order to have a configuration in which the sound absorption coefficient at the frequency in the high-order vibration mode is higher than the sound absorption coefficient at the frequency in the fundamental vibration mode, it is necessary to satisfy $y \le 1.926\times10^{-6}\times x^{-1.25}$.

In a case where the Young's modulus of the membrane-like member is denoted by E (Pa), the thickness of the membrane-like member is denoted by t (m), and the thickness of the rear surface space (rear surface distance) is denoted by d (m), the above equation is expressed as $E \times t^3$ (Pa·m$^3$) $\le 1.926\times10^{-6} \times d^{-1.25}$.

Next, the influence of the diameter of the opening portion of the frame (hereinafter, also referred to as the frame diameter) is examined.

In cases where the rear surface distance is 3 mm and the diameters of the opening portion of the frame are set as 15 mm, 20 mm, 25 mm, and 30 mm, the simulation is performed by variously changing the Young's modulus of the membrane-like member in the same manner as described above, and the sound absorption coefficient is calculated, and a graph as shown in FIG. 37 is obtained. From the obtained graph, the Young's modulus at which the sound absorption coefficient in the high-order vibration mode is higher than the sound absorption coefficient in the fundamental vibration mode is read.

Figure 42:
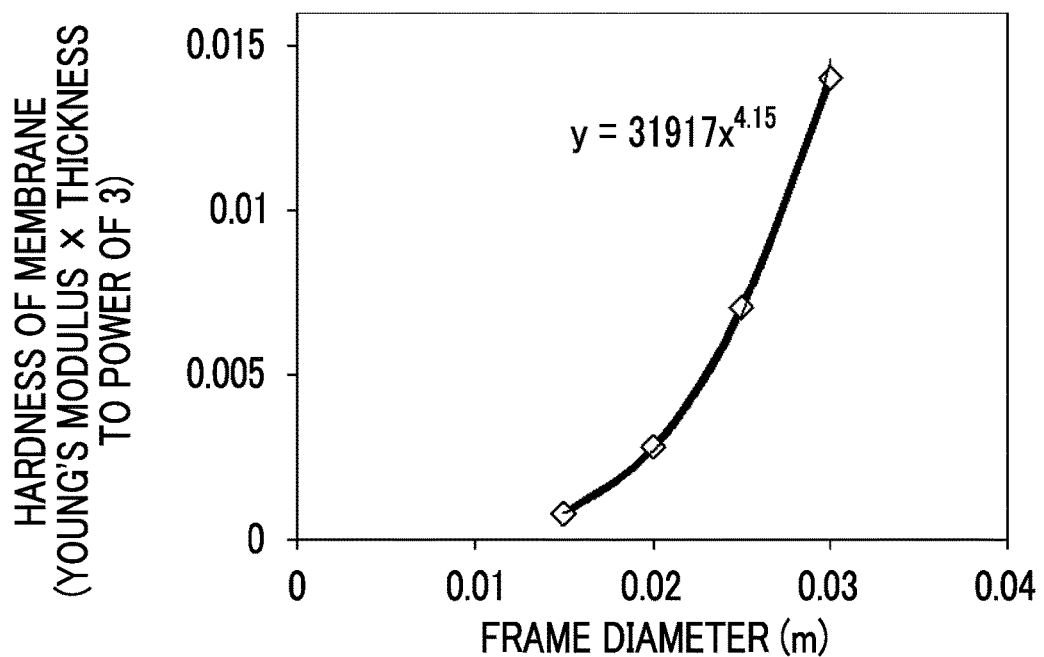
FIG. 42 is a graph showing a condition in which a sound absorption coefficient in a high-order vibration mode is higher than a sound absorption coefficient in a fundamental vibration mode, using a frame diameter and a hardness of a membrane as parameters.

The Young's modulus is converted into the hardness (Pa·m$^3$) of the membrane-like member, and the graph of the frame diameter (m) and the hardness of the membrane-like member shows points plotted where the sound absorption coefficient in the high-order vibration mode is higher than the sound absorption coefficient in the fundamental vibration mode. The results thereof are shown in FIG. 42. In FIG. 42, a line connecting the plotted points is represented by an approximate expression, $y=31917\times x^{4.15}$.

Figure 43:
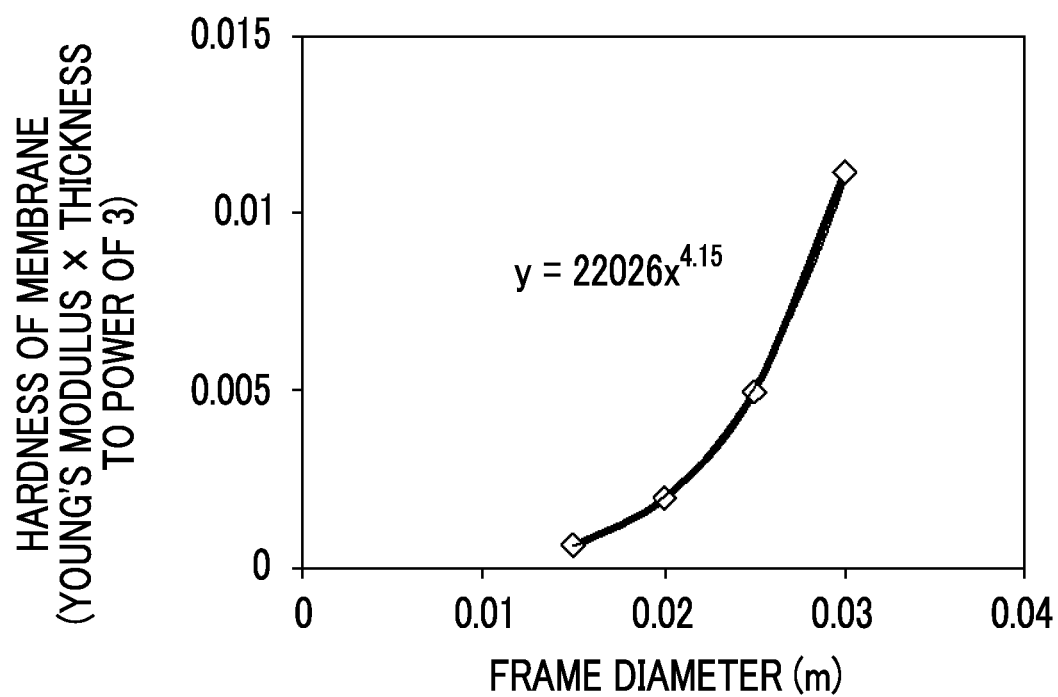
FIG. 43 is a graph showing a condition in which a sound absorption coefficient in a high-order vibration mode is higher than a sound absorption coefficient in a fundamental vibration mode, using a frame diameter and a hardness of a membrane as parameters.

The simulation is performed in the same manner for the case where the rear surface distance is 4 mm, and a graph plotting points where the sound absorption coefficient in the high-order vibration mode is higher than the sound absorption coefficient in the fundamental vibration mode is obtained. The results thereof are shown in FIG. 43. In FIG. 43, a line connecting the plotted points is represented by an approximate expression, $y=22026\times x^{4.15}$.

The same simulations are performed for other rear surface distances to obtain an approximate equation representing the boundary line between the high-order vibration sound absorption priority region and the fundamental vibration sound absorption priority region. In this case, the coefficients are different, but the index applied to the variable x is constant as 4.15.

The relational expression $E \times t^3$(Pa·m$^3$) $\le 1.926\times10^{-6} \times d^{-1.25}$ between the hardness (Pa·m$^3$) of the membrane-like member and the rear surface distance (m) obtained above is obtained in a case where the frame diameter is 20 mm, and accordingly, in a case where the frame diameter $\Phi$ (m) is incorporated as a variable in this equation using the frame diameter of 20 mm as a reference, $E \times t$ (Pa·m$^3$) $\le 1.926\times 10^{-6}\times\Phi^{4.15}$.

That is, by setting the hardness $E \times t^3$ (Pa·m$^3$) of the membrane-like member to be $21.6\times d^{-1.25}\times\Phi^{4.15}$ or less, the sound absorption coefficient in the high-order vibration mode can be higher than the sound absorption coefficient in the fundamental vibration mode.

The frame diameter $\Phi$ is a diameter of the opening portion of the frame, that is, a diameter of the region where the membrane-like member vibrates. In a case where the shape of the opening portion is other than a circle, the equivalent circle diameter may be used as $\Phi$.

Here, the equivalent circle diameter can be obtained by calculating the area of the membrane vibrating portion region and calculating a diameter of a circle having the same area as the area of the membrane vibrating portion region.

From the above results, in a case where the high-order vibration mode of the membrane-like member is used, a resonance frequency (sound absorption peak frequency) thereof is substantially determined by the size and rear surface distance of the membrane-like member, and it is found that even in a case where the hardness (Young's modulus) of the membrane changes due to a change in the surrounding environment, a change width of the resonance frequency is small, and the robustness against the environmental change is high.

Next, the density of the membrane-like member is examined.

By setting the density of the membrane-like member as 2.8 g/cm$^3$, thickness of the membrane-like member as 50 μm, the diameter of the opening portion of the frame as 20 mm, and the rear surface distance as 2 mm, the simulation is performed respectively by changing the Young's modulus of the membrane-like member from 100 MPa to 1000 GPa, and sound absorption coefficients are obtained. The results thereof are shown in FIG. 44.

Figure 44:
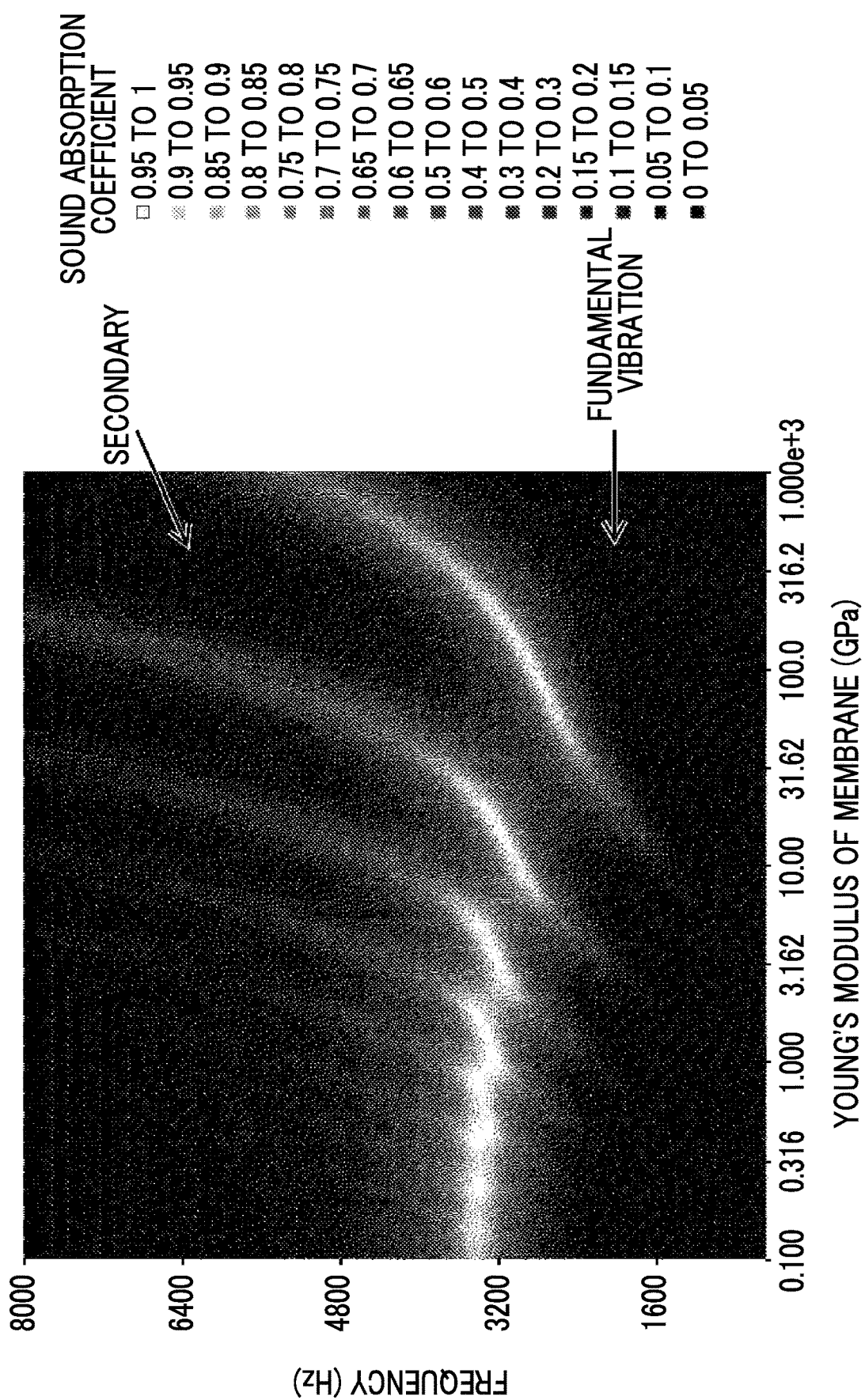
FIG. 44 is a graph showing a relationship between a Young's modulus of a membrane, a frequency, and a sound absorption coefficient.

From FIG. 44, it is found that the sound absorption in the fundamental vibration mode is dominant in a region where the Young's modulus of the membrane-like member is large, and the sound absorption frequency thereof is highly dependent on the hardness of the membrane. In addition, it is found that in the region where the Young's modulus of one of the membrane-like members is small, the sound absorption frequency hardly changes, even in a case where the hardness of the membrane changes.

From the comparison between FIG. 44 and FIG. 37 in which only the density of the membrane-like member is different, it is found that the frequency in the region where the membrane is soft is shifted to the low frequency side by increasing the density of the membrane-like member, that is, by increasing the mass of the membrane-like member. The frequency of the simulation shown in FIG. 37 is 3.4 kHz, and the frequency of the simulation shown in FIG. 44 is 4.9 kHz.

From FIG. 44, the Young's modulus at which the sound absorption coefficient in the high-order vibration mode is higher than the sound absorption coefficient in the fundamental vibration mode is 31.6 GPa. This value is the same as the result of FIG. 37 in which only the density of the membrane-like member is different. Therefore, it is found that although the frequency changes depending on the mass of the membrane-like member, the hardness of the membrane in which sound absorption in the high-order vibration mode is higher than sound absorption in the fundamental vibration mode does not depend on the mass of the membrane.

The simulation is performed in the same manner as the simulation shown in FIG. 44, except that the rear surface distances are changed to 3 mm, 4 mm, and 5 mm, and the Young's modulus at which the sound absorption coefficient in the high-order vibration mode is higher than the sound absorption coefficient in the fundamental vibration mode is obtained. The results thereof are shown in Table 5.

TABLE 5

| Rear surface distance mm | High-order vibration Young's modulus GPa |
| --- | --- |
| 2 | 31.6 |
| 3 | 22.4 |
| 4 | 15.8 |
| 5 | 12.6 |

From the comparison between Table 5 and Table 4, it is found that even assuming that the mass of the membrane-like member is different, in a case where the rear surface distance is as small as 2 mm to 5 mm, the high-order vibration Young's modulus does not change without depending on the mass of the membrane-like member.

In addition, by setting the density of the membrane-like member as 4.2 g/cm$^3$, thickness of the membrane-like member as 50 μm, the diameter of the opening portion of the frame as 20 mm, and the rear surface distance as 2 mm, the simulation is performed respectively by changing the Young's modulus of the membrane-like member from 100 MPa to 1000 GPa, and sound absorption coefficients are obtained. The results thereof are shown in FIG. 45.

Figure 45:
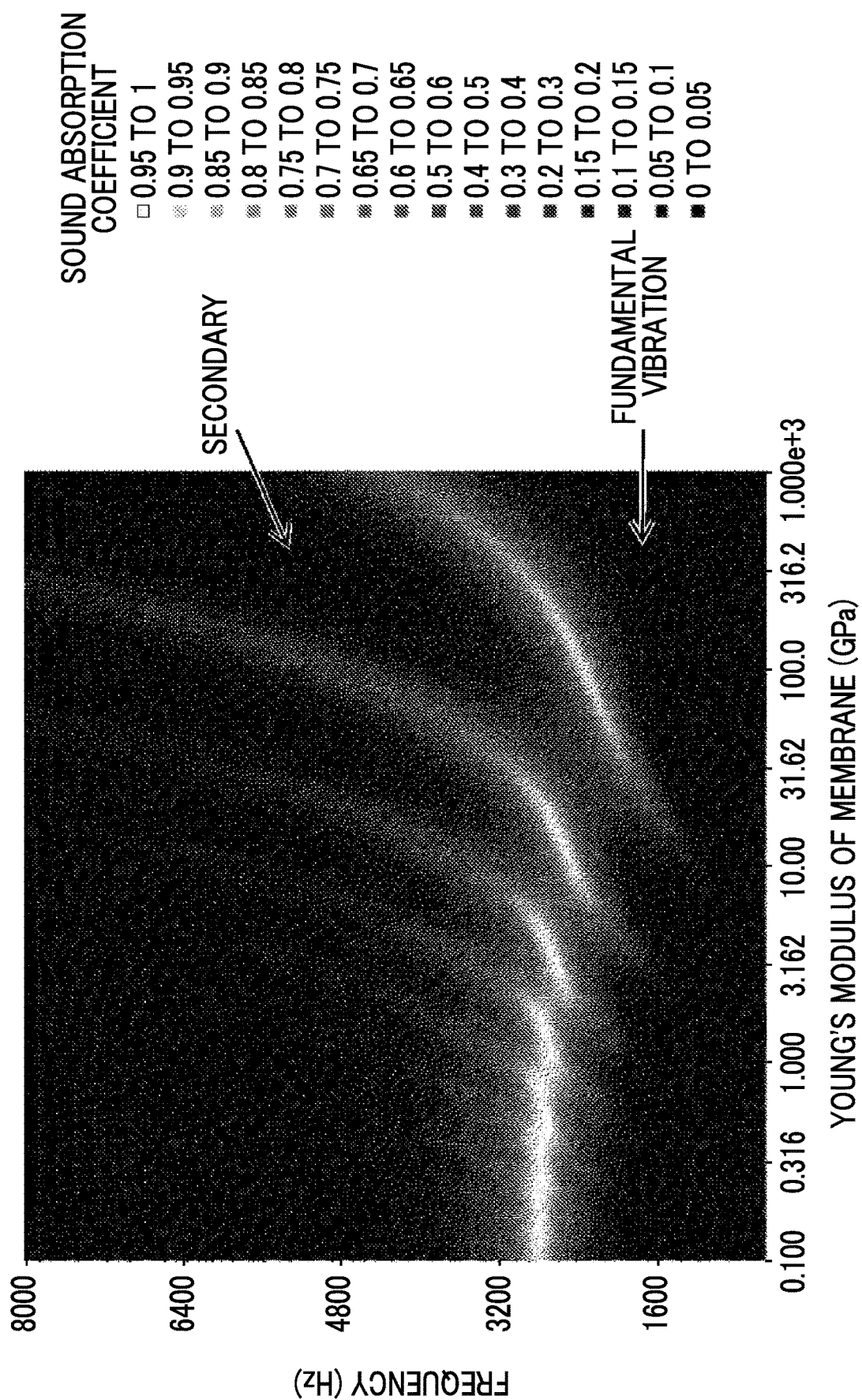
FIG. 45 is a graph showing a relationship between a Young's modulus of a membrane, a frequency, and a sound absorption coefficient.

From FIG. 45, even in a case where the density of the membrane-like member is higher, there is a region where the sound absorption coefficient in the high-order vibration mode is higher than the sound absorption coefficient in the fundamental vibration mode, and the Young's modulus at that time is 31.6 GPa.

Therefore, it is found that although the sound absorption peak frequency depends on the density of the membrane-like member, a relationship between the Young's modulus where the sound absorption coefficient in the high-order vibration mode is higher than the sound absorption coefficient in the fundamental vibration mode, and the rear surface distance does not change.

From the above, it is found that the relational expression $E \times t^3$ (Pa·m$^3$) $\leq 21.6 \times d^{-1.25} \times \Phi^{4.15}$ obtained above can be applied, even in a case where the density of the membrane-like member changes.

Figure 49:
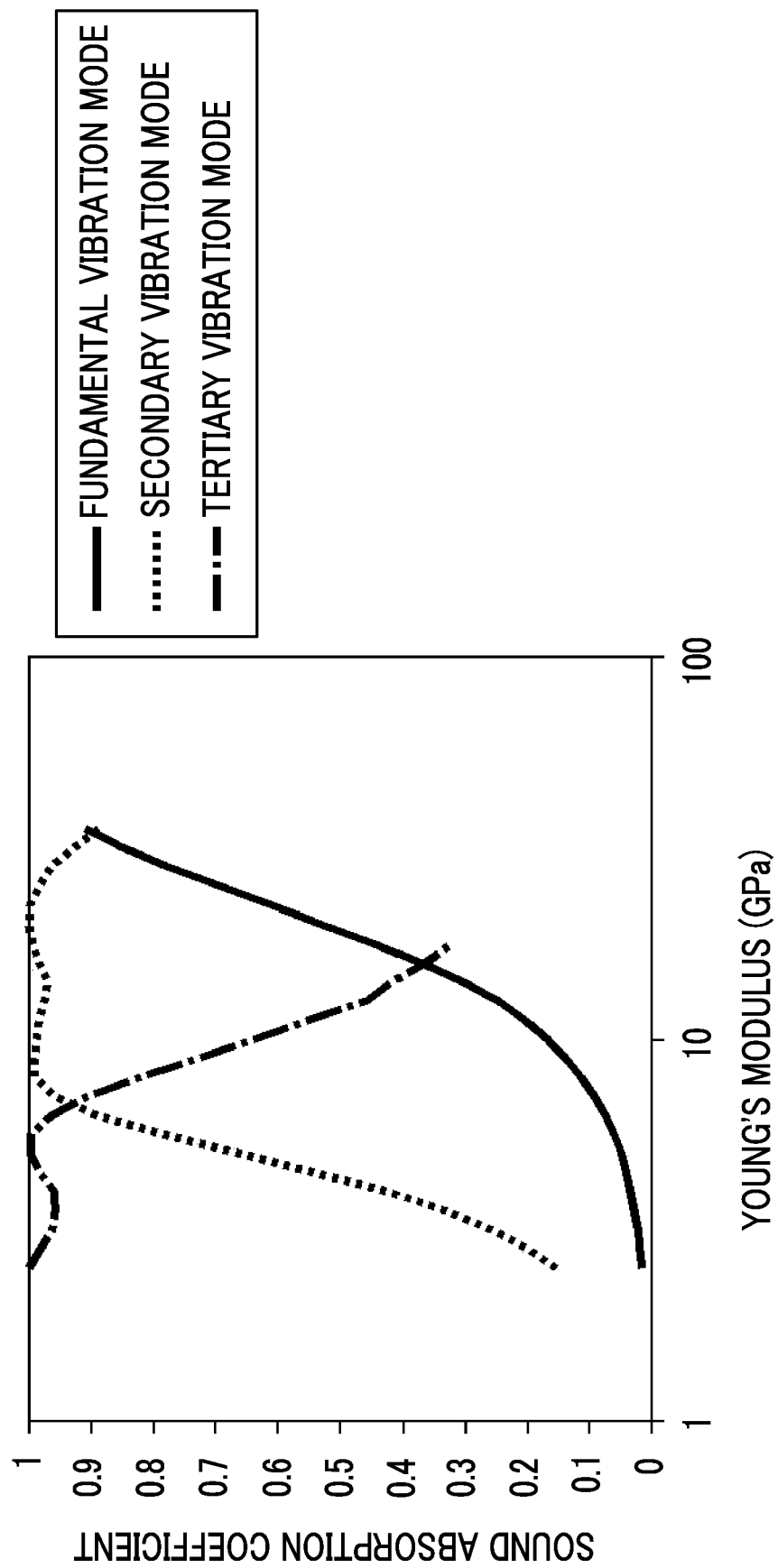
FIG. 49 is a graph showing a relationship between a Young's modulus and a sound absorption coefficient.

Here, in a case where the rear surface distance is 2 mm and the diameter of the opening portion of the frame is 20 mm, corresponding to FIG. 37, the sound absorption coefficient peaks respectively in the sound absorption in the fundamental vibration mode, the sound absorption in the secondary vibration mode, and the sound absorption in the tertiary vibration mode (sound absorption maximum values in respective modes) are obtained. FIG. 49 shows a relationship between each Young's modulus and the sound absorption coefficient.

From FIG. 49, it is found that the sound absorption coefficient changes in each vibration mode by changing the hardness (Young's modulus) of the membrane. In addition, it is found that the softer the membrane, the higher the sound absorption coefficient in the high-order vibration mode. That is, it is found that in a case where the membrane becomes soft, the sound absorption changes to the sound absorption in a high-order vibration mode.

Figure 50:
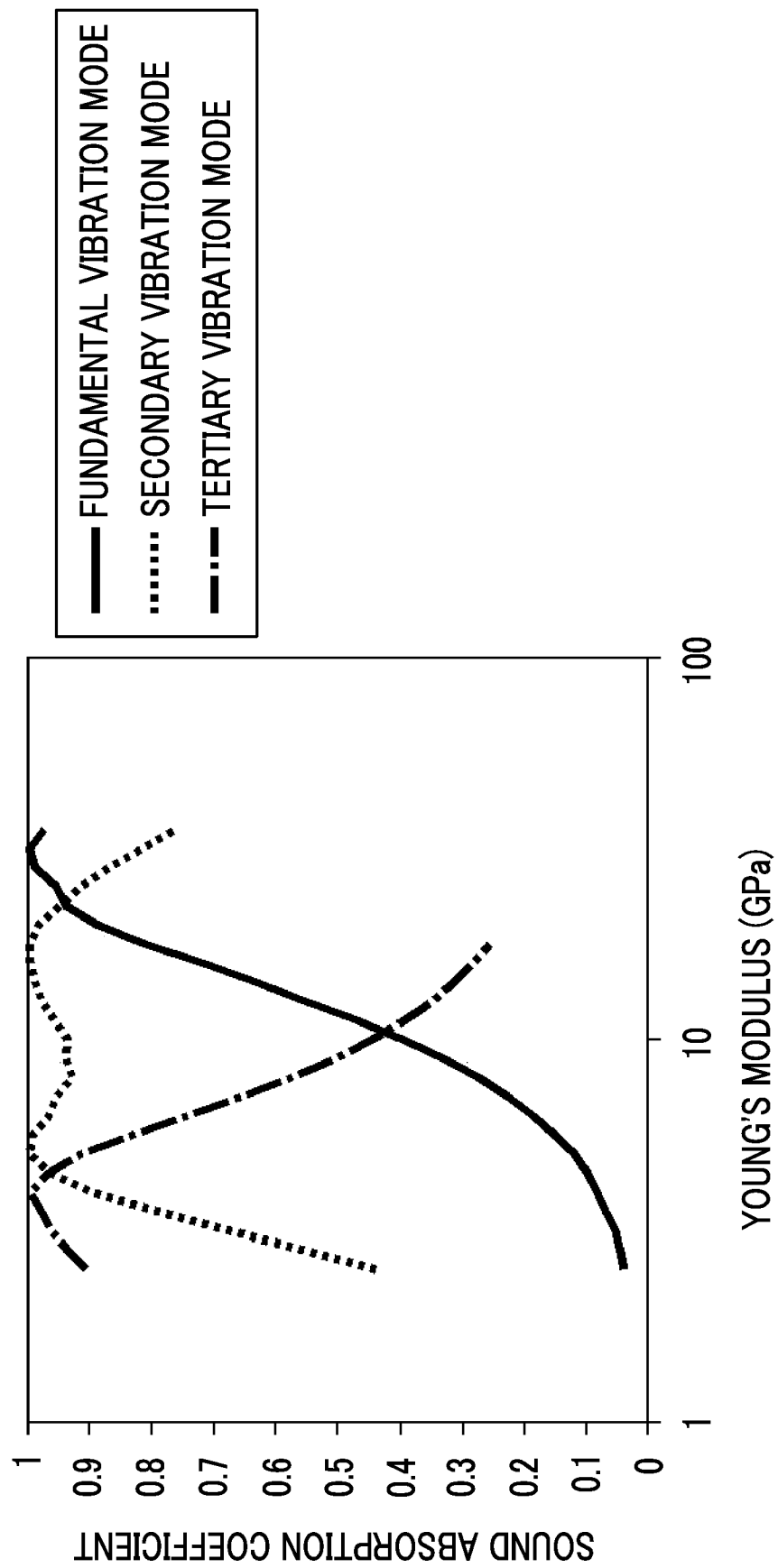
FIG. 50 is a graph showing a relationship between a Young's modulus and a sound absorption coefficient.

In the same manner as described above, in a case where the rear surface distance is 3 mm, corresponding to FIG. 39, the sound absorption coefficient peaks respectively in the sound absorption in the fundamental vibration mode, the sound absorption in the secondary vibration mode, and the sound absorption in the tertiary vibration mode are obtained. FIG. 50 shows a relationship between each Young's modulus and the sound absorption coefficient.

In FIGS. 49 and 50, the hardness of the membrane where the sound absorption coefficient in the fundamental vibration mode and the sound absorption coefficient in the secondary vibration mode are reversed corresponds to $21.6 \times d^{-1.25} \times \Phi^{4.15}$.

Here, a relational expression $E \times t^3 \leq 21.6 \times d^{-1.25} \times \Phi^{4.15}$ is obtained regarding a sound absorption coefficient of sound absorption in the fundamental vibration mode and sound absorption in the secondary vibration mode. In the same manner as described above, a coefficient on the right side can be obtained for the hardness of the membrane (Young's modulus×j thickness to the power of 3). That is, assuming that the coefficient on the right side is a, from $E \times t^3 = a \times d^{-1.25} \times \Phi^{4.15}$, the coefficient a corresponding to the Young's modulus E and the thickness t of the membrane that satisfies certain conditions can be obtained from $a = (E \times t^3)/(d^{-1.25} \times \Phi^{4.15})$.

The relationship between the coefficient a and the Young's modulus is obtained for each of the rear surface distance of 2 mm and the rear surface distance of 3 mm.

From FIGS. 49 and 50, a ratio of the peak sound absorption coefficient in the secondary vibration mode to the peak sound absorption coefficient in the fundamental vibration mode (sound absorption coefficient in the secondary vibration mode/sound absorption coefficient in the fundamental vibration mode, hereinafter, also referred to as sound absorption ratio) is obtained with respect to the Young's modulus.

The relationship between the sound absorption ratio and the Young's modulus is obtained for each of the rear surface distance of 2 mm and the rear surface distance of 3 mm.

Figure 51:
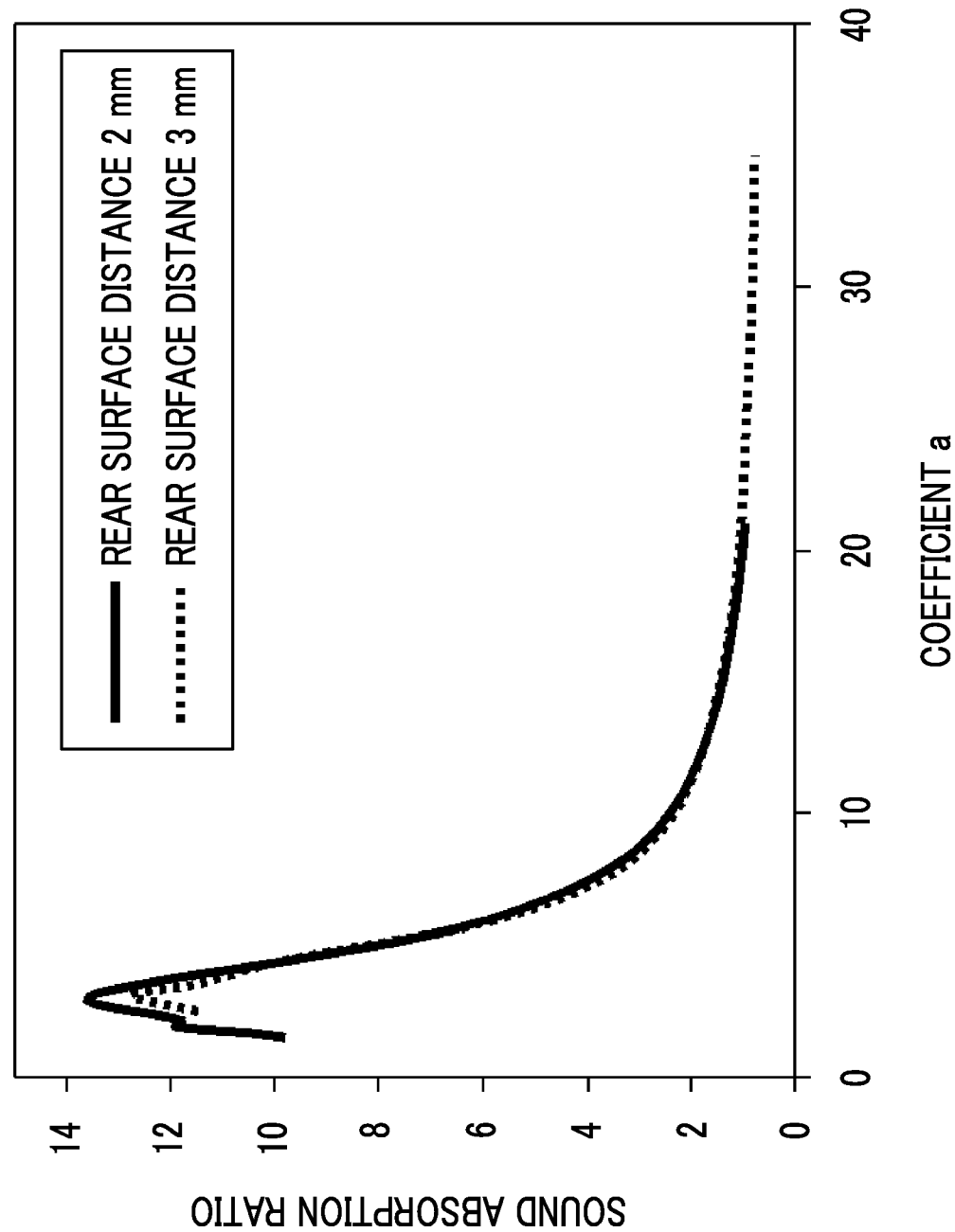
FIG. 51 is a graph showing a relationship between a coefficient a and a sound absorption ratio.

From the relationship between the coefficient a and the Young's modulus and the relationship between the Young's modulus and the sound absorption ratio described above, a relationship between the coefficient a and the sound absorption ratio is obtained for each of the rear surface distance of 2 mm and the rear surface distance of 3 mm. The results thereof are shown in FIG. 51.

The sound absorption coefficient with respect to the Young's modulus is different between the case where the rear surface distance is 2 mm and the case where the rear surface distance is 3 mm, since the hardness of the air spring due to the air in the rear surface of the membrane-like member is different (FIGS. 49 and 50). However, as shown in FIG. 51, in a case where the sound absorption ratio is indicated according to the coefficient a, it is found that the sound absorption ratio is determined regardless of the rear surface distance. Table 6 shows a relationship between the sound absorption ratio and the coefficient a.

TABLE 6

| Coefficient a | Sound absorption ratio |
| --- | --- |
| 11.1 | 2 |
| 8.4 | 3 |
| 7.4 | 4 |
| 6.3 | 5 |
| 5 | 8 |
| 4.2 | 10 |
| 3.2 | 12 |

From FIG. 51 and Table 6, it is found that the smaller the coefficient a, the larger the sound absorption ratio. In a case where the sound absorption ratio is high, sound absorption in a higher-order vibration mode appears more, and the effect of sound absorption by the compact and high-order vibration modes, which is a feature of the present invention, can be significantly exhibited.

Here, as can be seen from Table 6, the coefficient a is preferably 11.1 or less, 8.4 or less, 7.4 or less, 6.3 or less, 5.0 or less, 4.2 or less, or 3.2 or less.

In addition, from another viewpoint, in a case where the coefficient a is 9.3 or less, the tertiary vibration sound absorption is higher than the fundamental vibration sound absorption coefficient. Therefore, it is also preferable that the coefficient a is 9.3 or less.

Next, the sound absorption peak frequency in a region where the Young's modulus is significantly low, that is, a region where the membrane is soft is examined.

Figure 46:
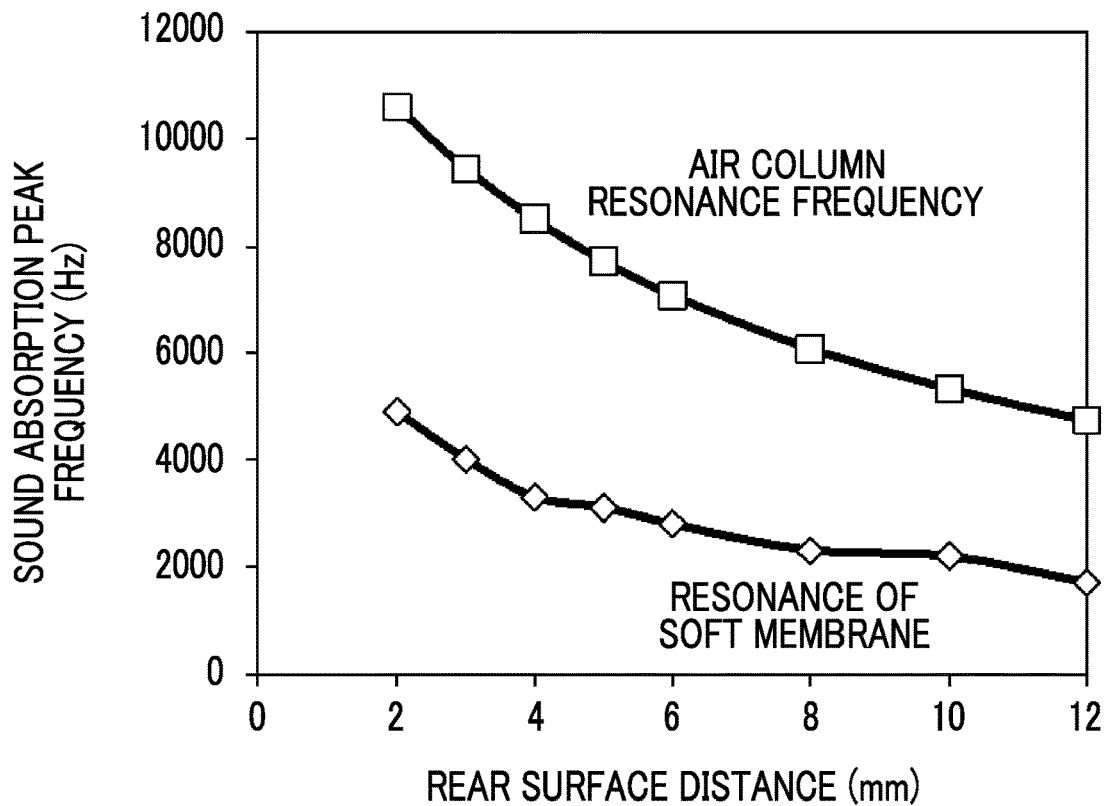
FIG. 46 is a graph showing a relationship between a rear surface distance and a sound absorption peak frequency.

First, the sound absorption peak frequency in a case where the Young's modulus is 100 MPa is read from FIG. 37 and the like, in the simulation results in a case where the density of the membrane-like member is 1.4 g/cm$^3$. The results thereof are shown in FIG. 46. FIG. 46 is a graph showing a relationship between a rear surface distance and a sound absorption peak frequency with a Young's modulus of 100 MPa.

From FIG. 46, it is found that the sound absorption peak frequency is on a low frequency side, as the rear surface distance increases.

Here, a comparison is made with a simple air column resonance tube without a membrane. For example, an antifouling structure having a rear surface distance of 2 mm is compared with air column resonance in a case where a length of the air column resonance tube is 2 mm. In a case where the rear surface distance is 2 mm, the resonance frequency in the air column resonance tube is around 10,600 Hz, even in a case where an open end correction is added. The resonance frequency of the air column resonance is also plotted in FIG. 46.

From FIG. 46, it is found that in the region where the membrane is soft, the sound absorption peak frequency converges to a certain frequency with robustness, but the frequency is not the air column resonance frequency but the sound absorption peak at a lower frequency side. In other words, by attaching a membrane and performing the sound absorption in a high-order vibration mode, a compact sound absorbing structure that has robustness against a change of the membrane-like member and has a smaller rear surface distance compared to the air column resonance tube is realized.

On the other hand, in a case where the membrane is extremely soft, the sound absorption coefficient decreases. This is because the pitch of the antinodes and nodes of the membrane vibration becomes finer as the membrane vibration shifts to a higher order, and the bending due to the vibration becomes smaller, so that the sound absorbing effect is reduced.

In the same manner as described above, the sound absorption peak frequency in a case where the Young's modulus is 100 MPa is read from FIG. 44 and the like, in the simulation results in a case where the density of the membrane-like member is 2.8 g/cm$^3$. The results thereof are shown in FIG. 47.

Figure 47:
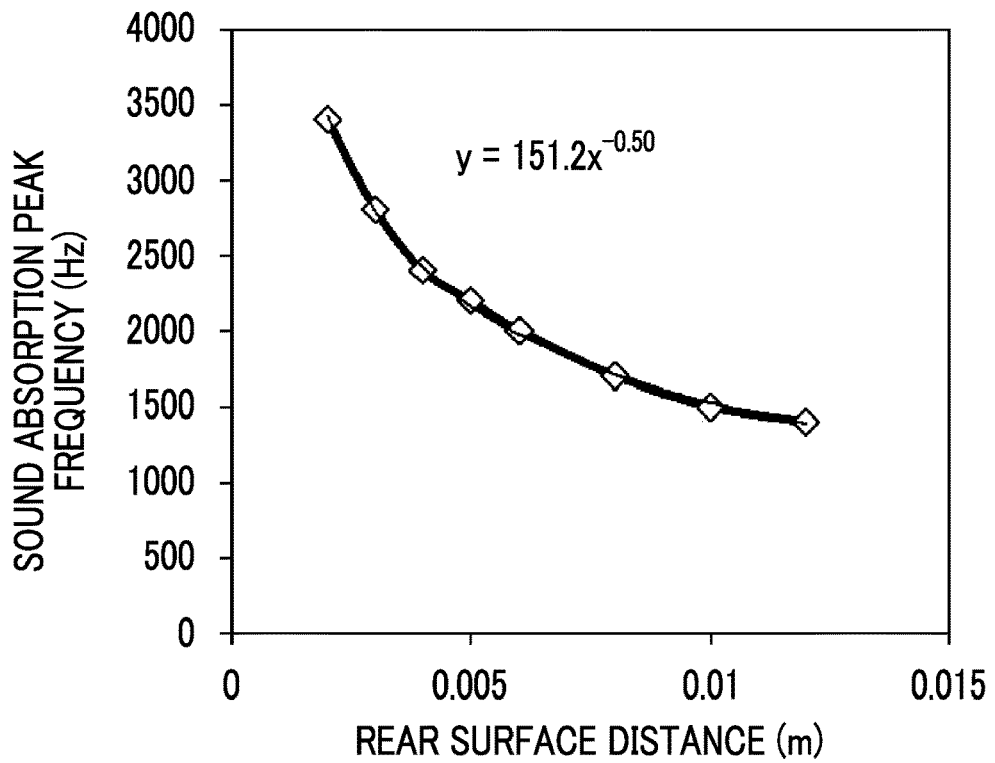
FIG. 47 is a graph showing a relationship between a rear surface distance and a sound absorption peak frequency.

From FIG. 47, since the sound absorption peak frequency is lower than that of the air column resonance tube, a compact sound absorbing structure with a small rear surface distance can be realized.

In addition, summarizing the approximate expression from the graph shown in FIG. 47, it is found that, in a region where the membrane is soft, the sound absorption peak frequency is proportional to the rear surface distance to the 0.5 power.

Figure 48:
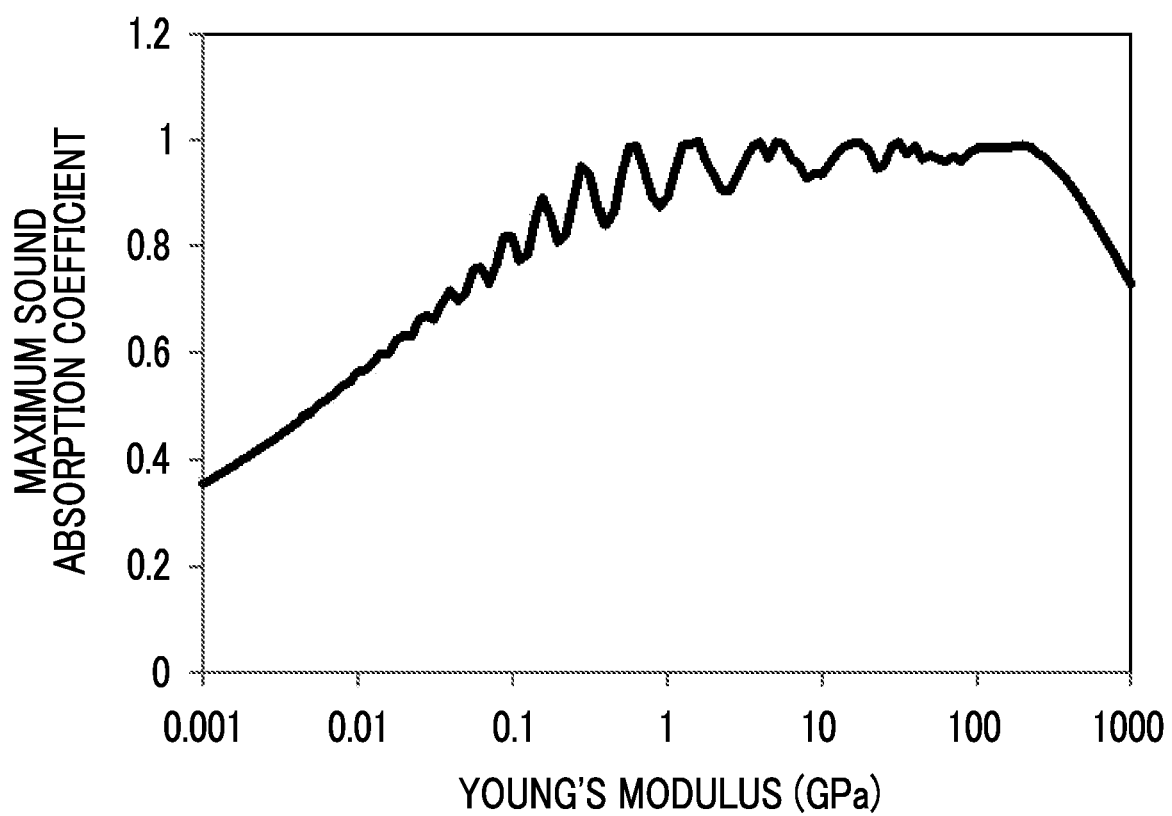
FIG. 48 is a graph showing a relationship between a Young's modulus and a maximum sound absorption coefficient.

Further, in order to examine even a soft membrane, the maximum sound absorption coefficient in a case where the Young's modulus is changed from 1 MPa to 1000 GPa is examined. The calculation is performed with a frame diameter of 20 mm, a thickness of the membrane-like member of 50 μm, and a rear surface distance of 3 mm. FIG. 48 shows the maximum sound absorption coefficient with respect to the Young's modulus. In the graph shown in FIG. 48, a waveform of the maximum sound absorption coefficient vibrates near the hardness at which the vibration mode in which a sound is absorbed is switched. In addition, it is found that the sound absorption coefficient is reduced, in a case of the soft membrane in which the thickness of the membrane-like member is 50 μm and the Young's modulus is approximately 100 MPa or less.

Table 7 shows a hardness of the membrane corresponding to the Young's modulus at which the maximum sound absorption coefficient exceeds 40%, 50%, 70%, 80%, and 90%, and a hardness with which the sound absorption coefficient remains to exceed 90%, even in a case where the vibration mode order of the maximum sound absorption of the membrane is shifted.

From Table 7, it is found that the hardness $E \times t^3$ (Pa·m$^3$) of the membrane-like member is preferably $2.49 \times 10^{-7}$ or more, more preferably $7.03 \times 10^{-7}$ or more, even more preferably $4.98 \times 10^{-6}$ or more, still preferably $1.11 \times 10^{-5}$ or more, particularly preferably $3.52 \times 10^{-5}$ or more, and most preferably $1.40 \times 10^{-4}$ or more.

TABLE 7

| Young's modulus MPa | Hardness of membrane E × m³ | Standard of maximum sound absorption coefficient |
| --- | --- | --- |
| 2 | 2.49E−07 | >40% |
| 5.6 | 7.03E−07 | >50% |
| 39.8 | 4.98E−06 | >70% |
| 89.1 | 1.11E−05 | >80% |
| 281.3 | 3.52E−05 | >90% |
| 1122 | 1.40E−04 | Without vibration >90% |

Hereinafter, materials forming each portion of the soundproof structure 10 (that is, the plate-like member 14, the membrane-like member 12, the inner frame 18, and the outer frame 19) will be described.

<Frame Material>

The material of the inner frame 18 and the outer frame 19 (hereinafter referred to as a frame material) is a material that does not vibrate (resonate) with the membrane-like member 12, that is, a rigid body, and specific examples thereof include a metal material, a resin material, a reinforced plastic material, and a carbon fiber. Examples of the metal material include metal materials such as aluminum, titanium, magnesium, tungsten, iron, steel, chromium, chromium molybdenum, nichrome molybdenum, copper, and alloys thereof. Examples of the resin material include resin materials such as an acrylic resin, polymethyl methacrylate, polycarbonate, polyamideide, polyarylate, polyetherimide, polyacetal, polyetheretherketone, polyphenylenesulfide, polysulfone, polyethylene terephthalate, polybutylene terephthalate, polyimide, an ABS resin (acrylonitrile-butadiene-styrene copolymerized synthetic resin), polypropylene, and triacetyl cellulose. Examples of the reinforced plastic material include carbon fiber reinforced plastics (CFRP) and glass fiber reinforced plastics (GFRP). In addition, examples thereof include natural rubber, chloroprene rubber, butyl rubber, ethylene propylene diene rubber (EPDM), silicone rubber, and the like, and rubbers having a crosslinked structure thereof.

In addition, various honeycomb core materials can be used as the frame material. Since the honeycomb core material is used as a lightweight and high stiffness material, ready-made products are easily available. The honeycomb core material formed of various materials such as an aluminum honeycomb core, an FRP honeycomb core, a paper honeycomb core (manufactured by Shin Nippon Feather Core Co., Ltd. and Showa Aircraft Industry Co., Ltd.), a thermoplastic resin (specifically, a polypropylene (PP), a polyethylene terephthalate (PET), a polyethylene (PE), a polycarbonate (PC), and the like), and a honeycomb core (TECCELL manufactured by Gifu Plastics Industry Co., Ltd.) can be used as the frame material.

In addition, a structure containing air, that is, a foamed material, a hollow material, a porous material, or the like can also be used as the frame material. In order to prevent the air flow between cells in a case of using a large number of membrane type soundproof structures, a frame can be formed using, for example, a closed-cell foamed material. For example, various materials such as closed-cell polyurethane, closed-cell polystyrene, closed-cell polypropylene, closed-cell polyethylene, and closed-cell rubber sponge can be selected. The use of closed-cell foam body is suitably used as the frame material, since it prevents a flow of sound, water, gas, and the like and has a high structural hardness, compared to an open-cell foam body. In a case where the above-described porous sound absorbing body has sufficient supporting properties, the frame may be formed only of the porous sound absorbing body, or the materials described as the materials of the porous sound absorbing body and the frame may be combined by, for example, mixing, kneading, or the like. As described above, the weight of the device can be reduced by using a material system containing air inside. In addition, heat insulation can be provided.

The frame material is preferably a material having higher heat resistance than the flame-retardant material because the soundproof structure 10 can be disposed in a place where the temperature becomes high. The heat resistance can be defined, for example, by a time to satisfy Article 108-2 of the Building Standard Law Enforcement Order. In a case where the time to satisfy Article 108-2 of the Building Standard Law Enforcement Order is 5 minutes or longer and shorter than 10 minutes, it is defined as a flame-retardant material, in a case where the time is 10 minutes or longer and shorter than 20 minutes, it is defined as a quasi-noncombustible material, and in a case where the time is 20 minutes or longer, it is defined as a noncombustible material. However, the heat resistance is often defined for each application field. Therefore, in accordance with the field in which the soundproof structure is used, the frame material may consist of a material having heat resistance equivalent to or higher than flame retardance defined in the field.

A shape of the frame will be additionally described. The thickness of the frame (a difference between the outer diameter and the inner diameter in a case of a cylindrical frame) and the thickness are not particularly limited as long as the membrane-like member 12 can be reliably fixed and supported by the frame, and can be appropriately set according to, for example, the size (inner diameter) of the opening portion 20 formed in the frame.

<Membrane Material>

Examples of the material (hereinafter, a membrane material) of the membrane-like member 12 include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), a cycloolefin polymer (COP), ZEONOR, polycarbonate, polyethylene naphthalate (PEN), polypropylene (PP), polystyrene (PS), polyarylate (PAR), aramid, polyphenylene (PPS), polyethersulfone (PES), nylon, polyester (PEs), a cyclic and olefin copolymer (COC), diacetylcellulose, nitrocellulose, cellulose derivatives, polyamide, polyamideimide, polyoxymethylene (POM), polyether imide (PEI), polyrotaxane (such as a slide ring material), and polyimide. In addition, a glass material such as thin membrane glass, and a fiber reinforced plastic material such as carbon fiber reinforced plastic (CFRP) and glass fiber reinforced plastic (GFRP) can also be used. In addition, examples thereof include natural rubber, chloroprene rubber, butyl rubber, EPDM, silicone rubber, and the like, and rubbers having a crosslinked structure thereof. Alternatively, a material obtained by combining these may be used as the membrane material.

From a viewpoint of excellent durability against heat, ultraviolet rays, external vibration, and the like, it is preferable to use a metal material as the membrane material in applications requiring durability. In a case of using a metal material, the surface may be plated with metal from a viewpoint of suppressing rust and the like.

The method of fixing the membrane-like member 12 to the frame is not particularly limited, and a method using a double-sided tape or an adhesive, a mechanical fixing method such as screwing, or pressure bonding can be suitably used. Here, similarly to the frame material and the membrane material, it is preferable to select a fixing means from the viewpoint of heat resistance, durability, and water resistance. For example, in the case of fixing using an adhesive, "Super X" series manufactured by Cemedine Co., Ltd., "3700 series (heat resistant)" manufactured by Three Bond Co., Ltd., and heat-resistant epoxy adhesive "Duralco series" manufactured by Taiyo Wire Cloth Co., may be selected as the fixing means. In a case of fixing using a double-sided tape, a high heat resistant double-sided adhesive tape 9077 made by 3M may be selected as the fixing means. As described above, various fixing means can be selected according to the required properties.

<Material of Plate-Like Member>

As with the membrane material, examples of the material of the plate-like member include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), a cycloolefin polymer (COP), ZEONOR, polycarbonate, polyethylene naphthalate (PEN), polypropylene (PP), polystyrene (PS), polyarylate (PAR), aramid, polyphenylene (PPS), polyethersulfone (PES), nylon, polyester (PEs), a cyclic and olefin copolymer (COC), diacetylcellulose, nitrocellulose, cellulose derivatives, polyamide, polyamideimide, polyoxymethylene (POM), polyether imide (PEI), polyrotaxane (such as a slide ring material), and polyimide. In addition, a glass material, and a fiber reinforced plastic material such as carbon fiber reinforced plastic (CFRP) and glass fiber reinforced plastic (GFRP) can also be used. In addition, examples thereof include natural rubber, chloroprene rubber, butyl rubber, EPDM, silicone rubber, and the like, and rubbers having a crosslinked structure thereof. Alternatively, a material obtained by combining these may be used as the membrane material.

In addition, by selecting a transparent member such as a resin material or glass for both the inner frame 18 and outer frame 19 and the membrane-like member 12 and plate-like member 14, the soundproof structure 10 itself can be made transparent. For example, a transparent resin such as PET, acryl, or polycarbonate may be selected. A porous sound absorbing material generally used is unique in that a transparent soundproof structure can be realized since the porous material scatters visible light, so that generation of scattered light cannot be prevented.

Further, the inner frame 18 and the outer frame 19 and/or the membrane-like member 12 and the plate-like member 14 may be provided with an antireflection coating or an antireflection structure. For example, an antireflection coating using optical interference by a dielectric multilayer membrane can be formed. By preventing the reflection of visible light, the visibility of the inner frame 18 and outer frame 19 and/or the membrane-like member 12 and plate-like member 14 can be further reduced and made inconspicuous.

By doing so, the transparent soundproof structure can be attached to, for example, a window member or used as an alternative.

In addition, the inner frame 18 and outer frame 19 or the membrane-like member 12 and plate-like member 14 may have a heat shielding function. Generally, a metal material reflects both near-infrared rays and far-infrared rays, and accordingly, radiant heat conduction can be suppressed. In addition, even in a case of a transparent resin material or the like, it is possible to reflect only the near-infrared rays while keeping it transparent by providing a heat shielding structure on a surface thereof. For example, the near-infrared rays can be selectively reflected while transmitting visible light by a dielectric multilayer structure. Specifically, since multilayer Nano series such as Nano90s manufactured by 3M has a layer configuration of more than 200 layers and selectively reflects near-infrared rays by optical interference while transmitting visible light, such a structure may be bonded to a transparent resin material to be used as a frame or a membrane-like member, or this member itself may be used as the membrane-like member 12. For example, as a substitute for the window member, a structure having sound absorbing properties and heat shielding properties can be used.

In a system in which an environmental temperature changes, it is desirable that both the material of the inner frame 18 and outer frame 19 and the membrane-like member 12 and the plate-like member 14 have a small change in physical properties with respect to the environmental temperature.

For example, in a case of using a resin material, it is desirable to use a material having a point at which a significant change in physical properties is caused (glass transition temperature, melting point, or the like) that is beyond the environmental temperature range.

In addition, in a case where different members are used for the frame and the membrane-like member, it is desirable that thermal expansion coefficient (linear thermal expansion coefficient) at the environmental temperature is substantially the same.

In a case where the thermal expansion coefficient is greatly different between the frame and the membrane-like member, an amount of displacement between the frame and the membrane-like member changes in a case where the environmental temperature changes, and accordingly, a distortion easily occurs on the membrane. Since a distortion and a tension change affect the resonance frequency of the membrane, a sound reduction frequency easily changes according to a temperature change, and even in a case where the temperature returns to the original temperature, the sound reduction frequency may remain as changed, without relexing the distortion.

In contrast, in a case where the thermal expansion coefficiency is substantially the same, the frame and the membrane-like material expand and contract in the same manner with respect to a temperature change, so that the distortion hardly occurs, thereby exhibiting sound reduction properties stable with respect to a temperature change.

The linear expansion factor is known as an index of the thermal expansion coefficient, and can be measured by a well-known method such as JISK7197. A difference in linear expansion coefficiency between the frame and the membrane-like material is preferably 9 ppm/K or less, more preferably 5 ppm/K or less, and even more preferably 3 ppm/K or less, in an environmental temperature range used. By selecting a member from such a range, it is possible to exhibit a stable sound reduction properties at the environmental temperature used.

Since the soundproof structure 10 can be disposed at a place where the temperature becomes high, the plate-like member is preferably a flame-retardant material, a non-flammable material, or a material having high heat resistance.

<<Modification Example of Soundproof Structure According to Embodiment of Present Invention>>

Although the configuration of the soundproof structure according to an example of the embodiment of the present invention (that is, the soundproof structure 10) has been described above, the content is only one of the configuration examples of the soundproof structure according to the embodiment of the present invention, and other configurations are also conceivable. Hereinafter, a modification example of the soundproof structure according to the embodiment of the present invention will be described.

In the configuration of the soundproof structure 10 described above, the support 16 that supports the membrane-like member 12 is configured by a plurality of cylindrical frames. However, the support 16 may be any as long as it supports the membrane-like member 12 so as to perform the membrane vibration and supports the plate-like member 14, and for example, may be a portion of a housing of various electronic apparatus. In a case of adopting such a configuration, a frame as the support 16 may be integrally formed on the housing in advance. In this way, the membrane-like member 12 and the plate-like member 14 can be attached later.

In addition, the support 16 is not limited to the frame, and may consist of a flat plate (base plate). In a case of adopting such a configuration, by using a curved plate as the plate-like member 14 to fix the end portion thereof to the support 16, and by curving the membrane-like member 12 to fix the end portion thereof to the end portion of the plate-like member 14, the membrane-like member 12 can be supported so as to perform the membrane vibration while securing the rear surface space 24 and the first space 26.

In addition, it may have a configuration that after the edge portion of the membrane-like member 12 is fixed to the member with an adhesive or the like, pressure is applied from the rear surface side thereof (the inner side in the thickness direction) to expand the membrane portion 12a of the membrane-like member 12, and then the rear surface side is covered with a plate or the like. Alternatively, the plate-like member 14 may be fixed to the bottomed tubular frame, and then the curved membrane-like member 12 may be fixed to the edge portion.

Further, the frame constituting the support 16 is not limited to a cylindrical shape, and may have various shapes as long as the frame can support the membrane-like member 12 so as to vibrate. For example, a frame having a rectangular tube shape (a shape in which the opening portion 20 is formed in a rectangular parallelepiped outer shape) may be used.

In addition, in the configuration of the soundproof structure 10 described above, the rear surface space 24 and the first space 26 communicate with each other by the through-hole 14a formed in the plate-like member 14, but the rear surface space 24 and the first space 26 (the internal space of the soundproof structure) are completely shielded from the space outside the soundproof structure 10. However, the present invention is not limited to thereto, and the internal space of the soundproof structure needs only be partitioned such that the flow of air into the inside is obstructed, and need not necessarily be a completely closed space. That is, a hole or a slit may be drilled in a portion of the membrane-like member 12, and the outer frame 19 and the inner frame 18 surrounding the space. By providing the hole or the slit in the portion of the membrane-like member 12, and the outer frame 19 and the inner frame 18, the sound absorption peak frequency in the soundproof structure 10 can be changed.

Figure 22:
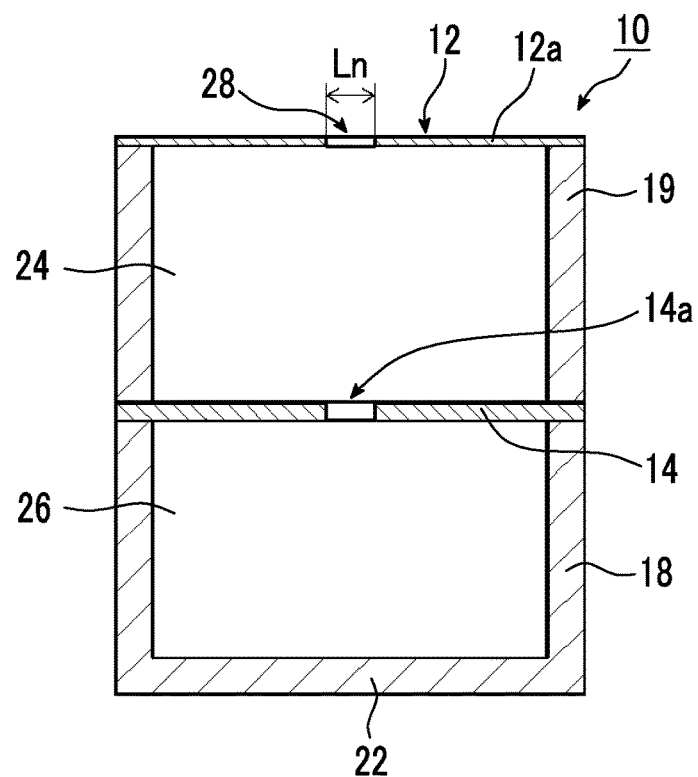
FIG. 22 is a cross-sectional view schematically showing another example of the soundproof structure of the present invention.

More specifically, in a case where a through-hole 28 is drilled in the membrane-like member 12 as in the configuration of the soundproof structure 10 shown in FIG. 22, a peak frequency can be adjusted. More specifically, in a case where the through-hole 28 is formed in the membrane portion 12a of the membrane-like member 12, an acoustic impedance of the membrane-like member 12 changes. In addition, the mass of the membrane-like member 12 is reduced due to the through-hole 28. It is considered that the resonance frequency of the membrane-like member 12 changes due to these facts, and as a result, the peak frequency changes.

FIG. 22 are views showing modification examples of the soundproof structure 10 according to the embodiment of the present invention, and are schematic views showing a cross section at the same position as the cross section shown in FIG. 3. The soundproof structure shown in FIG. 22 has the same configuration as the soundproof structure shown in FIG. 3 except that it has a porous sound absorbing body 30, and thus the same portions are denoted by the same reference numerals, and the different portions will be mainly described. This is the same for Modification Example shown in FIGS. 23 to 28.

The peak frequency after the formation of the through-hole 28 can be controlled by adjusting a size of the through-hole 28 (Ln in FIG. 22). The size of the through-hole 28 is not particularly limited as long as it is a size that the flow of air is obstructed. However, the size is set to smaller than the size of the membrane portion 12a of the membrane-like member 12 (the size of the vibrating region), and specifically, the equivalent circle diameter is preferably 0.1 mm to 10 mm, more preferably 0.5 mm to 7 mm, and even more preferably 1 mm to 5 mm.

In addition, the ratio of an area of the through-hole 28 is preferably 50% or less, more preferably 30% or less, even more preferably 10% or less with respect to an area of the membrane portion 12a.

Figure 23:
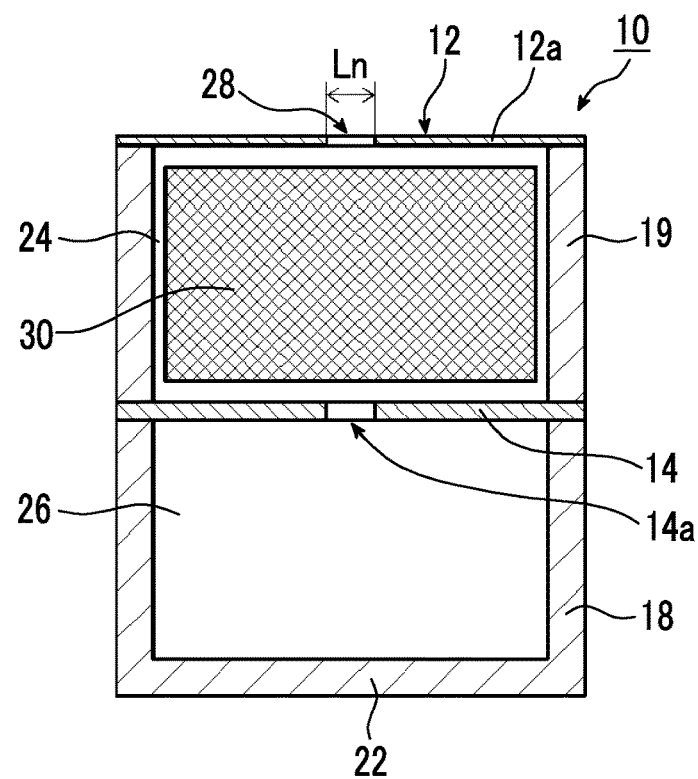
FIG. 23 is a cross-sectional view schematically showing another example of the soundproof structure of the present invention.

In addition, in the configuration of the soundproof structure 10 described above, only air exists inside the rear surface space 24, but it may have a configuration that a porous sound absorbing body 30 is disposed in the rear surface space 24 as shown in FIG. 23. Further, a configuration in which a porous sound absorbing body is disposed in the first space 26 may be employed.

It is possible to widen the band to a lower frequency side instead of reducing the sound absorption coefficient at the sound absorption peak by disposing the porous sound absorbing body 30 in the rear surface space 24 or the first space 26.

The porous sound absorbing body 30 is not particularly limited, and a well-known porous sound absorbing body can be suitably used. Examples thereof include various well-known porous sound absorbing bodies such as a foamed material such as urethane foam, soft urethane foam, wood, a ceramic particle sintered material, or phenol foam, and a material containing minute air; a fiber such as glass wool, rock wool, microfiber (such as THINSULATE manufactured by 3M), a floor mat, a carpet, a melt blown nonwoven, a metal nonwoven fabric, a polyester nonwoven, metal wool, felts, an insulation board, and glass nonwoven, and nonwoven materials, a wood wool cement board, a nanofiber material such as a silica nanofiber, and a gypsum board.

In addition, a flow resistance $\sigma_1$ of the porous sound absorbing body is not particularly limited, and is preferably 1,000 to 100,000 (Pa·s/m$^2$), more preferably 5,000 to 80,000 (Pa·s/m$^2$), and even more preferably 10,000 to 50,000 (Pa·s/m$^2$).

The flow resistance of the porous sound absorbing body can be evaluated by measuring the normal incidence sound absorption coefficient of a porous sound absorbing body having a thickness of 1 cm and fitting the Miki model (J. Acoustic. Soc. Jpn., 11(1) pp. 19-24 (1990)). Alternatively, the evaluation may be performed according to "ISO 9053".

The soundproof structure according to the embodiment of the present invention may further have a second membrane-like member.

For example, both ends of the opening portion 20 formed in the inner frame 18 may be open ends, and the second membrane-like member may be attached to the other opening surface (inner opening surface) of the inner frame 18.

Figure 24:
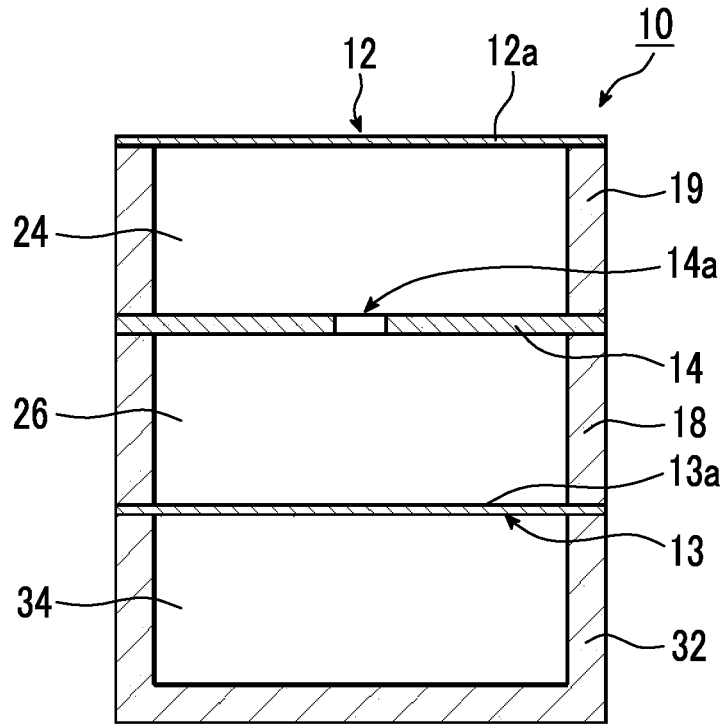
FIG. 24 is a cross-sectional view schematically showing another example of the soundproof structure of the present invention.

Alternatively, as in a soundproof structure 10 shown in FIG. 24, the membrane-like member 12, the outer frame 19, the plate-like member 14, the inner frame 18, the second membrane-like member 13, and a third frame 32 may be laminated in this order.

In the soundproof structure 10 of FIG. 24, both ends of the opening portion 20 in the inner frame 18 are open ends, an edge portion of the second membrane-like member 13 is attached to the other opening surface (inner opening surface) of the inner frame 18, and the third frame 32 is attached to the surface of the second membrane-like member 13 opposite to the inner frame 18. The third frame 32 is a bottomed cylindrical frame consisting of a rigid body. The opening portion consisting of a circular cavity is provided in a radial direction center portion thereof. In addition, one end surface (outer end portion) of the third frame 32 in the thickness direction is the opening surface. The edge portion (outer edge portion) of the second membrane-like member 13 is fixed to the opening surface of the third frame 32. That is, the second membrane-like member 13 is supported so as to perform the membrane vibration, with the edge portion sandwiched between the inner frame 18 and the third frame 32. On the surface side of the second membrane-like member 13 opposite to the first space 26, a rear surface space 34 surrounded by the third frame 32 and the second membrane-like member 13 is formed.

In the example shown in FIG. 24, the second membrane-like member 13 is disposed on the inner side (the side opposite to the membrane-like member 12) of the plate-like member 14, but the present invention is not limited thereto. For example, it may be disposed outside of the membrane-like member 12.

Figure 25:
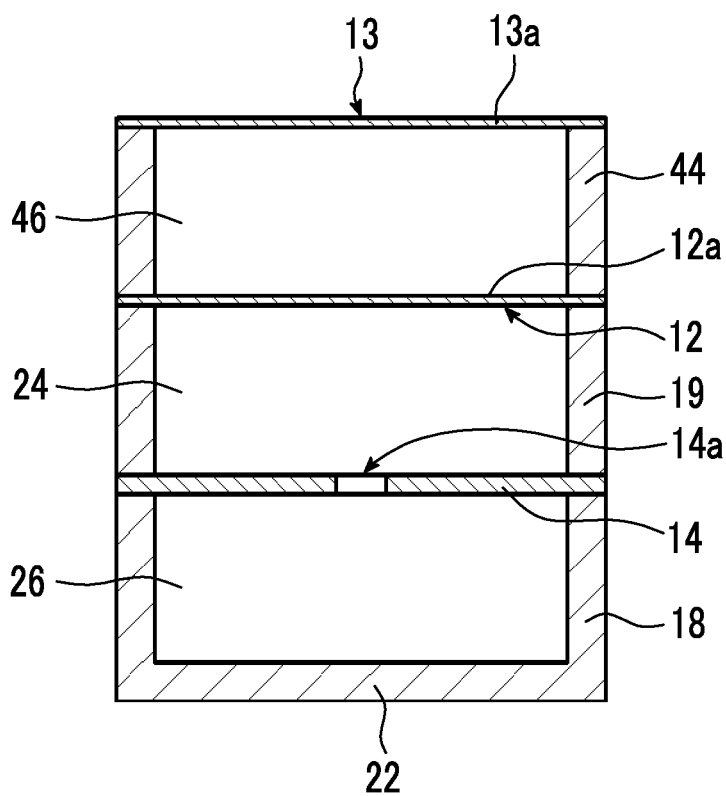
FIG. 25 is a cross-sectional view schematically showing another example of the soundproof structure of the present invention.

That is, as in the soundproof structure 10 shown in FIG. 25, the second membrane-like member 13, a fourth frame 44, the membrane-like member 12, the outer frame 19, the plate-like member 14, and the inner frame 18 may be laminated in this order.

The fourth frame 44 is a cylindrical frame having an opening portion consisting of a rigid body and penetrating in the thickness direction. One opening surface of the fourth frame 44 is attached to a surface of the membrane-like member 12 opposite to the outer frame 19, and the second membrane-like member 13 is attached to the other opening surface of the fourth frame 44. The edge portion (outer edge portion) of the second membrane-like member 13 is fixed to the opening surface of the fourth frame 44, and is supported so as to vibrate. A rear surface space 46 of the second membrane-like member 13 is formed between the second membrane-like member 13 and the membrane-like member 12.

In addition, the configuration in the example shown in FIGS. 24 and 25 has one second membrane-like member 13, but the present invention is not limited to thereto, and a configuration having two or more second membrane-like members 13 may be used.

The soundproof structure according to an example of the present invention may further include one or more second plate-like members having at least one through-hole on a surface side of the plate-like member opposite to the membrane-like member side.

Figure 26:
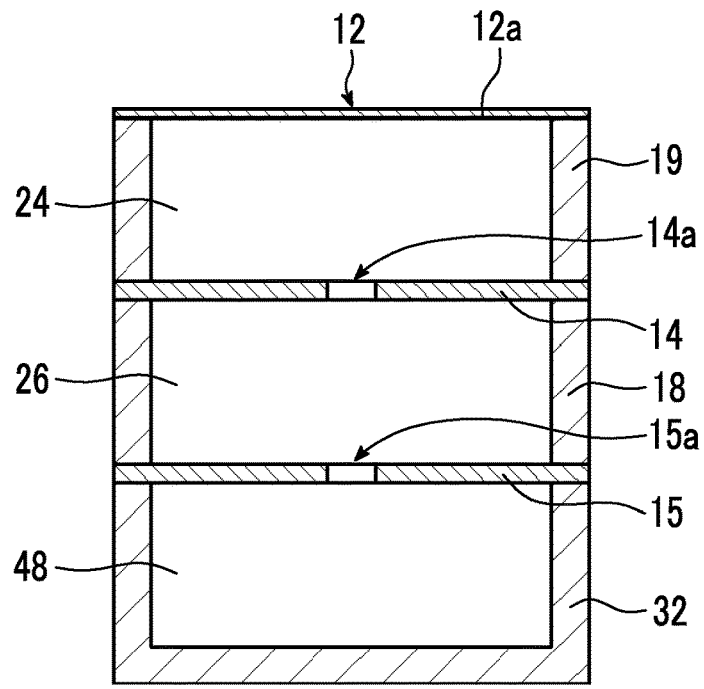
FIG. 26 is a cross-sectional view schematically showing another example of the soundproof structure of the present invention.

For example, as in a soundproof structure 10 shown in FIG. 26, the membrane-like member 12, the outer frame 19, the plate-like member 14, the inner frame 18, the second plate-like member 15, and a third frame 32 may be laminated in this order.

The second plate-like member 15 is a circular plate-like member having an outer diameter substantially equal to the opening surface of the third frame 32. The edge portion (outer edge portion) of one surface of the second plate-like member 15 is fixed to the opening surface of the third frame 32, and the edge portion of the other surface is fixed to the opening surface of the inner frame 18. That is, the edge portion of the second plate-like member 15 is sandwiched between the inner frame 18 and the third frame 32. In addition, a through-hole 15a is formed in a substantially center portion of the second plate-like member 15. A second space 48 surrounded by the second plate-like member 15, the third frame 32 is formed Between the second plate-like member 15 and the third frame 32. Helmholtz resonance is generated by the through-hole 15a formed in the second plate-like member 15 and the second space 48.

Alternatively, one or more second membrane-like members and one or more second plate-like members may be provided.

Figure 27:
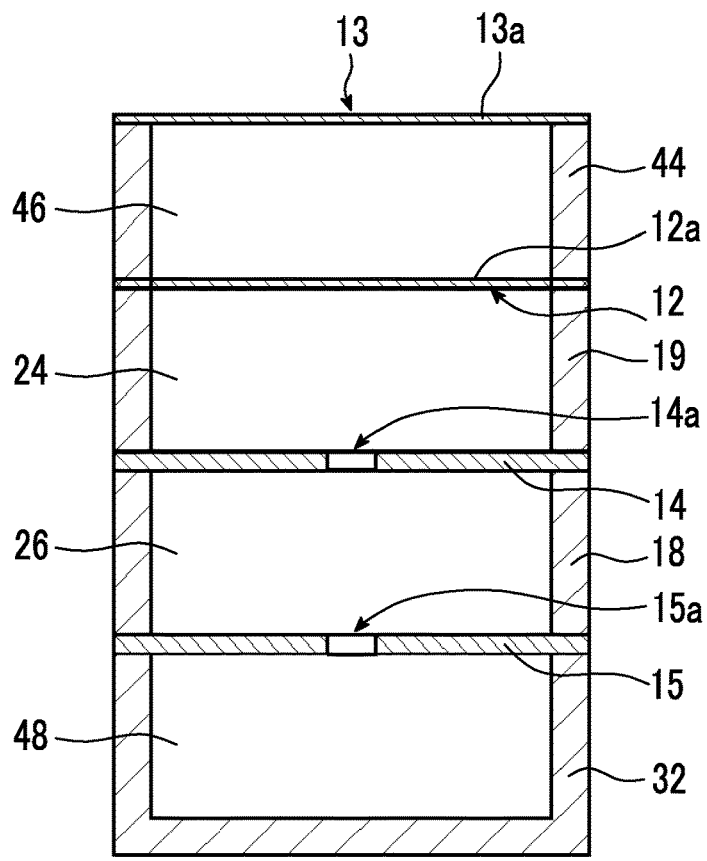
FIG. 27 is a cross-sectional view schematically showing another example of the soundproof structure of the present invention.

For example, as in the soundproof structure 10 shown in FIG. 27, the second membrane-like member 13, the fourth frame 44, the membrane-like member 12, the outer frame 19, the plate-like member 14, the inner frame 18, the second plate-like member 15, and the third frame 32 may be laminated in this order.

As in each the soundproof structure shown in FIGS. 24 to 27, by having the second membrane-like member and/or the second plate-like member, the sound absorption coefficient at different frequencies can be further increased.

As the material of the second membrane-like member, the same material as the material of the above-mentioned membrane-like member 12 can be used. In addition, the thickness, hardness, density, and the like of the second membrane-like member are preferably in the same ranges as the material, thickness, hardness, density, and the like of the membrane-like member 12 described above.

As the material of the second plate-like member, the same material as the material of the above-mentioned plate-like member 14 can be used. Further, the thickness of the second plate-like member, the size of the through-hole, and the like are preferably in the same ranges as the thickness of the plate-like member 14, the size of the through-hole, and the like described above.

In a case of having the second membrane-like member 13, a configuration in which a through-hole 36 is formed in a membrane portion 13a of the second membrane-like member 13 may be adopted.

In a case of having a plurality of second membrane-like members 13, the through-hole 36 may be formed in at least one second membrane-like member 13, but the through-holes may be formed in all second membrane-like member 13.

Figure 28:
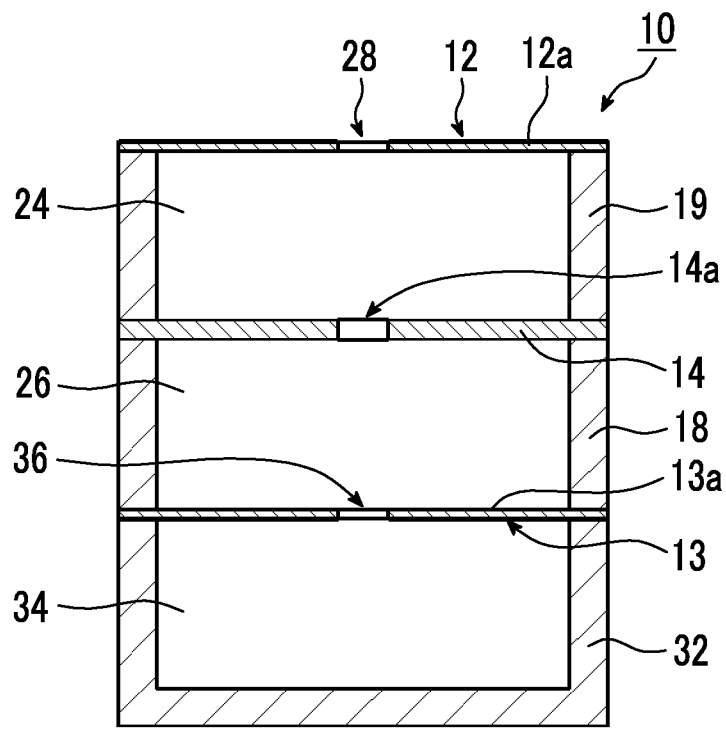
FIG. 28 is a cross-sectional view schematically showing another example of the soundproof structure of the present invention.

In addition, as shown in FIG. 28, a configuration in which through-holes (28, 36) are formed in each of the membrane-like member 12 and the second membrane-like member 13 may be adopted.

Further, a configuration in which through-holes are formed in each of the membrane-like member 12 and all the second membrane-like member 13 may be adopted. By adopting a configuration in which the through-holes are formed in the membrane-like member 12 and all the second membrane-like members 13, the entire structure does not have a complete closed space. For example, even in a case where an external temperature or humidity changes, the structure is hardly affected by a change in pressure or the like since air is circulated in the entire structure.

In a case of having the membrane-like member 12 and the second membrane-like member 13, it is preferable that a through-hole is formed in the membrane-like member (the second membrane-like member) disposed outside. An average areal density (a value obtained by dividing the mass of the membrane-like member by the outer area of the membrane-like member) of the membrane-like member in which the through-hole is formed becomes small. Since the membrane-like member having a smaller average areal density is disposed at a position close to the outer end of the soundproof structure 10, the airborne sound easily passes through the membrane-like member, and since the through-hole is formed, the sound further easily passes through the membrane-like member. As a result, the sound wave can easily reach the inside the soundproof structure, and the effect of sound absorption by the membrane-like member disposed inside can be enhanced.

Note that a plurality of through-holes 28 and 36 may be drilled, and in that case, the size of each through-hole can be adjusted in the same manner as described above.

In addition, a mesh member having a mesh of a size that does not allow dust to pass therethrough may be disposed in a portion of the through-hole 14a of the plate-like member 14. As the mesh member, a metal or plastic mesh, a nonwoven fabric, urethane, aerogel, a porous film, or the like can be used.

EXAMPLES

Hereinafter, the present invention will be described in more detail on the basis of Examples.

The materials, amounts used, ratios, processing details, processing procedures, and the like shown in the following Examples can be suitably changed without departing from the gist of the present invention. Therefore, the scope of the present invention should not be construed as being limited by the following Examples.

As described above, Examples 1 to 3 (FIGS. 13 to 15), which are soundproof structures according to the embodiment of the present invention, have a region having a large sound absorption coefficient around 2.0 kHz to 4.5 kHz (sound absorbing region on the low frequency side) and a region having a large sound absorption coefficient around 7.0 kHz to 8.5 kHz (sound absorbing region on the high frequency side). The maximum sound absorption coefficient exceeds 60% in both regions. Further, the high frequency side peak frequency appears on the side larger than a fundamental frequency of either the single Helmholtz resonator or the single membrane vibration, and the sound absorption coefficient is large. As described above, it is understood that the soundproof structure according to the embodiment of the present invention can perform very large sound absorption over a plurality of high frequency bands by laminating the plate-like member having the through-hole and the membrane-like member. Particularly, the sound absorption in the sound absorbing region on the high frequency side is not observed in Reference Examples 1 and 2 (FIGS. 11 and 12), and it is shown that the structure absorbs a sound in the high frequency band by two interactions, not by the simple addition of sound absorbing structure. That is, in the sound absorbing region on the high frequency side, in the rear surface space 24 between the membrane-like member 12 and the plate-like member 14, a sound transmitted through the upper membrane-like member 12 and a sound due to the Helmholtz resonance of the lower plate-like member 14 interfere with each other in the near-field, so that a new sound absorption peak appears. This is the sound absorption mode that appears only in a case where the two factors are combined.

[Simulation 3]

A simulation is performed by the same method as the simulation 1 with the thickness of the membrane-like member 12 being 25 μm.

The Young's modulus of the membrane-like member is set to 4.5 GPa, which is the Young's modulus of the PET film. The inner frame has a cylindrical shape, the diameter of the opening portion is set to 20 mm, and the thickness of the rear surface space is set to 2 mm. The thickness of the plate-like member 14 is set to 2 mm, and a through-hole 14a having a diameter of 6 mm is provided at the central position. The outer frame has a cylindrical shape, the diameter of the opening portion is set to 20 mm, and the thickness of the first space is set to 2 mm.

Figure 29:
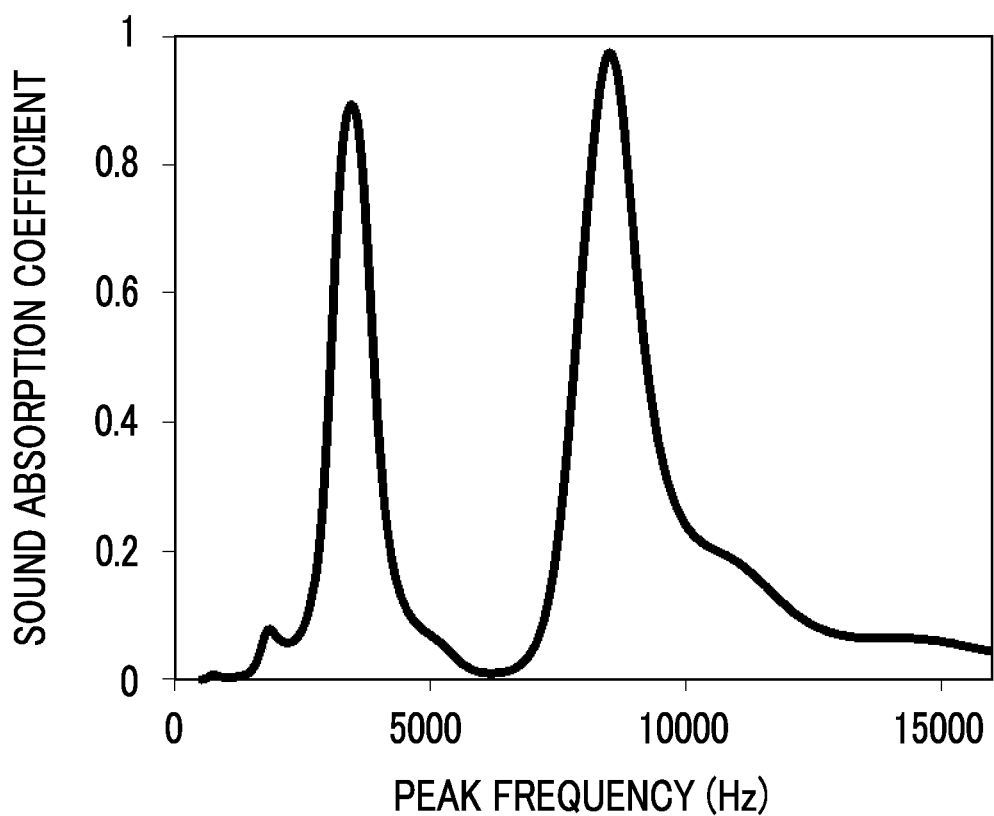
FIG. 29 is a graph showing a relationship between a frequency and a sound absorption coefficient.

FIG. 29 shows the result of the above simulation (the relationship between the calculated frequency and the sound absorption coefficient).

As shown in FIG. 29, the lowest resonance frequency corresponding to the fundamental frequency of the membrane vibration exists at 1850 Hz, but the sound absorption coefficient is small. On the other hand, large sound absorption peaks are shown at 3450 Hz and 8500 Hz. It is considered that the sound absorbing region on the low frequency side and the sound absorbing region on the high frequency side appear by the interaction between the high-order vibration of the membrane vibration and the Helmholtz resonance.

[Simulation 4]

Next, the simulation is performed in the same manner as in Simulation 3 except that the diameter (through-hole diameter) of the through-hole 14a formed in the plate-like member 14 is changed from 1 mm to 15 mm in increments of 1 mm.

Figure 30:
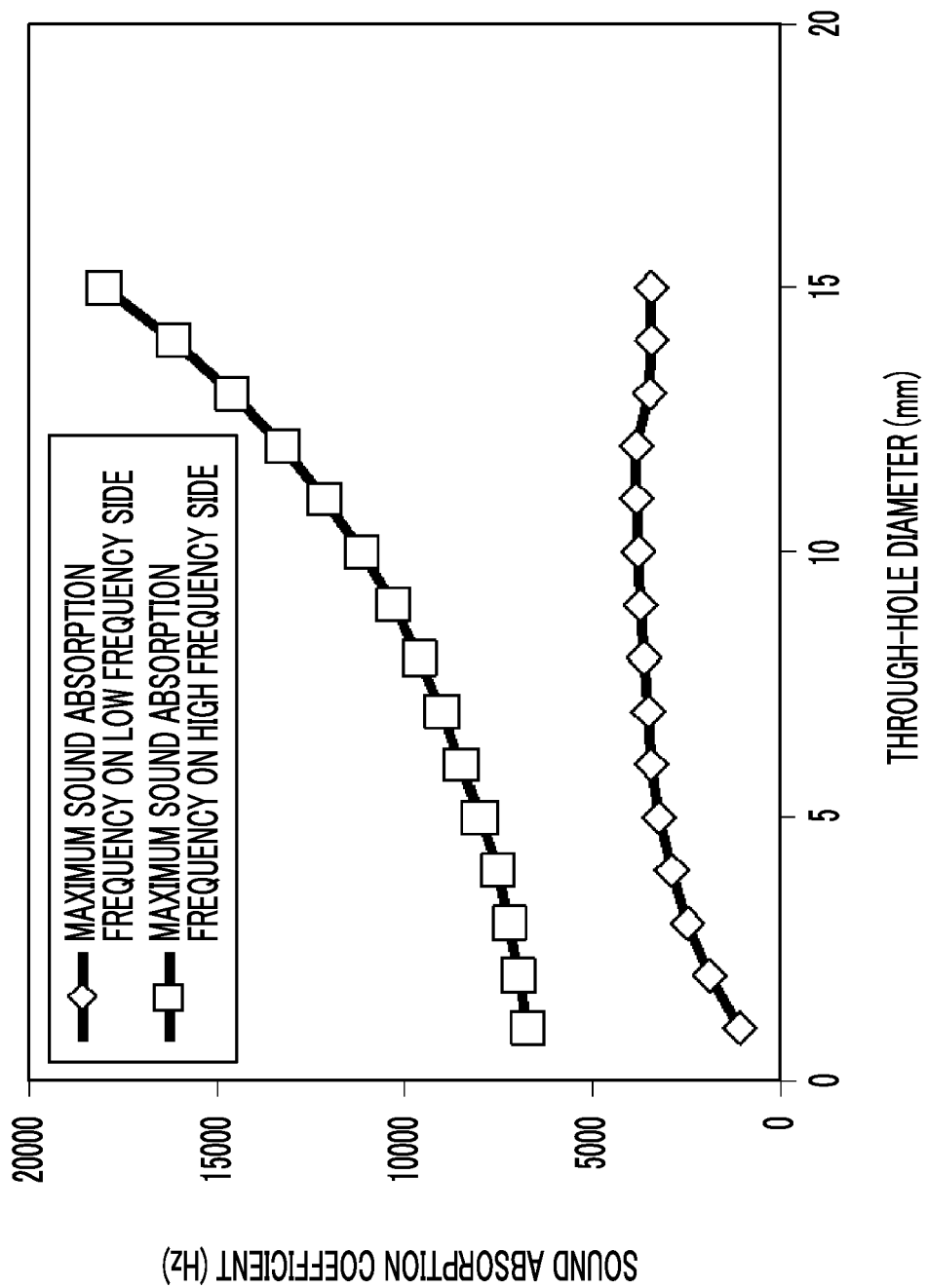
FIG. 30 is a graph showing a relationship between a through-hole diameter and a sound absorption peak frequency.
Figure 31:
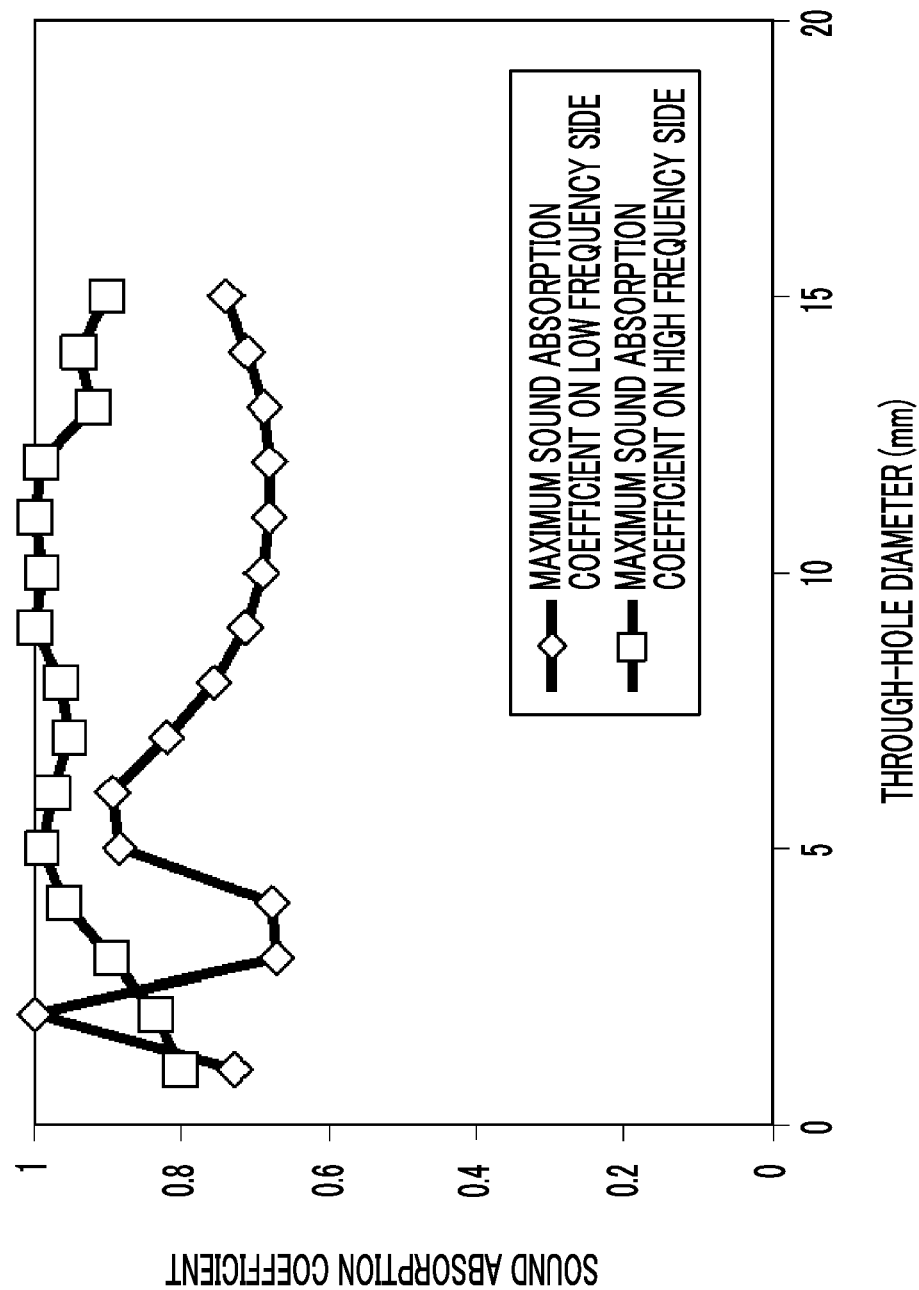
FIG. 31 is a graph showing a relationship between a through-hole diameter and a peak sound absorption coefficient.

FIG. 30 shows a relationship between the through-hole diameter and the maximum sound absorption frequency on the low frequency side and the maximum sound absorption frequency on the high frequency side. FIG. 31 shows a relationship between the through-hole diameter and the maximum sound absorption coefficient on the low frequency side and the maximum sound absorption coefficient on the high frequency side.

Also in a case where the thickness of the membrane-like member is 25 μm, similarly to a case where the thickness is 50 μm, the maximum sound absorption frequency on the high frequency side indicates resonance at a frequency higher than the fundamental frequency in a case of the single Helmholtz resonance of each through-hole diameter. On the other hand, with respect to the sound absorption coefficient, the sound absorption coefficient in the sound absorbing region on the high frequency side is kept large as compared with the case where the thickness of the membrane-like member is 50 μm. It is considered that this is because the membrane-like member on the upper surface becomes thin, so that a sound is easily transmitted as a whole, and even high frequency sound reaches a space (rear surface space) between the membrane-like member and the plate-like member, thereby absorbing the sound.

[Simulation 5]

The structure disclosed in JP2010-097145A is analyzed. Since the fundamental frequency in the case of single Helmholtz resonance is not shown in JP2010-097145A, the fundamental frequency is also determined. The results thereof are shown in Table 8.

TABLE 8

|  | Configuration | Configuration details | Resonance frequency (Hz) |
|---|---|---|---|
| Comparative Example 1 | Single membrane 1 | Thickness of membrane-like member 850 μm<br>Thickness of rear surface space 20 mm<br>Size 80 mm × 80 mm | 400 |
| Comparative Example 2 | Single membrane 2 case where plate hole portion is formed of rigid body | Thickness of membrane-like member 850 μm<br>Thickness of rear surface space 8.5 mm<br>Size 80 mm × 80 mm | 480 |
| Comparative Example 3 | Single Helmholtz resonance | Thickness of plate-like member 3 mm<br>Through-hole diameter 4.5 mm<br>Thickness of First space 8.5 mm<br>Size 80 mm × 80 mm | 360 |
| Comparative Example 4 | Comparative Example 2 + Comparative Example 3 | Thickness of membrane-like member 850 μm<br>Thickness of rear surface space 8.5 mm<br>Size 80 mm × 80 mm<br>Thickness of plate-like member 3 mm<br>Through-hole diameter 4.5 mm<br>Thickness of First space 8.5 mm<br>Size 80 mm × 80 mm | 280 |

As shown in Table 8, in the configuration disclosed in JP2010-097145A, the fundamental frequency $f_{h1}$ of the Helmholtz resonance is small than the fundamental frequency $f_{m1}$ of the membrane vibration. At this time, as shown in FIG. 4 of JP2010-097145A, the resonance frequency has only one peak and the band is narrow.

Example 4

The soundproof structure having the same configuration as that of Example 1 except a configuration in which the through-hole 28 having a diameter of 4 mm is formed in the membrane-like member 12 is produced, and the sound absorption coefficient is measured.

The through-hole 28 is formed at the center portion of the membrane-like member 12 using a punch.

Figure 32:
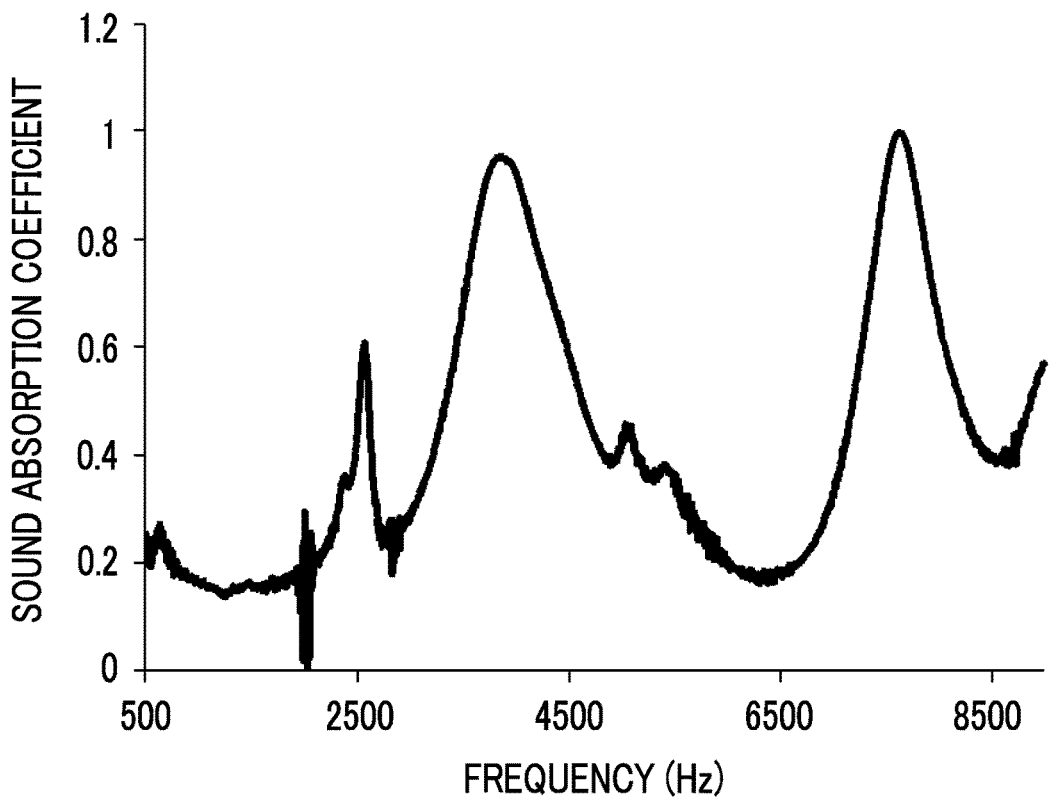
FIG. 32 is a graph showing a relationship between a frequency and a sound absorption coefficient.

The results thereof are shown in FIG. 32.

As shown in FIG. 32, also in Example 4, it can be seen that sound absorption peaks appear in both regions of the low frequency side and the high frequency side.

Since through-holes are formed in both the outer vibrating membrane structure (the membrane-like member 12) and the inner Helmholtz structure (the plate-like member 14), the entire structure does not have a complete closed space. For example, even in a case where an external temperature or humidity changes, the structure is hardly affected by a change in pressure or the like since air is circulated in the entire structure.

Figure 33:
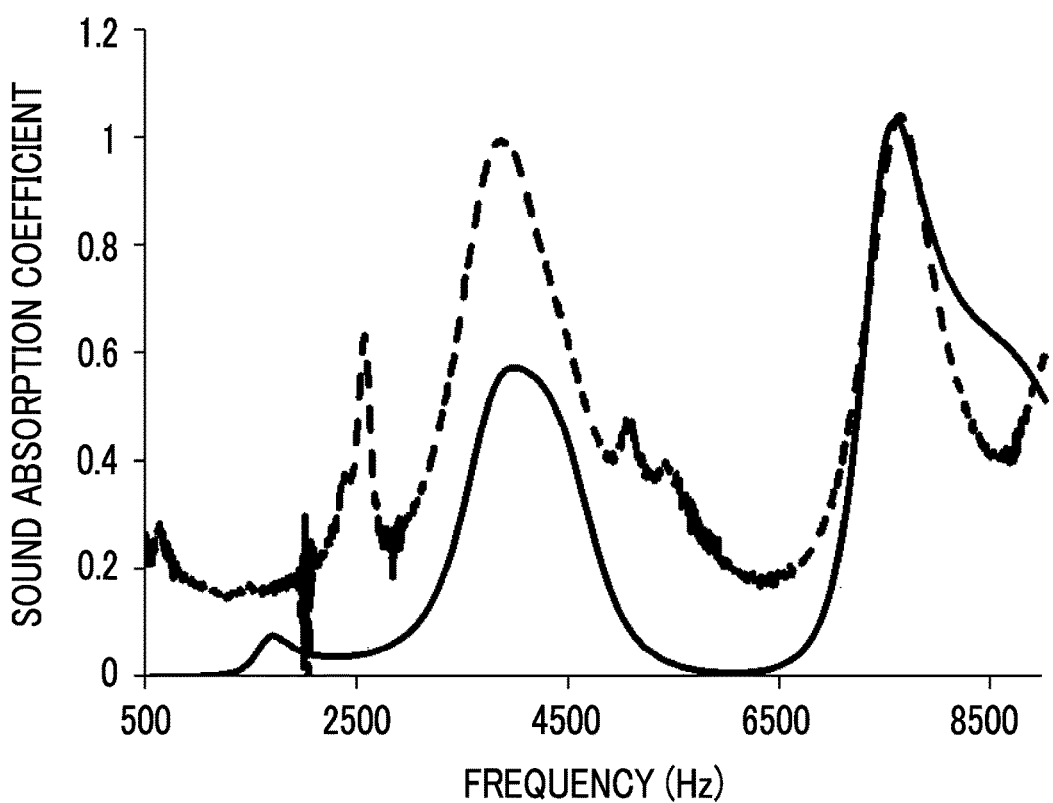
FIG. 33 is a graph showing a relationship between a frequency and a sound absorption coefficient.

In addition, the configuration of Example 4 is simulated by the same method as described above. In FIG. 33, a simulation result is shown by a solid line. An actual measurement result is shown by a broken line. It can be seen from the comparison between the simulation result and the actual measurement result that the simulation can well reproduce the two sound absorbing regions.

Example 5

The soundproof structure is produced in the same manner as in Example 4 except that the diameter of the through-hole 14a of the plate-like member 14 is set to 4 mm, and the sound absorption coefficient is measured. That is, the soundproof structure having the same configuration as that of Example 3 except a configuration in which the through-hole 28 having a diameter of 4 mm is formed in the membrane-like member 12 is produced, and the sound absorption coefficient is measured.

Figure 34:
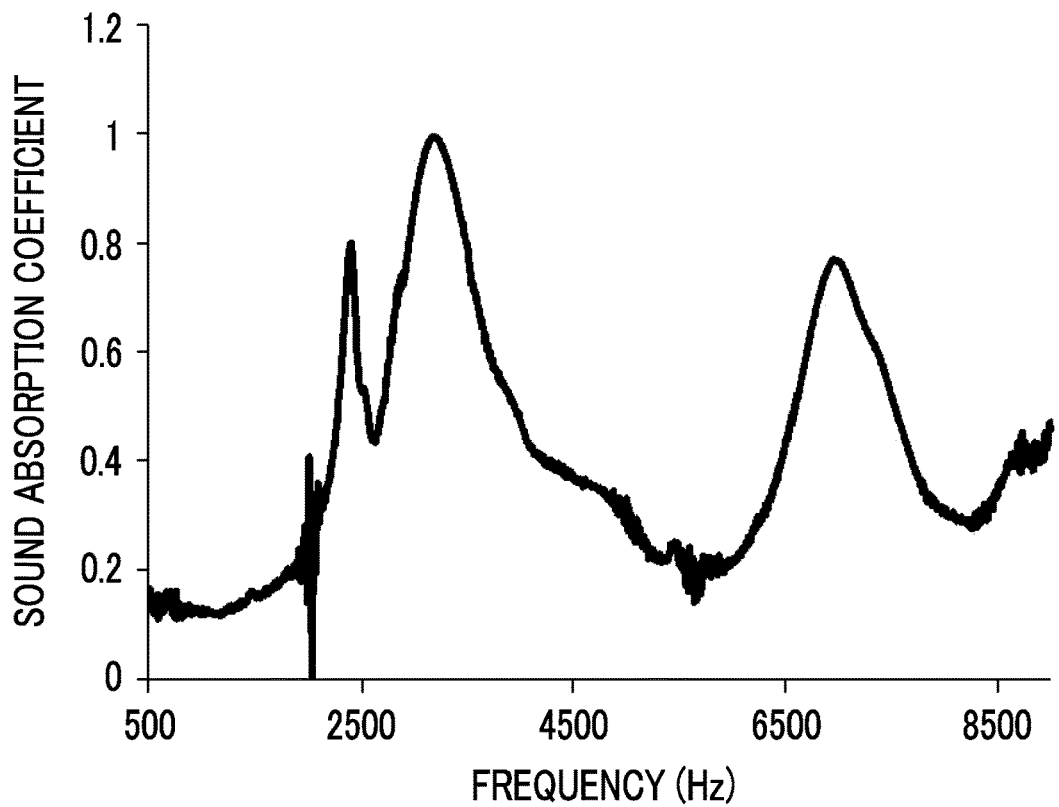
FIG. 34 is a graph showing a relationship between a frequency and a sound absorption coefficient.

The results thereof are shown in FIG. 34.

As shown in FIG. 34, also in Example 5, it can be seen that sound absorption peaks appear in both regions of the low frequency side and the high frequency side.

From the above results, it is clear that the effect of the present invention is obtained.

EXPLANATION OF REFERENCES

10: soundproof structure
12: membrane-like member
12a: membrane portion
13: second membrane-like member
13a: membrane portion
14: plate-like member
14a: through-hole
15: second plate-like member
15a: through-hole
16: support
18: inner frame
19: outer frame
20: opening portion
21: opening surface
22: bottom wall
24: rear surface space
26: first space
28: through-hole
30: porous sound absorbing body
32: third frame
34: rear surface space 36: through-hole
40: opening portion
41, 42: opening surface
44: fourth frame
46: rear surface space
48: second space

What is claimed is:

1. A soundproof structure comprising:
a membrane-like member;
a plate-like member that is disposed to face one surface of the membrane-like member and in which at least one through-hole is formed; and
a support that is formed of a rigid body and supports the plate-like member and the membrane-like member,
wherein the membrane-like member is supported by the support so as to perform membrane vibration,
wherein a rear surface space is provided between the membrane-like member and the plate-like member,
wherein a first space is provided on a side opposite to the rear surface space with the plate-like member sandwiched therebetween,
wherein the membrane-like member, the rear surface space, the plate-like member, and the first space are arranged in this order,
wherein the membrane-like member, the support, the plate-like member, and the rear surface space form a first sound absorbing portion that absorbs a sound by membrane vibration,
wherein the plate-like member having the through-hole, the support, and the first space form a second sound absorbing portion that absorbs a sound by Helmholtz resonance,
wherein assuming that a fundamental frequency of membrane vibration of the membrane-like member in a case where the plate-like member is regarded as a rigid body in which the through-hole is not formed in the first sound absorbing portion is $f_{m1}$ and a fundamental frequency of Helmholtz resonance of the second sound absorbing portion is $f_{h1}$, $f_{m1} < f_{h1}$ is satisfied,
wherein there are a plurality of frequency bands where the soundproof structure is capable of absorbing a sound, and
wherein the plurality of frequency bands where the soundproof structure is capable of absorbing a sound include a sound absorbing region on a low frequency side where the membrane vibration and the Helmholtz resonance provide phase variations in the same direction to absorb a sound, and a sound absorbing region on a high frequency side where the membrane vibration and the Helmholtz resonance provide phase variations in opposite directions to absorb a sound.

2. The soundproof structure according to claim 1, wherein a sound absorption coefficient of the vibration of the membrane-like member at a frequency in at least one high-order vibration mode existing at frequencies of 1 kHz or more is higher than a sound absorption coefficient at a frequency in a fundamental vibration mode.

3. The soundproof structure according to claim 1, wherein, assuming that a Young's modulus of the membrane-like member is E (Pa), a thickness of the membrane-like member is t (m), a thickness of the rear surface space is d (m), and an equivalent circle diameter of a region where the membrane-like member vibrates is $\Phi$ (m), a hardness $E \times t^3$ (Pa·m$^3$) of the membrane-like member is $21.6 \times d^{-1.25} \times \Phi^{4.15}$ or less.

4. The soundproof structure according to claim 3, wherein the hardness $E \times t^3$ (Pa·m$^3$) of the membrane-like member is $2.49 \times 10^{-7}$ or more.

5. The soundproof structure according to claim 1,
wherein the support includes a tubular outer frame and an inner frame having an opening portion,
wherein the membrane-like member, the outer frame, the plate-like member and the inner frame are laminated in this order,
wherein the membrane-like member is fixed to one opening surface of the outer frame,
wherein the plate-like member is fixed to an opening surface of the inner frame in which the opening portion is formed,
wherein the rear surface space is a space surrounded by the membrane-like member, the outer frame, and the plate-like member, and
wherein the first space is a space surrounded by the plate-like member and the inner frame.

6. The soundproof structure according to claim 1,
wherein the fundamental frequency $f_{h1}$ of the Helmholtz resonance of the second sound absorbing portion and the fundamental frequency $f_{m1}$ of the membrane vibration of the first sound absorbing portion satisfy $1.3 \times f_{m1} \leq f_{h1} \leq 12 \times f_{m1}$.

7. The soundproof structure according to claim 1,
wherein a thickness of each of the first space and the rear surface space is 10 mm or less.

8. The soundproof structure according to claim 1,
wherein a total thickness of the soundproof structure is 10 mm or less.

9. The soundproof structure according to claim 1,
wherein a thickness of the membrane-like member is 100 µm or less.

10. The soundproof structure according to claim 1,
wherein a through-hole is provided in at least one of the support or a bottom surface.

11. The soundproof structure according to claim 1,
wherein a through-hole is formed in the membrane-like member.

12. The soundproof structure according to claim 1, further comprising:
one or more second membrane-like members provided on a surface side of the membrane-like member opposite to the plate-like member side.

13. The soundproof structure according to claim 12,
wherein a through-hole is formed in all the second membrane-like members.

14. The soundproof structure according to claim 1, further comprising:
one or more second plate-like members having at least one through-hole on a surface side of the plate-like member opposite to the membrane-like member side.

15. The soundproof structure according to claim 1, further comprising:
a porous sound absorbing body disposed in at least a portion of the rear surface space.

16. The soundproof structure according to claim 1, further comprising:
a mesh member covering the through-hole of the plate-like member.

17. The soundproof structure according to claim 1,
wherein the membrane-like member and the plate-like member having the through-hole are disposed in this order with respect to a sound source as a sound absorbing target.

* * * * *